United States Patent
Yamamoto et al.

(10) Patent No.: US 8,560,263 B2
(45) Date of Patent: Oct. 15, 2013

(54) POWER DISTRIBUTION NETWORK ESTIMATION DEVICE

(75) Inventors: Hiroshi Yamamoto, Nagaoka (JP);
Toshiaki Funakubo, Kawasaki (JP);
Nobutsugu Fujino, Kawasaki (JP);
Hirotaka Oshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 336 days.

(21) Appl. No.: 13/029,392

(22) Filed: Feb. 17, 2011

(65) Prior Publication Data

US 2011/0208468 A1 Aug. 25, 2011

(30) Foreign Application Priority Data

Feb. 24, 2010 (JP) .................................. 2010-38658

(51) Int. Cl.
*G01R 31/00* (2006.01)
(52) U.S. Cl.
USPC ................ 702/118; 702/60; 702/64; 324/66; 324/67
(58) Field of Classification Search
USPC ............................ 702/60, 64, 118; 324/66, 67
See application file for complete search history.

(56) References Cited

U.S. PATENT DOCUMENTS

| | | | |
|---|---|---|---|
| 5,699,051 A * | 12/1997 | Billig et al. | 340/657 |
| 6,163,144 A * | 12/2000 | Steber et al. | 324/67 |
| 6,222,358 B1 * | 4/2001 | Wottrich | 324/67 |
| 2007/0139055 A1 * | 6/2007 | Cockrill | 324/528 |
| 2008/0036466 A1 * | 2/2008 | Raber | 324/509 |
| 2008/0204034 A1 * | 8/2008 | Blades | 324/522 |
| 2009/0082980 A1 * | 3/2009 | Thurmond et al. | 702/60 |
| 2010/0145542 A1 * | 6/2010 | Chapel et al. | 700/295 |
| 2012/0062210 A1 * | 3/2012 | Veillette | 324/110 |

FOREIGN PATENT DOCUMENTS

| | | |
|---|---|---|
| JP | 11-308787 A | 11/1999 |
| JP | 2002-186178 A | 6/2002 |
| JP | 2007-52000 A | 3/2007 |
| JP | 2007-52006 A | 3/2007 |
| JP | 2007-199204 A | 8/2007 |

* cited by examiner

*Primary Examiner* — Jonathan C Teixeira Moffat
*Assistant Examiner* — John Kuan
(74) *Attorney, Agent, or Firm* — Fujitsu Patent Center

(57) ABSTRACT

A device that estimates a positional relationship between loads individually connected through sensors to electric power-supply ends provided in a power distribution network includes a communication unit configured to change a resistance value located between each of electric power-supply ends and a ground terminal of each of sensors and measure a voltage value produced between each of the electric power-supply ends and the ground terminal; and a determination unit configured to acquire voltage values from the two selected sensors from among the sensors after a resistance value of one of the two sensors that has a higher acquired voltage value is changed, calculate a ratio between voltage values acquired before and after the resistance value is changed, and determine that the two sensors are connected to a branch circuit in a same system in the power distribution network, when each ratio about the two sensors is within a specified range.

18 Claims, 39 Drawing Sheets

FIG. 15A

| COMMUNICATION INTERFACE INFORMATION |
|---|
| A.B.C.D0 |

FIG. 15B

| HISTORY OF VOLTAGE VALUE | |
|---|---|
| TIME AND DATE | VOLTAGE VALUE [V] |
| ⋮ | ⋮ |
| 2009/7/12 12:23:45 | 99.24 |
| 2009/7/12 12:23:46 | 98.89 |
| ⋮ | ⋮ |

FIG. 15C

| LOAD STATE |
|---|
| ON |

FIG. 23A

| SENSOR ID | COMMUNICATION INTERFACE INFORMATION |
|---|---|
| SENSOR _01 | A.B.C.D1 |
| SENSOR _02 | A.B.C.D2 |
| ⋮ | ⋮ |

FIG. 23B

| SENSOR ID | HISTORY OF VOLTAGE VALUE | |
|---|---|---|
| | TIME AND DATE | VOLTAGE VALUE [V] |
| SENSOR _01 | ⋮ | ⋮ |
| | 2009/7/12 12:23:45 | 99.24 |
| | 2009/7/12 12:23:46 | 98.89 |
| | ⋮ | ⋮ |
| SENSOR _02 | ⋮ | ⋮ |

FIG. 23C

| SYSTEM ID | INFORMATION OF SENSOR THAT BELONGS TO SYSTEM |
|---|---|
| LINE _01 | SENSOR _01, SENSOR _02, ⋯ |
| ⋮ | ⋮ |
| (UNSPECIFIED POSITION) | SENSOR _X1, SENSOR _X2, ⋯ |

FIG. 23D

| SENSOR ID | LOAD | VOLTAGE VALUE [V] |
|---|---|---|
| SENSOR _01 | OFF | 99.24 |
| | ON | 98.89 |
| SENSOR _02 | OFF | 97.12 |
| | ON | 96.78 |
| ⋮ | | ⋮ |

FIG. 32A

| TIME AND DATE | VOLTAGE VALUE Vi | VOLTAGE VALUE Vj | VOLTAGE VALUE Vk |
|---|---|---|---|
| ... | ... | ... | ... |
| 2009/11/20 8:00:01 | 101.1234 | 101.2345 | 98.7564 |
| 2009/11/20 8:00:02 | 99.8765 | 102.3456 | 97.6543 |
| ... | ... | ... | ... |

FIG. 32B

| TIME AND DATE | VOLTAGE RATIO Vi/Vj | VOLTAGE RATIO Vj/Vk |
|---|---|---|
| ... | ... | ... |
| 2009/11/20 8:00:01 | 1.0123 | 1.0234 |
| 2009/11/20 8:00:02 | 0.9876 | 1.0345 |
| ... | ... | ... |

FIG. 32C

| LOAD PRESENCE/ABSENCE |
|---|
| PRESENCE |

FIG. 32E

| PARAMETER $\beta$ |
|---|
| 0.1 |

FIG. 32D

| TIME AND DATE | CONTROL LOAD RV1 | VOLTAGE VALUE Vi | VOLTAGE VALUE Vj | PARAMETER A | PARAMETER B | ELECTRIC POWER CONSUMPTION |
|---|---|---|---|---|---|---|
| ... | ... | ... | ... | ... | ... | ... |
| 2009/11/20 9:00:01 | 0.1 | 101.1234 | 101.2345 | 1.2345 | 2.3456 | 200.123 |
| | 0.2 | 99.8765 | 102.3456 | | | |
| 2009/11/20 9:00:02 | 0.1 | 101.1234 | 101.2345 | 1.2345 | 2.3456 | 200.123 |
| | 0.2 | 99.8765 | 102.3456 | | | |
| ... | ... | ... | ... | ... | ... | ... |

FIG. 33

| TIME AND DATE | VOLTAGE RATIO Vi / Vj | VOLTAGE RATIO Vj / Vk |
|---|---|---|
| ⋮ | ⋮ | ⋮ |
| 2009/11/20 8:00:01 | 1.0123 | 1.0234 |
| 2009/11/20 8:00:02 | 1.0123 | 1.0234 |
| 2009/11/20 8:00:03 | 1.0234 | 1.0234 |
| 2009/11/20 8:00:04 | 1.0345 | 1.0234 |
| 2009/11/20 8:00:05 | 1.0345 | 1.0234 |
| 2009/11/20 8:00:06 | 1.0123 | 1.0234 |
| ⋮ | ⋮ | ⋮ |

POWER DISTRIBUTION NETWORK ESTIMATION DEVICE

CROSS-REFERENCE TO RELATED APPLICATION

This application is based upon and claims the benefit of priority of the prior Japanese Patent Application No. 2010-038658, filed on Feb. 24, 2010, the entire contents of which are incorporated herein by reference.

FIELD

The embodiments discussed herein are related to a power distribution network estimation device.

BACKGROUND

In facilities such as offices, houses, and the like, in order to efficiently equalize electric power consumption or realize electric power savings, it is necessary to recognize electric power consumed in the facilities. As a method for realizing the measurement of electric power consumed in a facility, there has been known a method in which the electric power consumption of each load (a personal computer, an air conditioner, a refrigerator, and the like) connected to an existing power distribution network is measured using an electric-power sensor. As such a method as described above, for example, a method may be cited in which, using electric-power sensors provided between outlets provided in a power distribution network and all loads connected to the outlets, the amounts of electric currents flowing into the loads and the voltages at positions to which loads are connected are measured, and hence total electric power consumption in the facility is obtained on the basis of the electric power measurement results for all loads.

However, in such a method as described above, since electric-power sensors are connected to all loads in the facility, an installation cost increases. Therefore, the method is not realistic. Accordingly, there has been known a technique in which total electric power consumption in a facility is estimated on the basis of information obtained from electric-power sensors connected to some loads in the facility, so as to reduce an installation cost for electric power consumption measurement.

For example, a method or the like has been proposed in which, by using electric-power sensors, the voltage values at positions to which loads are connected are measured, and total electric power consumption in a facility is estimated. Focusing on a system included in a power distribution network, the amount of a voltage drop and the conductor resistance value of an electric wire, which lead up to a position to which an electric-power sensor is connected, are measured. Accordingly, the amounts of electric currents flowing into the loads connected to the system are estimated, and electric power consumption is estimated on the basis of the estimated amounts of currents. After that, by summing the estimated amounts of electric power consumption in individual systems for all systems, electric power consumption in the entire facility is estimated. In addition, the term "system" means each of circuits included in a power distribution network used for receiving generated electric power from a power transmission network and distributing the electric power, and means each of circuits branching from a trunk line.

The method mentioned above will be described with reference to FIG. 1. FIG. 1 is a schematic view illustrating a power distribution network that distributes electric power, received from a power transmission network, to loads connected to a system 1 and a system 2. A transformer T1 is, for example, provided on a distribution board, the primary side input of the transformer T1 is connected to the power transmission network, and a consumer-side power distribution network is connected to the secondary side output thereof. Resistances r1 to r8 indicate the conductor resistances of circuit wiring lines. Branching in FIG. 1 indicates the branching of a trunk line, and corresponds to, for example, a branch circuit such as a distribution board when house wiring is assumed. In addition, an outlet C1 is provided in the system 1, and a load F1 is connected to the outlet C1 through an electric-power sensor Se1. An outlet C2 and an outlet C3 are provided in the system 2, a load F2 is connected to the outlet C2 through an electric-power sensor Se2, and a load F3 is connected to the outlet C3 through an electric-power sensor Se3. Focusing on the system 2 included in the power distribution network, the amount of a voltage drop and the conductor resistance value of an electric wire, which lead from a position to which the electric-power sensor Se2 is connected up to a position to which the electric-power sensor Se3 is connected, are measured. Next, the amounts of currents flowing into all loads connected to the system 2 are estimated, and electric power consumption is estimated on the basis of the estimated amounts of currents. After that, with respect to the system 1, electric power consumption is also estimated, and, by summing the estimated amounts of electric power consumption for all systems, total electric power consumption in the facility is estimated.

However, in order to realize such an electric power estimation method as described above, it is necessary to recognize which position in the power distribution network the electric-power sensor is connected to, and recognize a positional relationship between the electric-power sensors. Namely, it is necessary to recognize which system the electric-power sensor is included in. However, when the administrator of a power distribution network and a person in charge of electric power monitoring are different from each other, or in an old facility in which a power distribution network is not managed, it may turn out that it is difficult to recognize the configuration of the power distribution network to be a target of monitoring. In such a case, even if an electric-power sensor is provided for a load, it may turn out that it is difficult to recognize which position in the power distribution network the electric-power sensor is provided at. In addition, it is necessary for the outlet C2 and the outlet C3 to be adjacent to each other in the system, and it is necessary for no load to be located between the outlet C2 and the outlet C3. Namely, when another load is located between the outlet C2 and the outlet C3, it is difficult to obtain adequate accuracy for the estimation of electric power consumption, owing to the effect of the other load.

Accordingly, there has been known a method in which electric-power sensors mutually transmit and receive to and from each other power-line superimposed signals. For example, by measuring the voltages and currents of signals, individual electric-power sensors calculate the phase differences therebetween, and a positional relationship between the electric-power sensors in a system is estimated on the basis of the power flow directions of the signals. An example of the method is disclosed in Japanese Laid-open Patent Publication No. 11-308787. However, in this method, since an electric-power sensor that can cause a signal to flow in an electric wiring line in a power distribution network and measure the amount of a current flowing in an electric wire in the power distribution network is necessary, an installation cost increases.

SUMMARY

According to an aspect of the embodiment, an estimation device that estimates a positional relationship between a plurality of loads in a power distribution network, the loads being individually connected through a plurality of sensors to a plurality of electric power-supply ends provided in the power distribution network includes a communication unit configured to change a resistance value located between each of the electric power-supply ends and a ground terminal of each of sensors and measure a voltage value produced between each of the electric power-supply ends and the ground terminal, by communicating with the plural sensors; and a determination unit configured to select two sensors from among the sensors connected to the power distribution network, acquire voltage values from the two selected sensors through the communication unit, acquire voltage values from the two selected sensors after a resistance value of one of the two sensors that has a higher acquired voltage value is changed, calculate, with respect to each of the two sensors, a ratio between voltage values acquired before and after the resistance value is changed, and determine that the two sensors are connected to a branch circuit in a same system in the power distribution network, when the ratio is within a specified range with respect to each of the two sensors.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 15A to 15C are diagrams illustrating embodiments of structures of databases recorded in the recording unit in the sensor;

FIGS. 23A to 23D are diagrams illustrating embodiments of structures of databases recorded in a recording unit in the power distribution network estimation device;

FIG. 32A to FIG. 32E are diagrams illustrating embodiments of structures of databases recorded in the recording unit in the power distribution network estimation device;

FIG. 33 is a diagram illustrating an embodiment in which there is a load between electric power-supply ends;

DESCRIPTION OF EMBODIMENTS

Embodiments will be described with reference to figures.

In the present embodiment, the estimation of a system in a power distribution network, the estimation of the connection state of a load, and the estimation of electric power consumption are performed using a voltage value that is the measurement result of a load voltage, obtained by a sensor used for measuring the fluctuation of the voltage of the load connected to the power distribution network.

Figure 1:
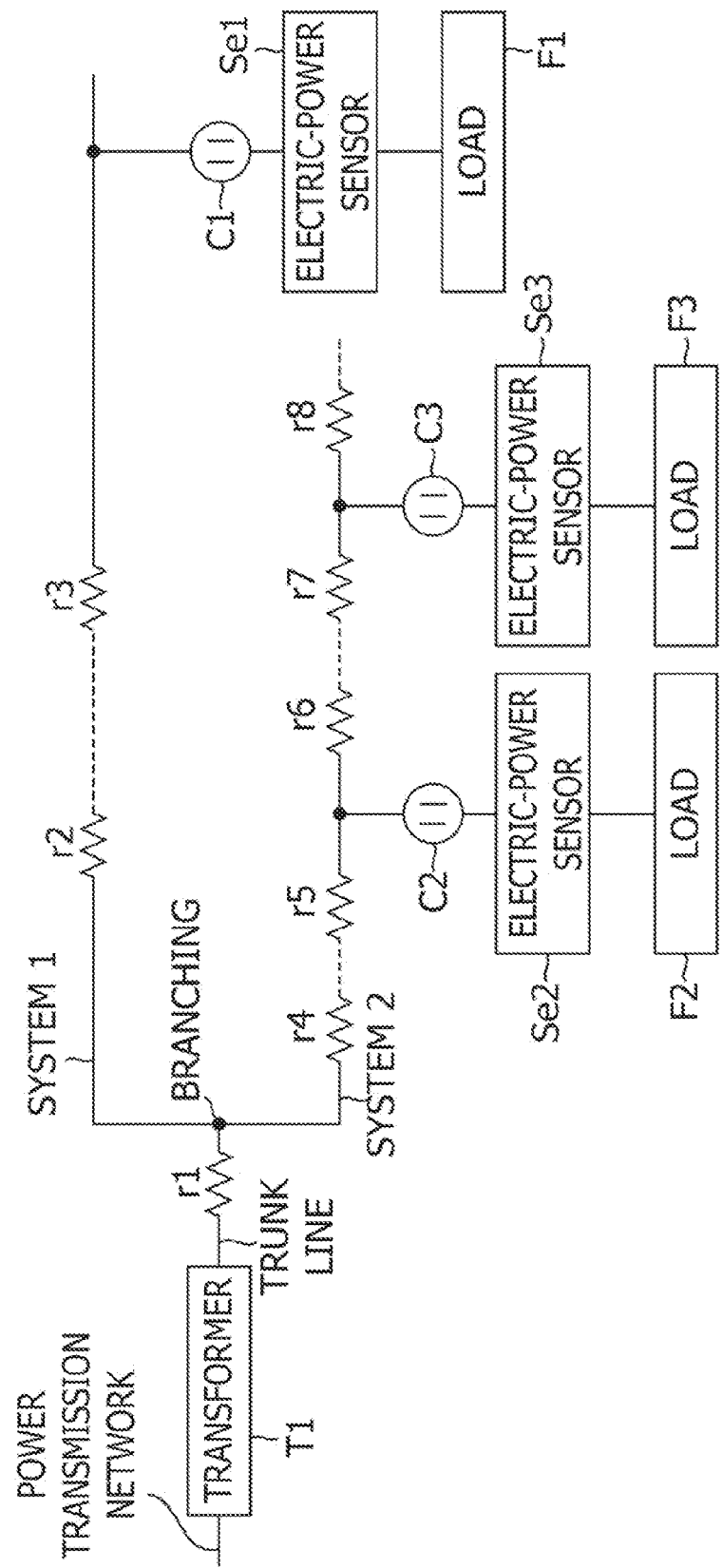
FIG. 1 is a diagram illustrating a power distribution network of the related art.
Figure 2:
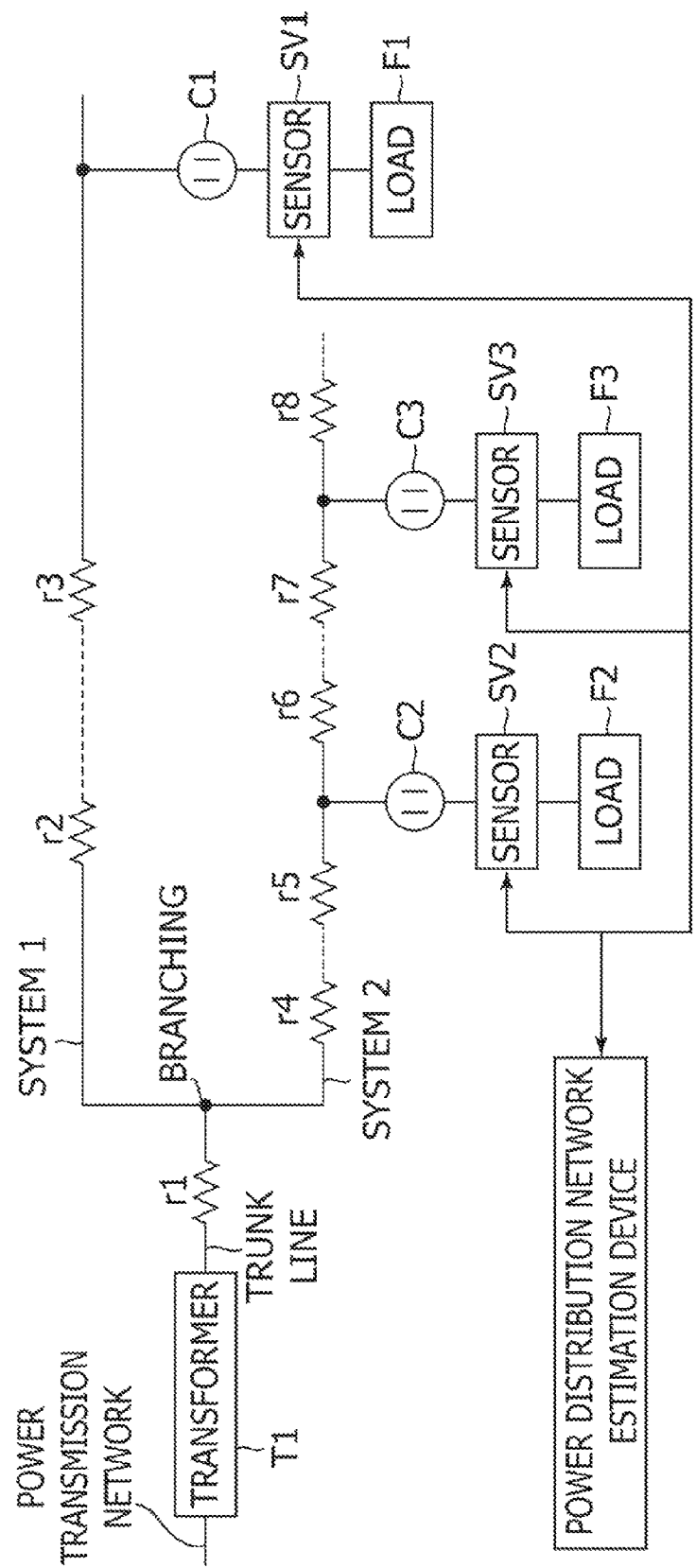
FIG. 2 is a diagram illustrating an embodiment of a system in which a power distribution network estimation device and sensors.

FIG. 2 is a schematic view illustrating an example of a relationship between sensors and a power distribution network estimation device. In FIG. 2, a power distribution network for distributing electric power, received from a power transmission network, to loads connected to a system 1 and a system 2 is illustrated. A transformer T1 is, for example, provided on a distribution board, the primary side (input) of the transformer T1 is connected to the power transmission network, and a consumer-side power distribution network is connected to the secondary side (output) thereof. Resistances r1 to r8 indicate the conductor resistances of circuit wiring lines. Branching in FIG. 2 indicates the branching of a trunk line, and corresponds to, for example, a branch circuit such as a distribution board when house wiring is assumed. In addition, an electric power-supply end (outlet C1) is provided in the system 1, and electric power-supply ends (outlets C2 and C3) are provided in the system 2. A load F1 is connected to the outlet C1 through a sensor SV1, a load F2 is connected to the outlet C2 through a sensor SV2, and a load F3 is connected to the outlet C3 through a sensor SV3. Namely, the sensors SV1, SV2, and SV3 are provided between the outlets C1, C2, and C3 used for feeding power from the power distribution network to a plurality of loads and the loads F1, F2, and F3 connected to the outlets C1, C2, and C3, respectively. In addition, the sensors SV1, SV2, and SV3 change resistance values between the electric power-supply terminals and ground terminals of the outlets C1, C2, and C3, and measure voltage values between the electric power-supply terminals and ground terminals of the outlets C1, C2, and C3, respectively. In addition, the sensors SV1, SV2, and SV3 transmit to a power distribution network estimation device 1 voltage values that are the results of voltage measurement for the outlets C1, C2, and C3.

A sensor will be described.

Figure 3A:
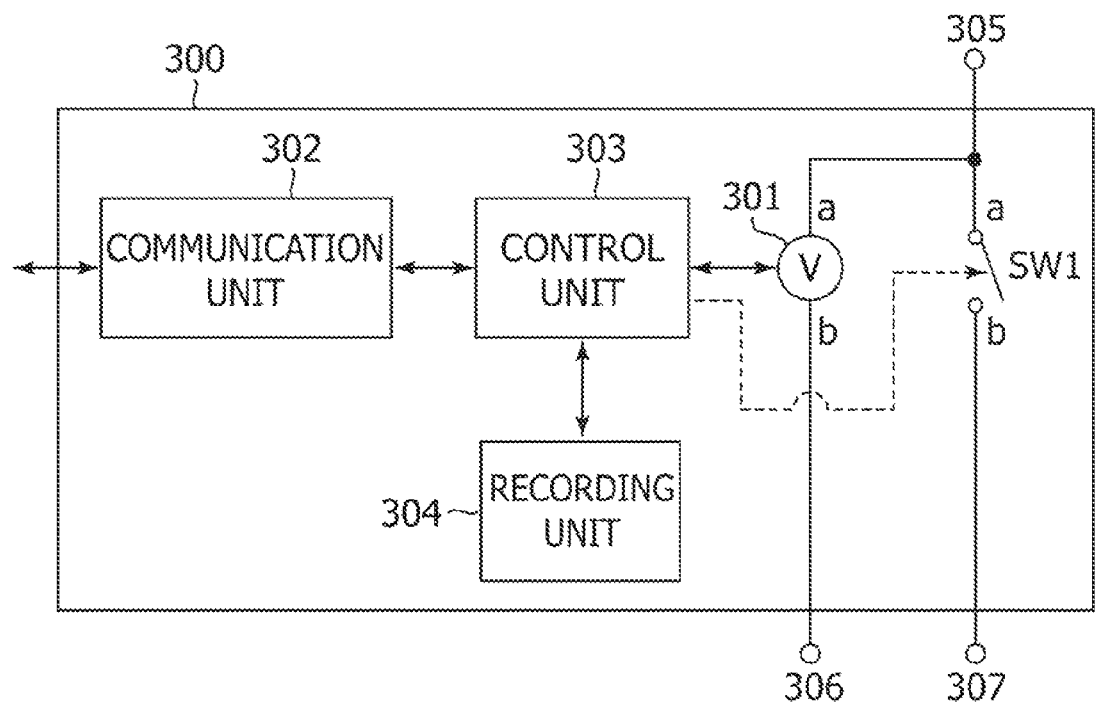
FIG. 3A is a diagram illustrating an embodiment of a sensor that includes a switch.

FIG. 3A is a block diagram illustrating an embodiment of the sensor. A sensor 300 includes a switch SW1, a voltage measurement unit 301, a communication unit 302, a control unit 303, a recording unit 304, and connection terminals 305, 306, and 307. The switch SW1 separates a load from the power distribution network in response to an instruction from the control unit 303. The a-side terminal of the switch SW1 is connected to the a-side terminal of the voltage measurement unit 301 and the connection terminal 305 used for supplying electric power from the power distribution network. The b-side terminal of the switch SW1 is connected to the connection terminal 307 (the input terminal of the load) used for supplying electric power to the load. The b-side terminal of the voltage measurement unit 301 is connected to the connection terminal 306 (a ground terminal) of the power distribution network. In response to an instruction from the control unit 303, the voltage measurement unit 301 measures a voltage value (a potential difference between the electric power-supply terminal and the ground terminal) produced when the switch SW1 is opened and a voltage value produced when the switch SW1 is closed, and transmits the voltage values to the control unit 303.

The communication unit 302 communicates with the power distribution network estimation device 1. For example, Internet Protocol (IP) communication such as a local area network (LAN), a wireless LAN, power line communications (PLC), or the like may be used for the communication. In addition, the communication unit 302 may use serial communication such as Recommended Standard 232C (RS232C) or the like, or may use Near Field Communication that uses infrared light, Bluetooth (registered trademark), ZigBee (registered trademark), or the like.

The control unit 303 controls individual units using a central processing unit (CPU) or a programmable device. When the communication unit 302 communicates with the power distribution network estimation device 1, and receives an instruction for the measurement of a voltage value (measurement start notice) from the power distribution network estimation device 1, the communication unit 302 transmits the instruction to the control unit 303. In addition, the control unit 303 receives the measurement start notice, and outputs an instruction for opening and closing and an instruction for the measurement of a voltage value to the switch SW1 and the voltage measurement unit 301, respectively. In addition, the instruction for the measurement of a voltage value (measurement start notice) is an instruction used for measuring voltage values produced when the switch SW1 is opened and closed. In addition, the control unit 303 acquires the result of measurement by the voltage measurement unit 301, and generates and transmits a measurement completion notice, used for giving notice of the completion of the measurement, to the power distribution network estimation device 1 through the communication unit 302. The measurement completion notice includes an identifier assigned to each sensor, the voltage values produced when the switch SW1 associated with the identifier is opened and closed, and the like.

The recording unit 304 records therein a program, a table, data, and the like. In addition, for example, the recording unit 304 is a memory such as a read only memory (ROM), a random access memory (RAM), or the like. In addition, the recording unit 304 may record therein data such as a parameter value, a variable value, and the like or may be used as a work area. In the example, measurement results and the like are recorded in the recording unit 304.

Figure 3B:
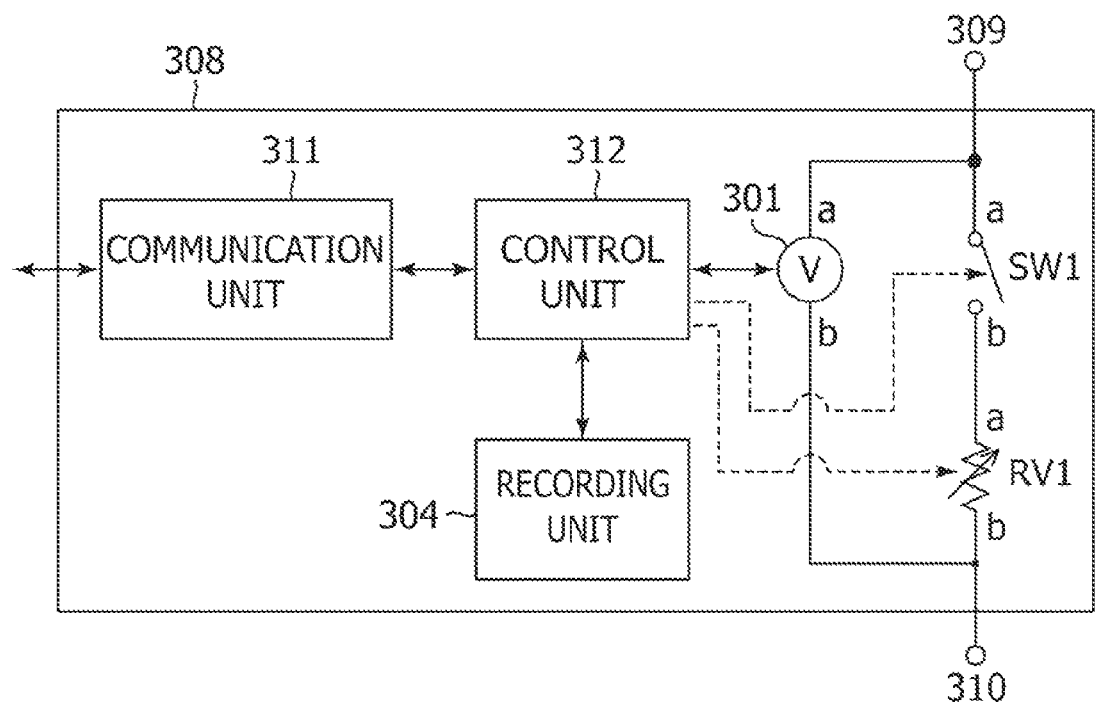
FIG. 3B is a diagram illustrating an embodiment of a sensor that includes a switch and a variable resistance.

FIG. 3B is a block diagram illustrating an example of a sensor that includes a variable resistance. As illustrated in FIG. 3B, a sensor 308 includes therein a variable resistance RV1, and the sensor 308 measures a voltage value produced when the resistance value of the variable resistance RV1 is changed. In addition, while the sensor 308 includes the variable resistance RV1 in FIG. 3B, a fixed resistance RV1 may be used in place of the variable resistance RV1. The sensor 308 includes a switch SW1, a variable resistance RV1, a voltage measurement unit 301, a communication unit 302, a control unit 303, a recording unit 304, and connection terminals 309 and 310. The b-side terminal of the switch SW1 is connected to the a-side terminal of the variable resistance RV1, and the connection terminal 309 is connected to a terminal used for supplying electric power from the power distribution network and an input terminal used for supplying electric power to a load. The connection terminal 310 is connected to the ground terminal of the power distribution network. In addition, the communication unit 311 in the sensor 308 includes the function of the communication unit 302 illustrated in FIG. 3A, and furthermore acquires from the power distribution network estimation device 1 an instruction used for changing the resistance value of the variable resistance RV1. In addition, the communication unit 311 transmits, to the control unit 312 in the sensor 308, the instruction used for changing the resistance value of the variable resistance RV1. The control unit 312 in the sensor 308 includes the function of the control unit 303 illustrated in FIG. 3A, and outputs to the variable resistance RV1 an instruction used for changing the resistance value thereof. In addition, the sensor 308 is not necessarily connected to the load.

A processing operation performed when the sensor 300 or the sensor 308 is powered-on will be described.

First, the administrator of a system that includes the power distribution network estimation device 1 or the owner of the sensor 300 or the sensor 308 powers the sensor 300 or the sensor 308. Next, the sensor 300 or the sensor 308 acquires information (Internet Protocol (IP) address or the like) used for accessing the power distribution network estimation device 1, and records the information in the recording unit 304. Here, the information of the power distribution network estimation device may be manually set by the administrator, or may be set using setting information broadcasted by the power distribution network estimation device 1 to the sensor 300 or the sensor 308. Next, individual functional units in the sensor 300 or the sensor 308 are powered, and the sensor 300 or the sensor 308 is shifted to a state for waiting for a request from the power distribution network estimation device 1.

The power distribution network estimation device 1 will be described. The power distribution network estimation device 1 is powered on by the administrator of the system or the like. Next, the power distribution network estimation device 1 acquires information (IP address or the like) used for accessing the sensor 300 or the sensor 308 that is to be a target of monitoring, and records the information in a power distribution network estimation device information database 1104 described later (refer to FIG. 11). Here, the information used for accessing the information used for accessing the sensor 300 or the sensor 308 may be manually set by the administrator, or information of which the sensor gives notice may be received as the information used for accessing the information used for accessing the sensor 300 or the sensor 308. Next, individual functional units in the power distribution network estimation device 1 are powered, and the power distribution network estimation device 1 is shifted to a state for waiting for requests for the estimation of a system, the estimation of the connection state of a load, and the estimation of electric power consumption in a specific range.

Figure 4:
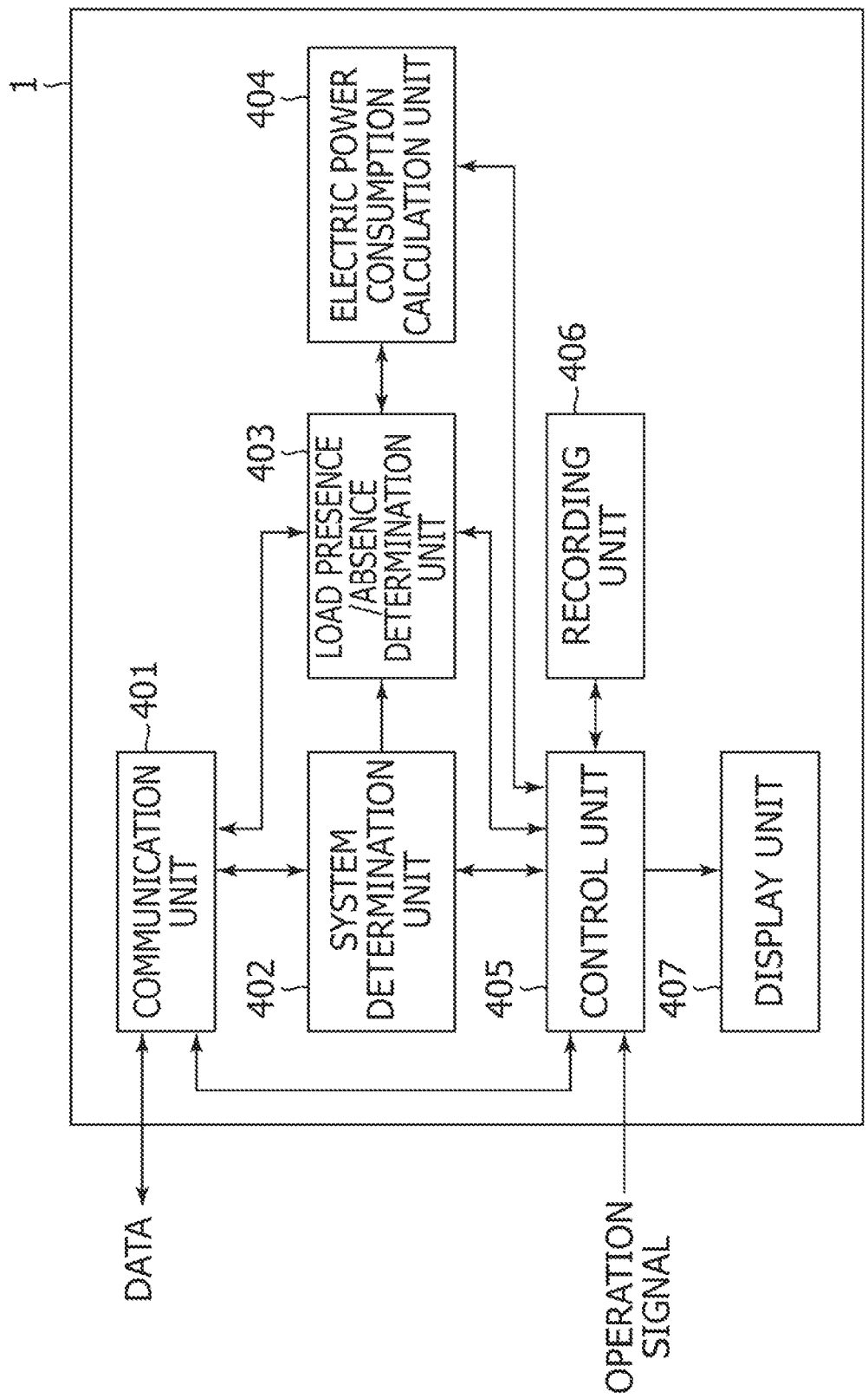
FIG. 4 is a diagram illustrating an embodiment of the power distribution network estimation device.

FIG. 4 is a block diagram illustrating an embodiment of the power distribution network estimation device. The power distribution network estimation device 1 illustrated in FIG. 4 includes a communication unit 401, a system determination unit 402, a load presence/absence determination unit 403, an electric power consumption calculation unit 404, a control unit 405, a recording unit 406, and a display unit 407. For example, with respect to the sensor 300, the communication unit 401 complies with an instruction from the control unit 405, and transmits to the sensor 300 provided in the power distribution network a measurement start notice including information for the opening and closing of the switch SW1 and information for voltage measurement. In this regard, however, in a case in which the communication unit 401 transmits a measurement start notice to a subsequent sensor 300, after confirming the reception of a measurement completion notice from the sensor 300 that is currently a target, which corresponds to the measurement start notice transmitted to the sensor that is currently the target, the communication unit 401 transmits the measurement start notice to the subsequent sensor 300. In addition, the measurement start notice includes an identifier assigned to each sensor 300, information for the opening and closing of the switch SW1 that corresponds to the identifier, and information for voltage measurement. For example, in the case of the power distribution network illustrated in FIG. 2, when the communication unit 401 receives an instruction for starting measurement from the control unit 405, first, the communication unit 401 transmits a measurement start notice to a sensor SV1. In addition, the communication unit 401 confirms the reception of a measurement completion notice from the sensor SV1, and transmits a measurement start notice to a sensor SV2. In this way, the communication unit 401 transmits measurement start notices to sensors SV1 to SV3, and receives measurement completion notices from the sensors SV1 to SV3. In addition, for example, the communication unit 401 outputs information such as voltage values, measured by the sensor 300 provided in the power distribution network when the switch SW1 is opened and closed, respectively, or the like to the system determination unit 402, the load presence/absence determination unit 403, and the control unit 405 (the communication unit 401 may output the information to the electric power consumption calculation unit 404). In addition, the communication unit 401 may use Internet Protocol (IP) communication such as a local area network (LAN), wireless LAN, power line communications (PLC), or the like. In addition, the communication unit 401 may use serial communication such as Recommended Standard 232C (RS232C) or the like, or may use Near Field Communication that uses infrared light, Bluetooth (registered trademark), ZigBee (registered trademark), or the like.

The system determination unit 402 estimates a system in the power distribution network, using a voltage value measured by a sensor provided for a load in the power distribution network. The load presence/absence determination unit 403 estimates the state of the load in the power distribution network, using the estimation result of the system obtained by the system determination unit 402 and the voltage value measured by the sensor provided for the load in the power distribution network. The electric power consumption calculation unit 404 estimates the state of the electric power consumption of the power distribution network, using the estimation result of the system, the estimation result of the state of the load, and the voltage value measured by the sensor provided for the load in the power distribution network. The control unit 405 controls the communication unit 401, the system determination unit 402, the load presence/absence determination unit 403, the electric power consumption calculation unit 404, the recording unit 406, the display unit 407, and the like. For example, the control unit 405 controls the individual units using a central processing unit (CPU) or a programmable device.

A program, a table, data, and the like are recorded in the recording unit 406. In addition, for example, the recording unit 406 is a memory such as a read only memory (ROM), a random access memory (RAM), a hard disk, or the like. In addition, the recording unit 406 may record therein data such as a parameter value, a variable value, and the like or may be used as a work area. In the example, database and the like are recorded in the recording unit 406. In addition, the details of the system determination unit 402, the load presence/absence determination unit 403, the electric power consumption calculation unit 404, the control unit 405, and the recording unit 406 will be described later.

The display unit 407 is a display or the like, and displays information used for an operation on the screen of the display, in response to an instruction from the control unit 405. For example, the information used for the operation or the like is information used when a user performs the operation of the power distribution network estimation device 1, a setting at the time of measurement, an initial setting, and the like. For example, a signal (operation signal) that indicates information used for an operation or the like input through an arbitrary input not illustrated in FIG. 4 is sent to the display unit 407 through the control unit 405. In addition, the display unit 407 is used when the processing results of the system determination unit 402, the load presence/absence determination unit 403, and the electric power consumption calculation unit 404 are displayed on the screen of the display. The information displayed on the display unit 407 is data acquired from a database recorded in the recording unit 406 or the like.

Figure 5:
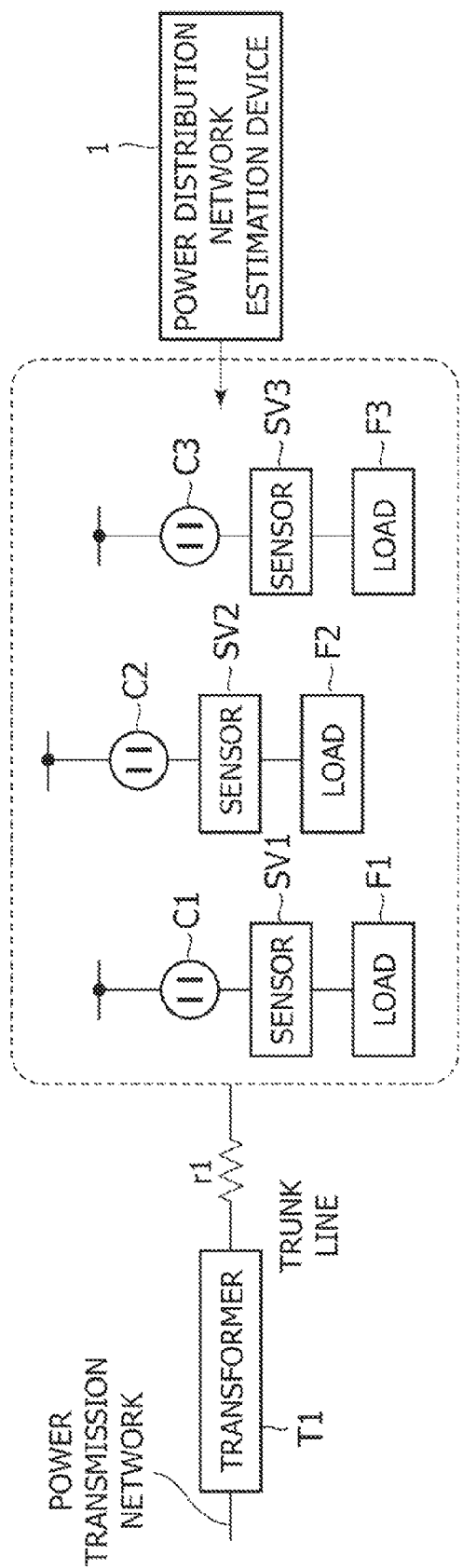
FIG. 5 is a diagram illustrating an embodiment for estimating a system in a power distribution network (a positional relationship is unspecified)
Figure 6:
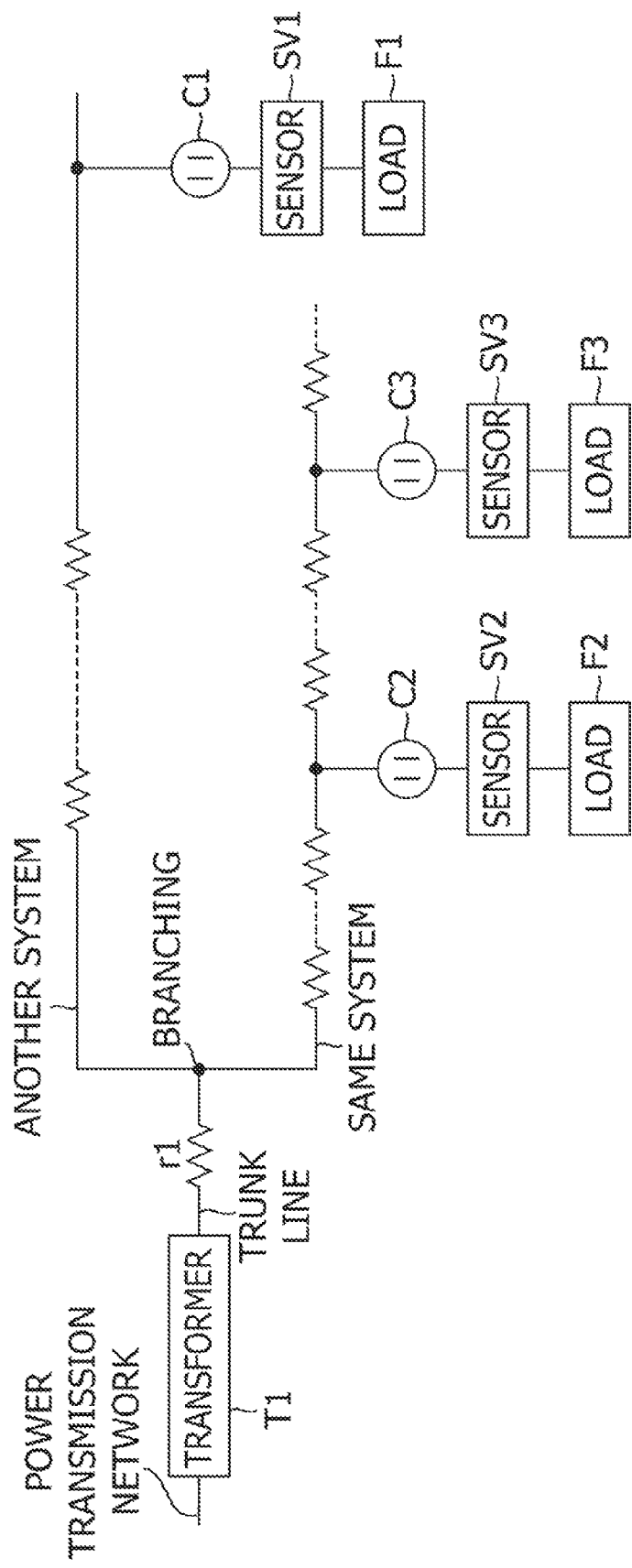
FIG. 6 is a diagram illustrating an embodiment for estimating a system in a power distribution network.

System determination will be described. FIGS. 5 and 6 are diagrams illustrating examples of the system determination. FIG. 5 is a diagram illustrating a sensor group in which a positional relationship between sensors is unknown in the power distribution network. FIG. 6 is a diagram illustrating a system to which sensors belong. First, a system determination unit 402 (not illustrated) in the power distribution network estimation device 1 arbitrarily selects a sensor to be a reference from among the sensor group in which the positions of the sensors are unspecified. Hereinafter, the sensor to be a reference is called a reference sensor. For example, in FIG. 5, a sensor SV2 is selected as the reference sensor. Next, the system determination unit 402 selects one sensor other than the reference sensor. For example, a sensor SV3 in FIG. 5 is selected.

In addition, in the following description, a case in which the sensor 300 illustrated in FIG. 3A is used will be described. In addition, when the sensor 308 illustrated in FIG. 3B is used, the switch SW1 is closed, and the resistance value of the variable resistance RV1 is changed.

Next, the system determination unit 402 instructs two sensors to measure voltage values produced when the switches SW1 are closed, and instructs one sensor that has a higher measured voltage value to open the switch SW1 (a load is separated from the power distribution network). In addition, the reason why one of the two sensors, which has the higher measured voltage value, is located on an upstream side is because a voltage value measured by a sensor connected to the upstream side of a target system is higher than a voltage value measured by a sensor connected to the downstream side of the system if the two sensors belong to the same system. Namely, this is because it is assumed that the voltage value measured by the sensor connected to the downstream side is lower than the voltage value measured by the sensor connected to the upstream side, owing to a voltage drop caused by the conductor resistance of circuit wiring and another load in the same system. In addition, the reason why the sensor located on the upstream side is selected is because it is assumed that the change of the amount of a current flowing into a target load is greater when the switch SW1 in the sensor located on the upstream side is opened and closed. In addition, since the sensor 300 separates the load from the power distribution network, it is assumed that the power source of the load is in a state in which the on-off operation thereof can be performed (a state in which no problem occurs in the on-off operation thereof).

Next, after changing over the switch SW1, the system determination unit 402 instructs the two sensors to measure voltage values. In addition, using the voltage values measured by the sensors, the system determination unit 402 determines whether the two sensors belong to the same system or systems different from each other. For example, in the case illustrated in FIG. 6, it turns out that the sensor SV2 is located on the upstream side, and the sensor SV3 is located on the downstream side.

A method will be described in which it is determined whether the two sensors belong to the same system or systems different from each other.

Figure 7:
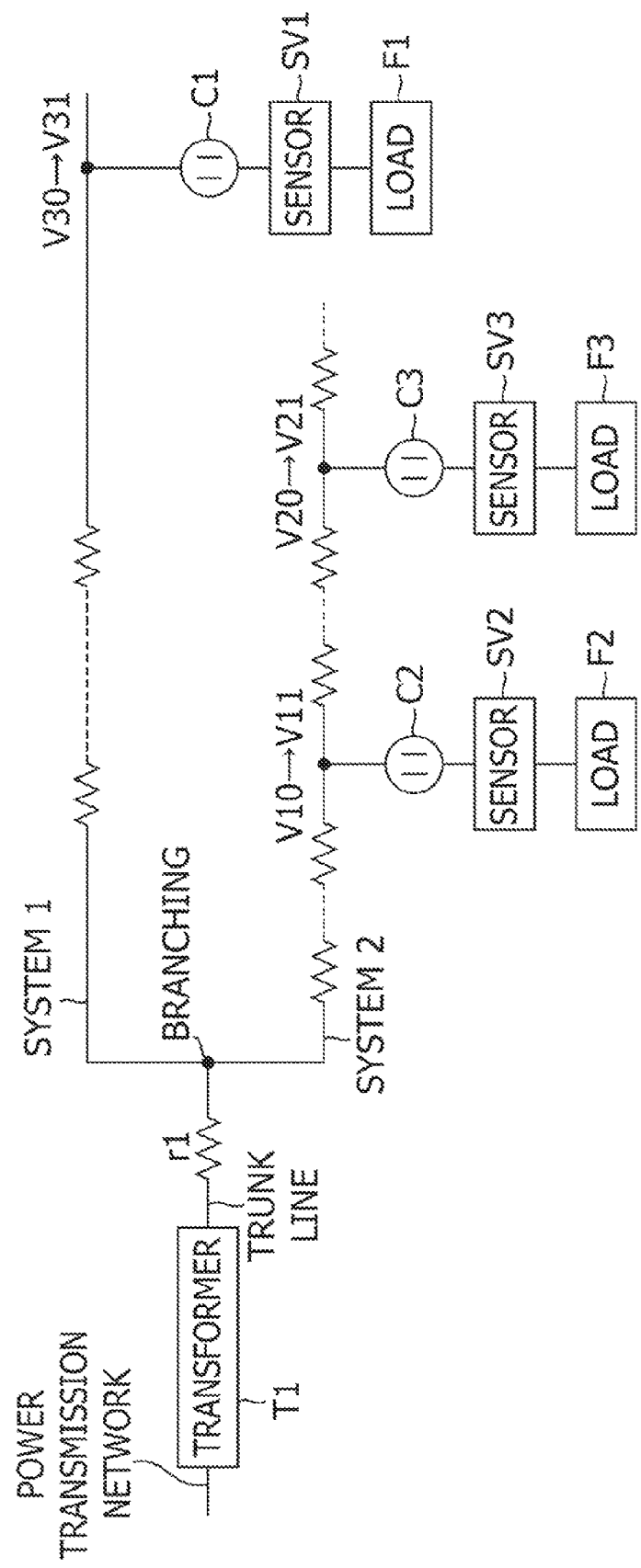
FIG. 7 is a diagram illustrating an embodiment for estimating a system in a power distribution network.

First, on the basis of FIG. 7, the method will be described in which it is determined whether or not the two selected sensors belong to the same system. In FIG. 7, it may be assumed that a voltage value measured when the switch SW1 in the sensor SV2 installed on the upstream side is closed is $V10$, and a voltage value measured when the switch SW1 in the sensor SV2 is opened is $V11$. In addition, it may be assumed that a voltage value measured when the switch SW1 in the sensor SV3 installed on the downstream side is closed is $V20$, and a voltage value measured when the switch SW1 in the sensor SV3 is opened is $V21$. In addition, when there is a relationship $V10<V20$ between the measured voltage value $V10$ and the measured voltage value $V20$, and a relationship $V10/V20 \approx V11/V21$ is satisfied, it is determined that the two sensors belong to the same system. Alternatively, when a relationship $V10/V11 \approx V20/V21$ is satisfied, it may be determined that the two sensors belong to the same system.

Next, on the basis of FIG. 7, a method will be described in which it is determined whether or not the two selected sensors belong to systems different from each other, respectively. Even if the two sensors belong to systems different from each other, respectively, voltage values measured when switches SW1 in the two sensors are closed are compared with each other, and hence the switch SW1 in the sensor having a higher measured voltage value is opened and closed. In FIG. 7, it is assumed that a voltage value measured when the switch SW1 in the sensor SV2 is closed is $V10$, and a voltage value measured when the switch SW1 in the sensor SV1 is closed is $V30$. In addition, it is assumed that a relationship $V10>V30$ is satisfied. In addition, it is assumed that a voltage value measured when the switch SW1 in the sensor SV1 is opened is $V31$. At this time, when a relationship $V10/V30 \neq V11/V31$ is satisfied between the measured voltage value $V10$ and the measured voltage value $V30$, it can be determined that the two sensors belong to systems different from each other, respectively. Alternatively, when a relationship $V10/V11 \neq V30/V31$ is satisfied, it may be determined that the two sensors belong to systems different from each other, respectively.

The reason why a positional relationship between sensors can be estimated will be described hereinafter.

Figure 8:
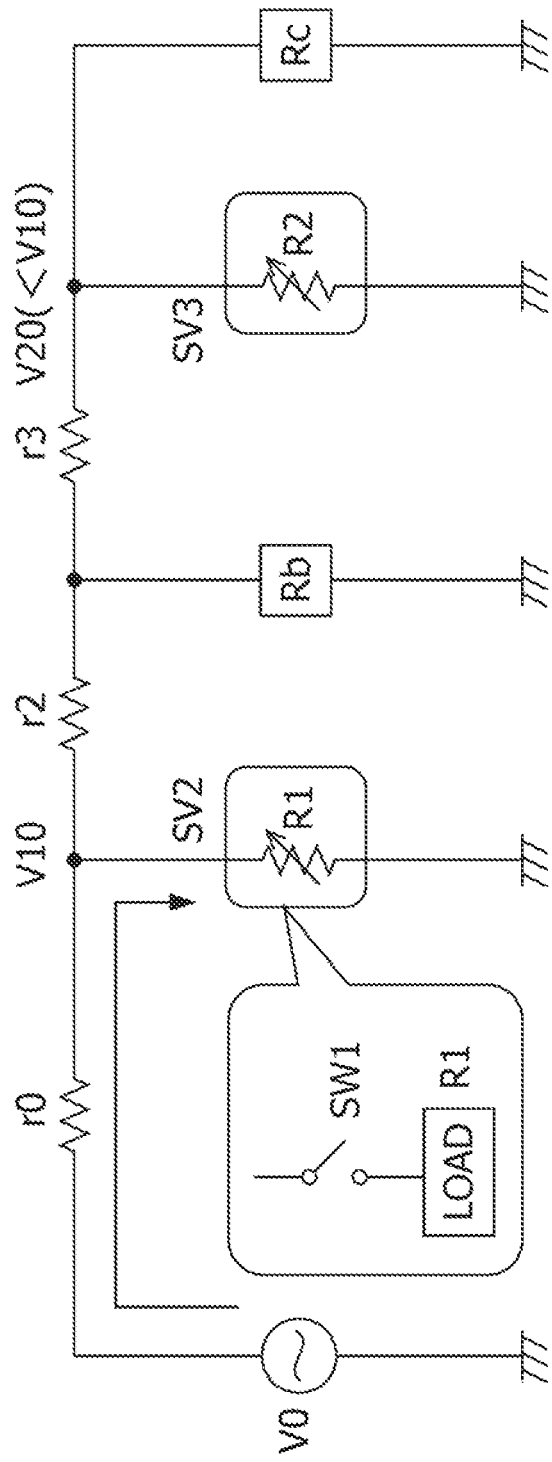
FIG. 8 is a substantially equivalent circuit illustrating an embodiment for estimating a positional relationship between sensors.
Figure 9:
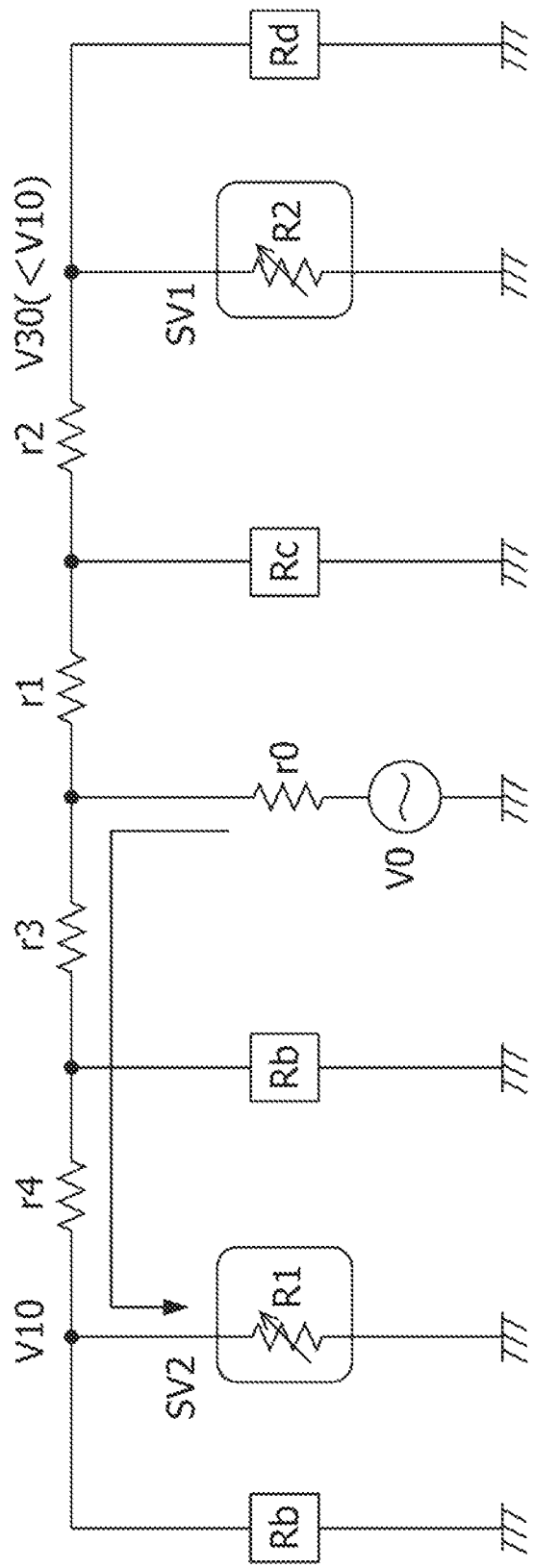
FIG. 9 is a substantially equivalent circuit illustrating an embodiment for estimating a positional relationship between sensors.
Figure 10:
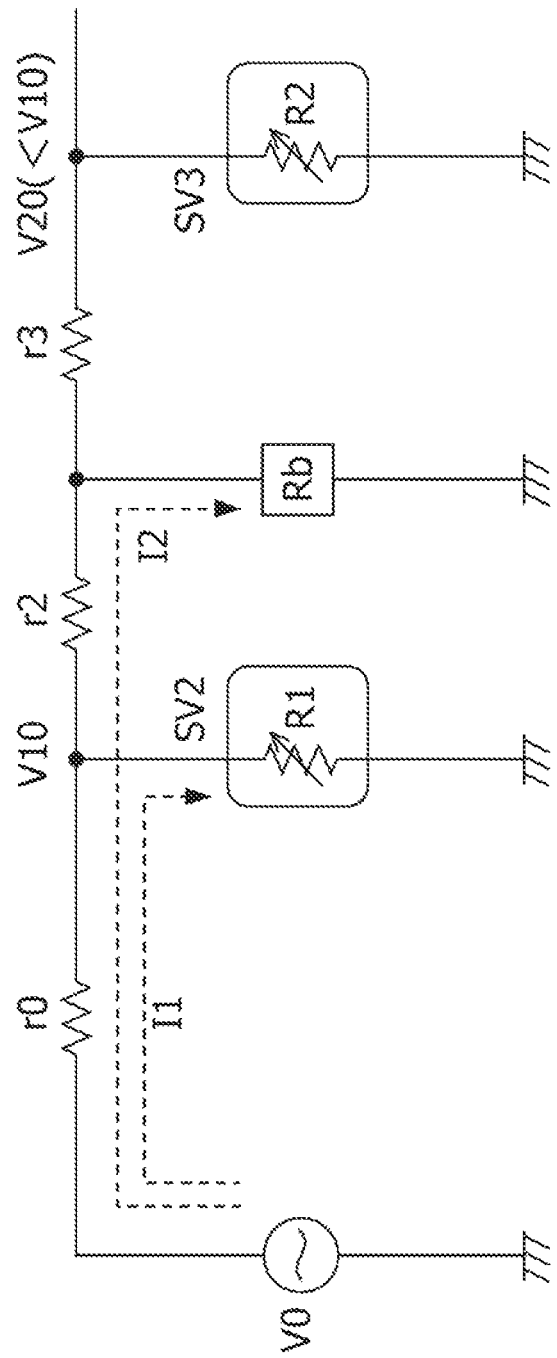
FIG. 10 is a substantially equivalent circuit illustrating an embodiment for estimating a positional relationship between sensors.

In circuits illustrated in FIGS. 8, 9, and 10, resistances Ra, Rb, Rc, and Rd indicate loads to which no sensor is connected. Resistances r0, r1, r2, r3, and r4 indicate the conductor resistances of circuit wiring. A resistance value R1 is the resistance value of the sensor SV2 that has a higher measured voltage value, and a resistance value R2 is the resistance value of the sensor SV3 when the sensor SV3 belongs to the same system. When the sensor SV3 belongs to a different system, the resistance value R2 is the resistance value of the sensor SV1.

First, when it is assumed that two sensors are connected to the same system in a power distribution network, the equivalent circuit of the power distribution network that includes the two sensors turns out to be a circuit illustrated in FIG. 8. In the equivalent circuit, the voltage value V10 of the sensor SV2 and the voltage value V20 of the sensor SV3 are expressed as follows.

$$V10 = \frac{R1//(r2 + Rb//(r3 + R2//Rc))}{r0 + R1//\{r2 + Rb//(r3 + R2//Rc)\}} V0$$ [Expression 1]

$$V20 = \frac{(R2//Rc)\{Rb//(r3 + R2//Rc)\}}{(r3 + R2//Rc)\{r2 + Rb//(r3 + R2//Rc)\}} V10$$

On the basis of Expression 1, a ratio between voltage values measured by the two sensors are expressed as follows.

$$\frac{V10}{V20} = \frac{A1 + \frac{A2}{R2}}{A3}$$ [Expression 2]

$$A1 = (Rb + r2)(Rc + r3) + Rbr2$$

$$A2 = Rc\{r3(Rb + r2) + Rbr2\}$$

$$A3 = RbRc$$

On the basis of Expression 2, it turns out that the resistance value R1 of the sensor SV2 is not included in the expression of the ratio between voltage values measured by the two sensors. Therefore, when the two sensors belong to the same system, the relationship V10/V20≈V11/V21 (or, V10/V11≈V20/V21) is satisfied.

In addition, when it is assumed that the two sensors belong to systems different from each other, respectively, the equivalent circuit of the power distribution network that includes the two sensors turns out to be a circuit illustrated in FIG. 9. In the equivalent circuit, the voltage value V10 of the sensor SV2 and the voltage value V30 of the sensor SV1 are expressed as follows.

$$V10 = \frac{R1//Ra}{r4 + R1//Ra} \cdot \frac{Rb//(r4 + R1//Ra)}{z1} \cdot \frac{z1//z2}{r0 + z1//z2} V0$$ [Expression 3]

$$V30 = \frac{R2//Rd}{r2 + R2//Rd} \cdot \frac{Rc//(r2 + R2//Rd)}{z2} \cdot \frac{z1//z2}{r0 + z1//z2} V0$$

$$z1 = r3 + Rb//(r4 + R1//Ra)$$

$$z2 = r1 + Rc//(r2 + R2//Rd)$$

On the basis of Expression 3, a ratio between voltage values measured by the two sensors are expressed as follows.

$$\frac{V10}{V30} = \frac{\left(\frac{r1r2}{Rc} + r1 + r2\right)\left(\frac{1}{R2} + \frac{1}{Rd}\right) + \frac{r1}{Rc} + 1}{\left(\frac{r3r4}{Rb} + r3 + r4\right)\left(\frac{1}{R1} + \frac{1}{Ra}\right) + \frac{r3}{Rb} + 1}$$ [Expression 4]

On the basis of Expression 4, it turns out that the resistance value R1 of the sensor SV2 is included in the expression of the ratio between voltage values measured by the two sensors. Therefore, when the two sensors belong to systems different from each other, respectively, the relationship V10/V30≠V11/V31 (or, V10/V11≠V30/V31) is satisfied.

Accordingly, using voltage values measured by the two sensors before and after the power distribution network esti-mation device 1 separates the load of a sensor that has a higher measured voltage value from the power distribution network, a positional relationship (in the same system or in different systems) between the two sensors can be estimated. In addition, in order to realize the determination method described above, it is desirable for the measurement error of the voltage measurement unit 301 to be less than or equal to 0.25%. In addition, for example, when the voltage measurement unit 301 the estimation error of which is greater than or equal to 0.25% is used, the positional relationship between the two sensors can be estimated by averaging a plurality of measurement results.

In addition, when the power distribution network estimation device 1 estimates the positional relationship between the sensors, with respect to the cause of the change of a voltage value, a distinction is made whether the voltage value is changed owing to the change of a resistance value caused by a load to which a sensor is connected, or the amount of electric power consumption is changed owing to a load to which no sensor is connected. For example, when the load to which no sensor is connected is an air conditioner, it is assumed that the amount of a current flowing into a load to which a sensor is connected is changed owing to the power-on of the air conditioner. As illustrated in FIG. 10, when a load Rb to which no sensor is connected does not operate, a current I1 flows into the sensor SV2. On the other hand, when the load Rb operates, the current I1 and a current I2 flow into the sensor SV2, and hence a voltage value measured by the sensor SV2 is affected. Namely, in response to the operating condition of a load to which no sensor is connected, the above-mentioned processing operation in which it is determined whether sensors belong to the same system or the systems different from each other turns out to be affected. Therefore, the operating condition of a load is considered. In this regard, however, when a load to which no sensor is connected is not frequently turned on and off, the operating condition of a load may not be considered.

The control of a sensor, performed in a system determination operation, will be described.

Figure 11:
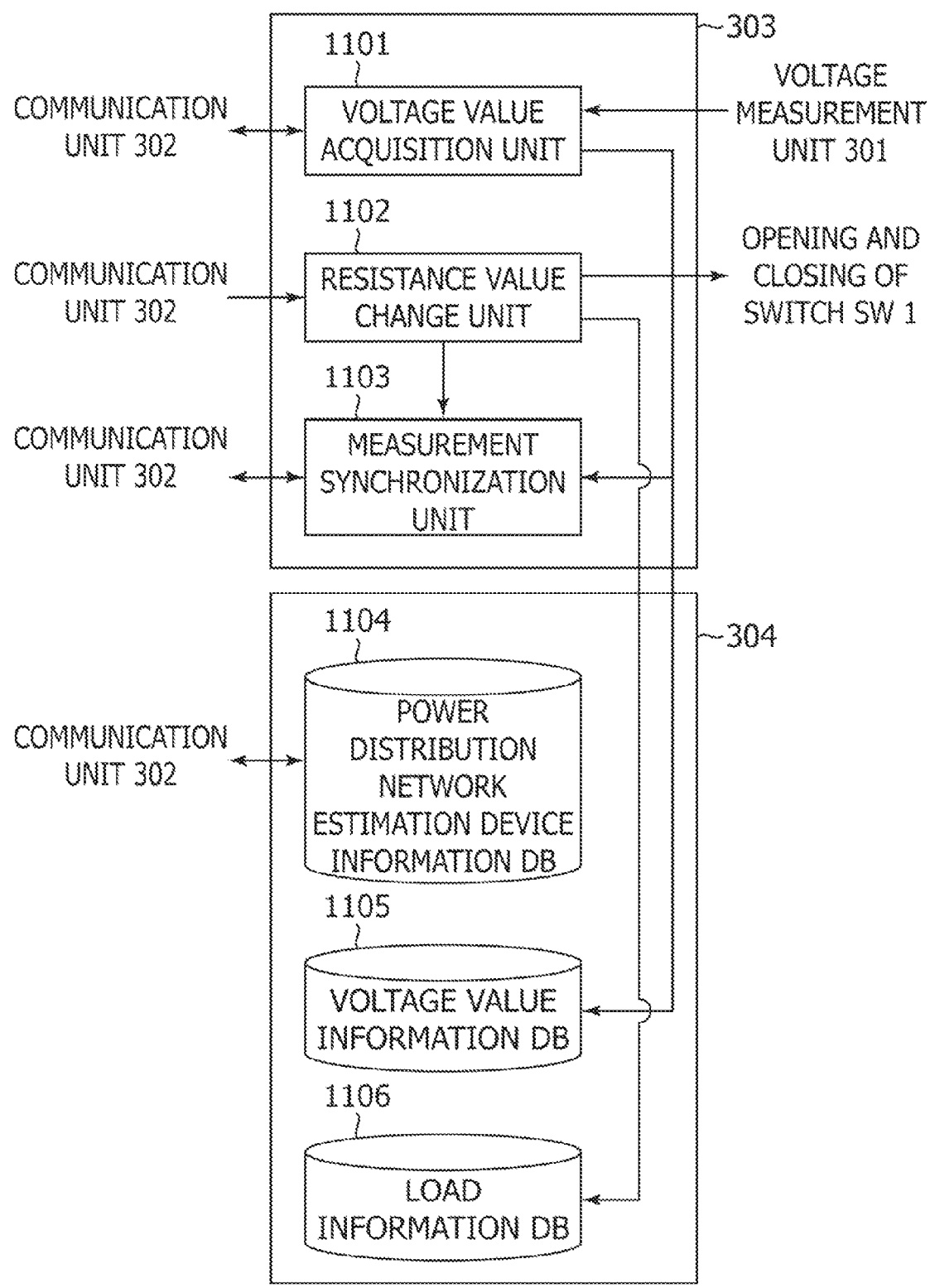
FIG. 11 is a diagram illustrating embodiments of a sensor and a recording unit.

FIG. 11 is a diagram illustrating an example of the control unit 303 in a sensor. The control unit 303 includes a voltage value acquisition unit 1101, a resistance value change unit 1102, and a measurement synchronization unit 1103.

Figure 12:
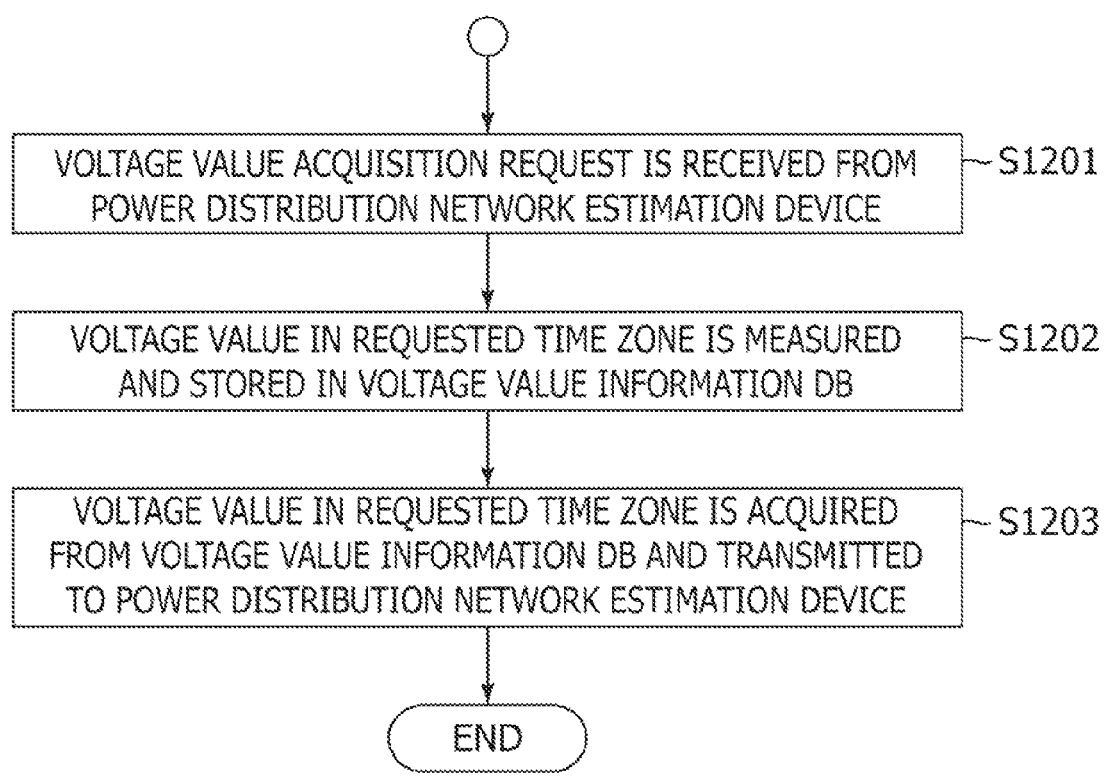
FIG. 12 is a flowchart illustrating an embodiment of an operation performed in a voltage value acquisition unit.

The voltage value acquisition unit 1101 acquires the voltage value of a position to which a sensor is connected, on the basis of a request from the power distribution network estimation device 1, and sends back the measurement result to the power distribution network estimation device 1 through the communication unit 302. An operation performed in the voltage value acquisition unit 1101 will be described with reference to FIG. 12. FIG. 12 is a flowchart illustrating an example of the operation performed in the voltage value acquisition unit 1101. In S1201, the voltage value acquisition unit 1101 receives from the power distribution network estimation device 1 a measurement request (voltage value acquisition request) for measuring the voltage value of a position to which a sensor is connected. The voltage value acquisition request includes information of a time and date, at which the power distribution network estimation device 1 measures a voltage value, and a time period, during which the power distribution network estimation device 1 measures a voltage value.

In S1202, the voltage value acquisition unit 1101 measures a voltage value at the requested time and date and during the requested time period, and adds a time stamp to the measurement result to record the measurement result in a voltage value information database 1105 (voltage value information DB). In addition, in addition to the voltage measurement performed at the requested time and date, the voltage value acquisition unit 1101 may constantly measure and record a voltage value in the voltage value information database 1105. The voltage value information database 1105 will be described later.

In S1203, the voltage value acquisition unit 1101 acquires from the voltage value information database 1105 the measurement result for the time and date and the time period, requested from the power distribution network estimation device 1, and sends back the measurement result to the power distribution network estimation device 1. In addition, while a processing operation in which a voltage value at the specified time and date is measured is described in the flowchart mentioned above, two times and dates may be specified and a ratio between voltage values measured at individual times and dates may be calculated and sent back to the power distribution network estimation device 1.

Figure 13:
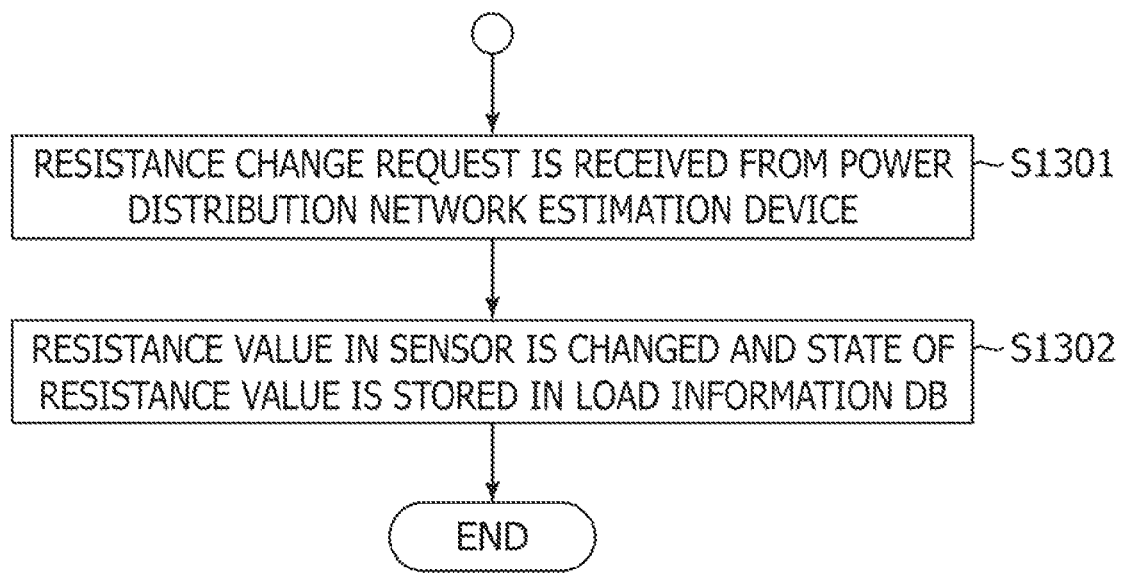
FIG. 13 is a flowchart illustrating an embodiment of an operation performed in a resistance value change unit.

On the basis of a request from the power distribution network estimation device 1, the resistance value change unit 1102 separates a load from the power distribution network, and performs a processing operation for changing a voltage value to be measured by a sensor. FIG. 13 is a flowchart illustrating an example of an operation performed in the resistance value change unit 1102. In S1301, the resistance value change unit 1102 receives from the power distribution network estimation device 1 a change request (resistance change request) for changing the resistance value of the sensor. The resistance change request includes information of a change method for a resistance value and information of a time and date, at which the resistance value is changed, and a time period, during which the resistance value is changed. For example, the change method indicated in the resistance change request is a method for opening the switch SW1 in the sensor 300 and separating a load from the power distribution network, a method for changing the resistance value of the variable resistance RV1 in the sensor 308, or the like.

In S1302, the resistance value change unit 1102 changes the resistance value at the requested time and date and during the requested time period, using the requested method, and records the state of the resistance value in the load information database 1106 (load information DB). The load information database 1106 will be described later.

Figure 14:
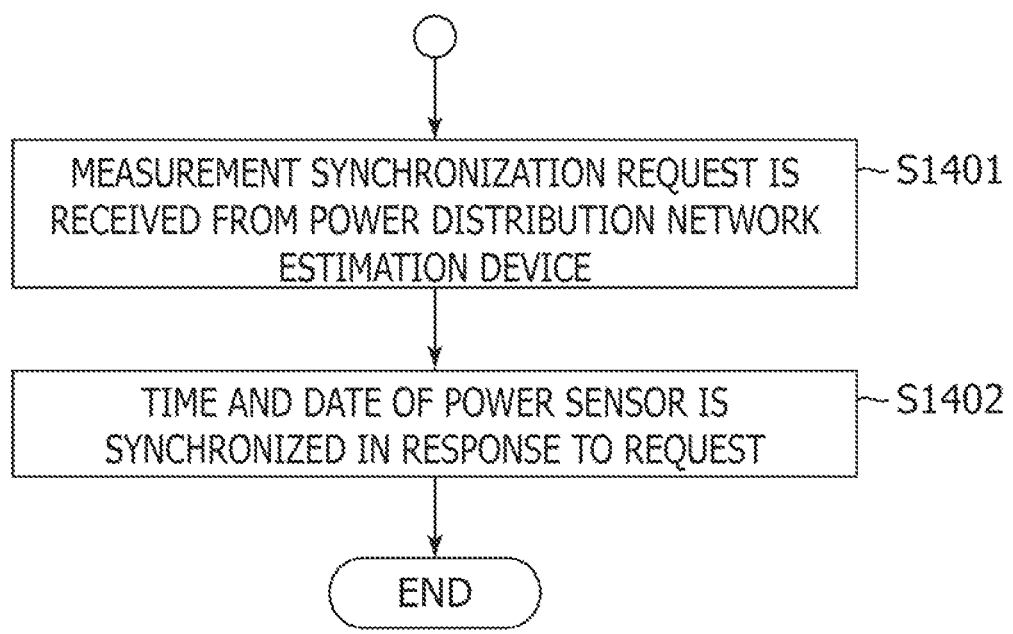
FIG. 14 is a flowchart illustrating an embodiment of an operation performed in a measurement synchronization unit.

On the basis of a request from the power distribution network estimation device 1, the measurement synchronization unit 1103 assists to extract the change of a voltage value due to the change of a resistance value in the sensor. In addition, on the basis of a request from the power distribution network estimation device 1, the measurement synchronization unit 1103 causes a clock to be correctly synchronized. FIG. 14 is a flowchart illustrating an example of an operation performed in the measurement synchronization unit 1103.

In S1401, the measurement synchronization unit 1103 receives a synchronization request for a time and date from the power distribution network estimation device 1.

In S1402, the measurement synchronization unit 1103 synchronizes the clock thereof with a correct time and date, using a global positioning system (GPS) or the like.

In addition, when the sensor itself periodically changes the resistance value of a load, and extracts a voltage value, which changes with the same interval as that of the resistance value, from the voltage value information database 1105, the processing operation performed in the measurement synchronization unit 1103 in the sensor may not be performed.

FIGS. 15A to 15C are diagrams illustrating examples of the structures of the power distribution network estimation device information database 1104, the voltage value information database 1105, and the load information database 1106, recorded in the recording unit 304 in the sensor 300. Information used for communicating with the power distribution network estimation device 1, or the like is recorded in the power distribution network estimation device information database 1104, and in the example illustrated in FIG. 15A, as an example of information used for communication, "A.B.C.D0" is recorded in "communication interface information". A voltage value measured by the sensor and a time and data at which the sensor measured the voltage value are recorded in the voltage value information database 1105. In the example illustrated in FIG. 15B, in the voltage value information database 1105, "2009/7/12 12:23:45", "2009/7/12 12:23:46" . . . are recorded in "time and date", and "99.24", "98.89" . . . are recorded in "voltage value". The state of a load is recorded in the load information database 1106. In the example illustrated in FIG. 15C, the condition of a load is recorded in "load state" in the load information database 1106. In the present example, "ON" indicating that a load is connected to the power distribution network is recorded in the "load state". In addition, when no load is connected to the power distribution network, "OFF" is recorded in the "load state". In addition, when the sensor 308 illustrated in FIG. 3B is used, a current resistance value may be recorded as load information. In addition, the "load state" may be recorded, being associated with "time and data" and "voltage value" in the voltage value information database 1105.

A control operation in the power distribution network estimation device 1, performed for system determination, will be described.

Figure 16:
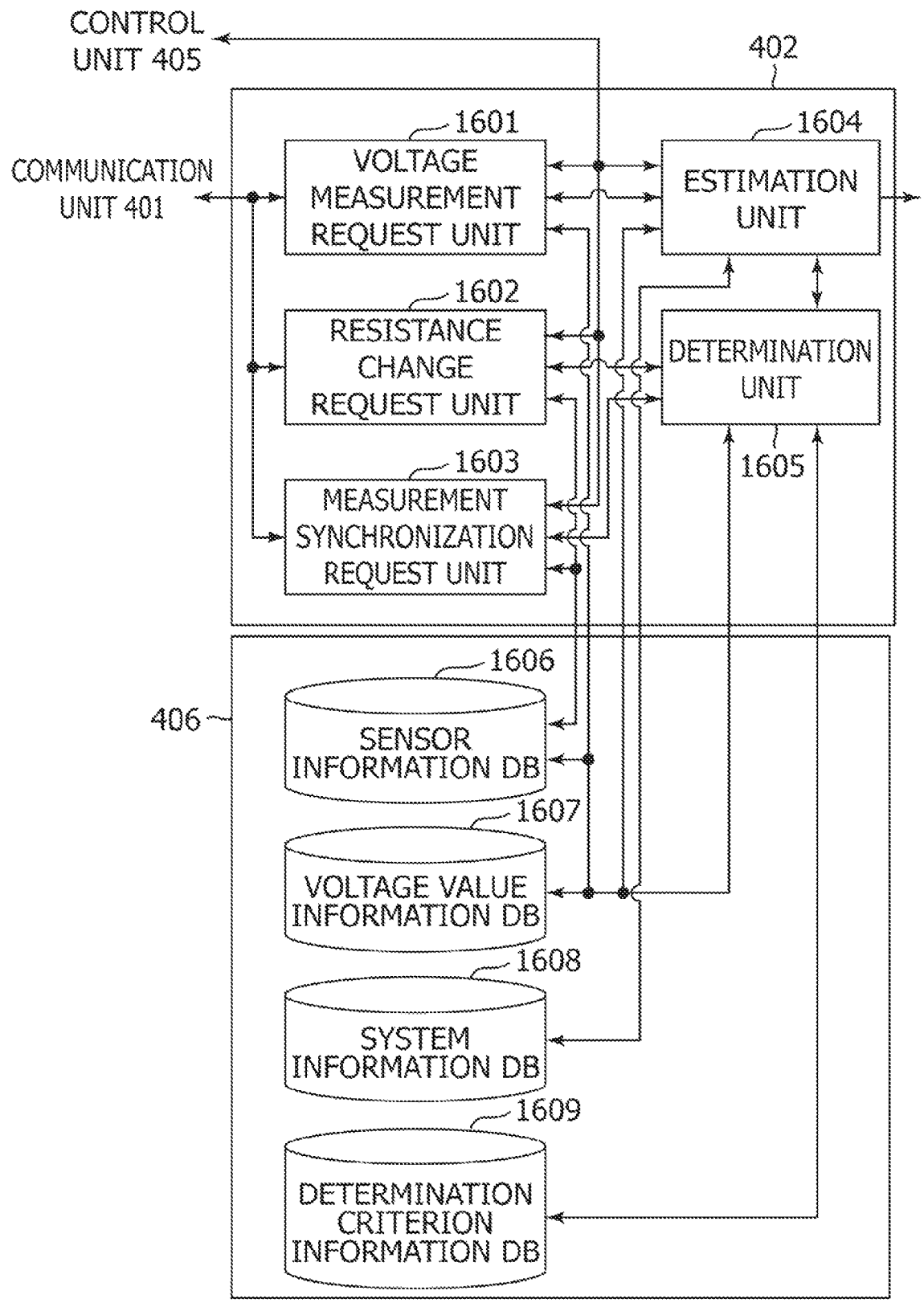
FIG. 16 is a diagram illustrating an embodiment of a system determination unit.
Figure 17:
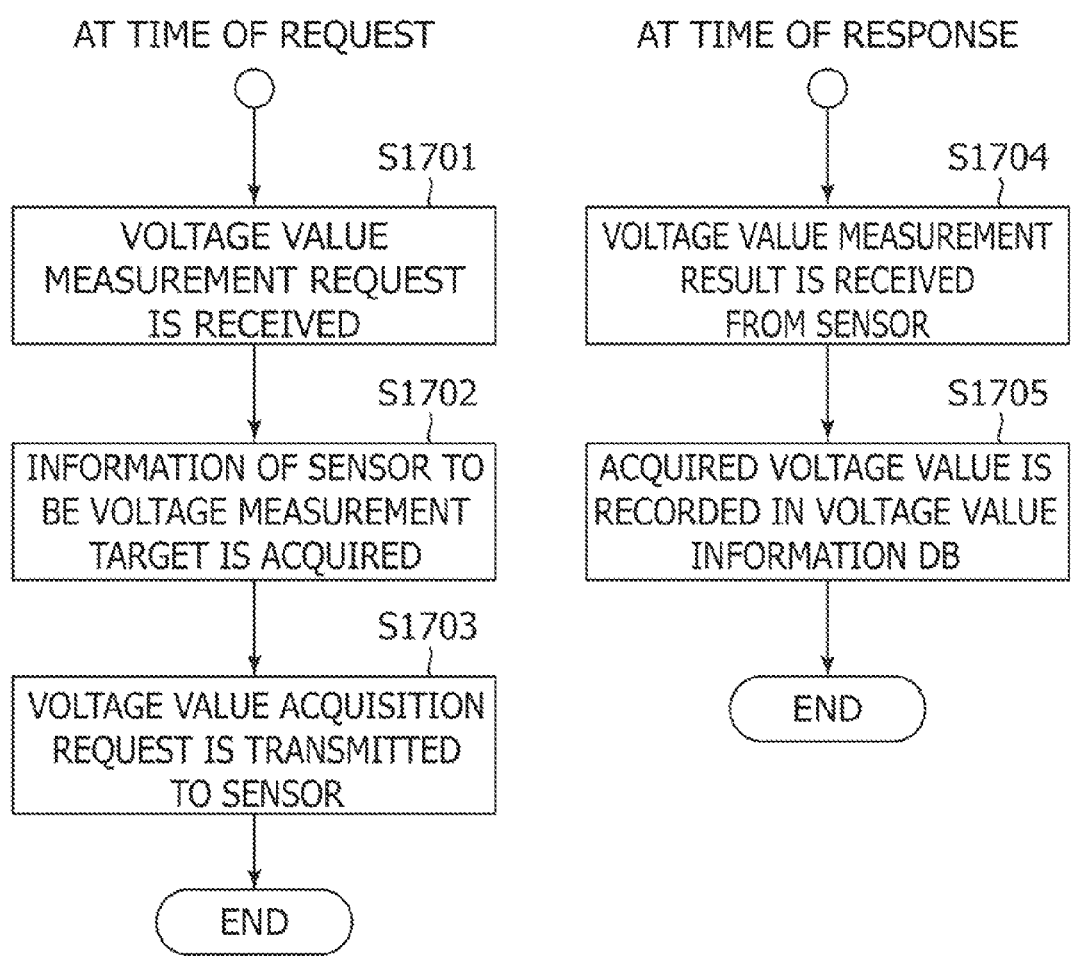
FIG. 17 is a diagram illustrating an embodiment of an operation performed in a voltage measurement request unit.

FIG. 16 is a diagram illustrating examples of the system determination unit 402 and the recording unit 406 in the power distribution network estimation device 1. The system determination unit 402 includes a voltage measurement request unit 1601, a resistance change request unit 1602, a measurement synchronization request unit 1603, an estimation unit 1604, and a determination unit 1605. The voltage measurement request unit 1601 instructs each sensor to measure a voltage value, and acquires the measurement result from each sensor. A processing operation performed when the voltage measurement request unit 1601 receives a measurement request for a voltage value will be described on the basis of a flowchart illustrated in FIG. 17. In S1701, the voltage measurement request unit 1601 receives a measurement request for a voltage value, which is to be made to a sensor, from the control unit 405 in the power distribution network estimation device 1. The request includes information relating to the identifier of a sensor that the voltage measurement request unit 1601 requests to measure a voltage value, a time and date, at which the voltage value is to be measured, and a time period, during which the voltage value is to be measured.

In S1702, the voltage measurement request unit 1601 searches the sensor information database 1606 (sensor information DB), and acquires information for accessing a sensor to be instructed to measure a voltage value. The sensor information database 1606 will be described later.

In S1703, the voltage measurement request unit 1601 transmits a measurement request for a voltage value to the sensor the information for access to which is obtained in S1702. The request includes information of a time and date, at which the voltage value is to be measured, and a time period, during which the voltage value is to be measured.

Next, a processing operation performed when the voltage measurement request unit 1601 receives the measurement result of a voltage value from the sensor will be described. In S1704, the voltage measurement request unit 1601 receives the measurement result of a voltage value from the sensor. In S1705, the voltage measurement request unit 1601 records the measurement result of a voltage value, received from the sensor, in the voltage value information database 1607 (voltage value information DB). The voltage value information database 1607 will be described later.

Figure 18:
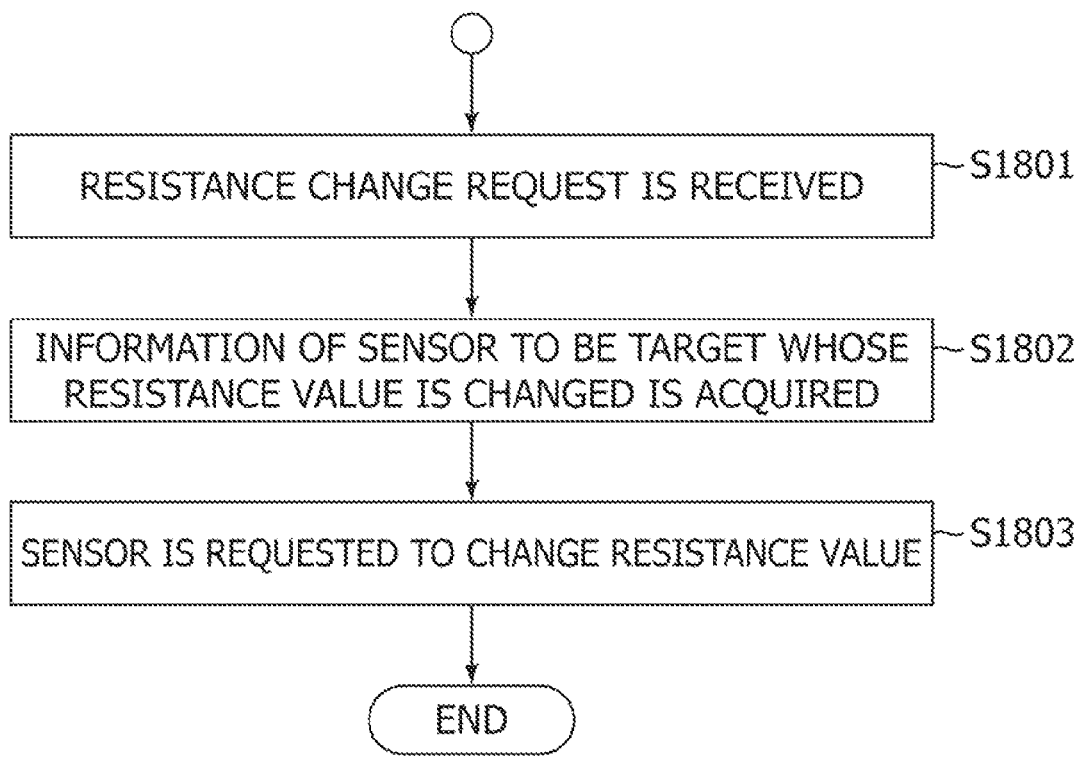
FIG. 18 is a diagram illustrating an embodiment of an operation performed in a resistance change request unit.

The resistance change request unit 1602 requests each sensor to change over the switch SW1 in the sensor or to change the resistance value of the variable resistance RV1. A processing operation performed in the resistance change request unit 1602 will be described on the basis of a flowchart illustrated in FIG. 18. In S1801, the resistance change request unit 1602 receives a change request for changing over the switch SW1 in a sensor or changing the resistance value of the variable resistance RV1 from the control unit 405. The request includes information relating to the identifier of a sensor that the resistance change request unit 1602 requests to change a resistance value, a method for changing the switch SW1 or changing the resistance value of the variable resistance RV1, a time and date, at which the resistance value is to be changed, and a time period, during which the resistance value is to be changed.

In S1802, the resistance change request unit 1602 searches the sensor information database 1606, and acquires information for accessing a sensor to be instructed to change over the switch SW1 or to change the resistance value of the variable resistance RV1.

In S1803, the resistance change request unit 1602 transmits a resistance change request to the sensor the information for access to which is acquired in S1802. The request includes information relating to a method for changing the switch SW1 or changing the resistance value of the variable resistance RV1, a time and date, at which the resistance value is to be changed, and a time period, during which the resistance value is to be changed.

Next, when the power distribution network estimation device 1 estimates the positional relationship between the sensors, a distinction is made whether the cause of the change of a voltage value measured by the sensor is based on the sensor or the change of the amount of electric power consumption due to a load to which no sensor is connected.

Figure 19:
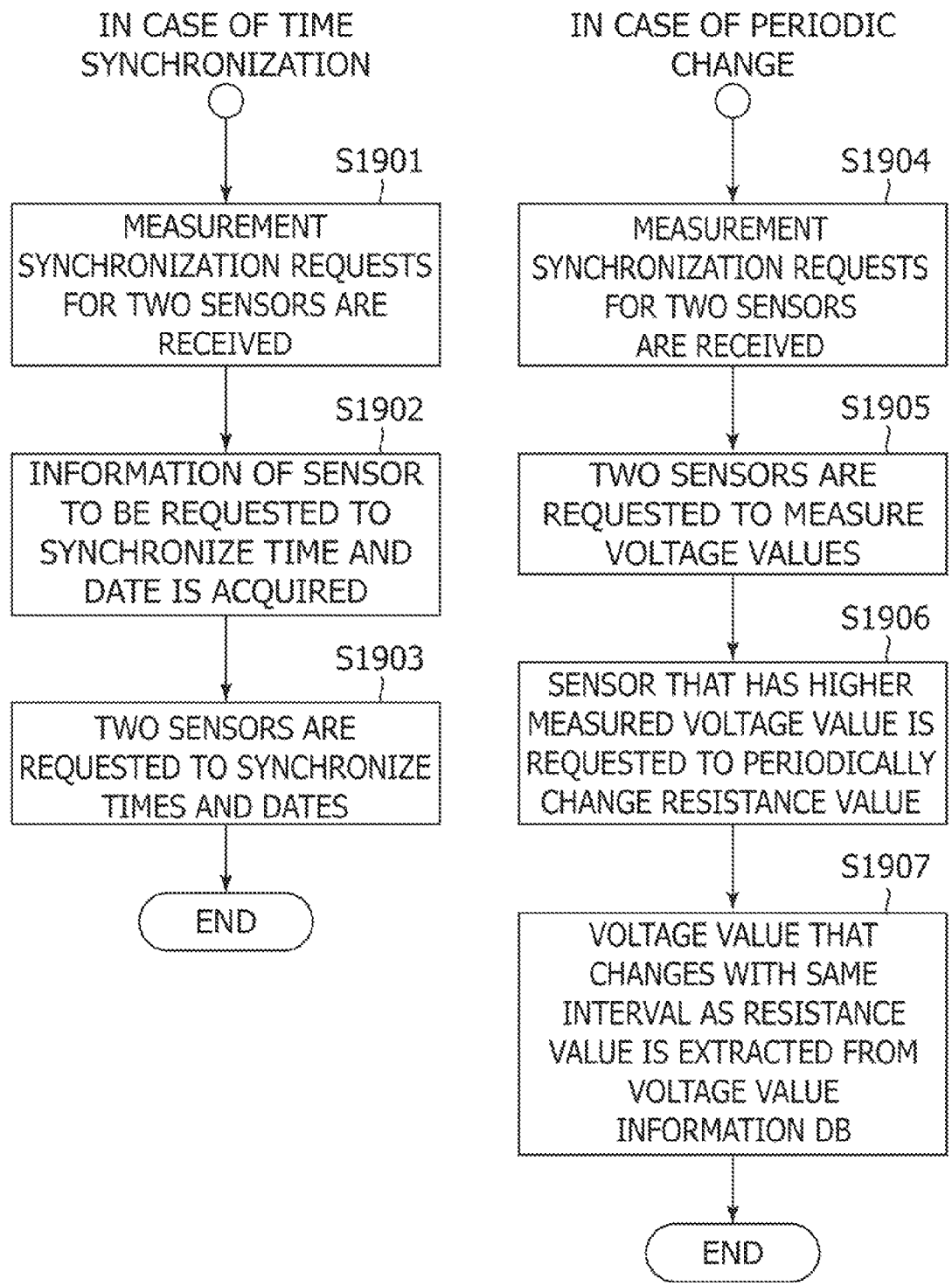
FIG. 19 is a diagram illustrating an embodiment of an operation performed in a measurement synchronization request unit.

The measurement synchronization request unit 1603 requests each sensor to assist to extract the change of a voltage value due to the changeover of the switch SW1 in the sensor or the change of the resistance value of the variable resistance RV. A processing operation performed in the measurement synchronization request unit 1603 will be described on the basis of a flowchart illustrated in FIG. 19. First, the procedure of an operation in which the measurement synchronization request unit 1603 requests a sensor to synchronize a clock to a time will be described. In S1901, the measurement synchronization request unit 1603 receives from the control unit 405 a request for synchronizing a time and date of a clock or the like included in the measurement synchronization unit 1103 in the sensor. The request includes the identifier of the sensor to be requested to synchronize a time and date.

In S1902, the measurement synchronization request unit 1603 searches the sensor information database 1606, and acquires information for accessing two sensors to be instructed to synchronize clocks thereof to a time.

In S1903, the measurement synchronization request unit 1603 transmits requests for synchronizing the clocks to the sensors the information for access to which is acquired in S1902. Next, a request processing operation will be described that is performed so that the measurement synchronization request unit 1603 changes over the switch SW1 or changes the resistance value of the variable resistance RV1, changes voltage values with a specified interval, and extracts voltage values that change with substantially the same interval from among the measurement results of voltage values.

When the synchronization method described above is used, the voltage measurement request unit 1601 and the resistance change request unit 1602 output no request, and the switch SW1 is changed over or the resistance value of the variable resistance RV1 is changed, through the measurement synchronization request unit 1603.

In S1904, the measurement synchronization request unit 1603 receives a request for extracting the change of a voltage value, which is to be made to a sensor, from the control unit 405 in the power distribution network estimation device 1. The request includes information of the identifier of a sensor to be the target of the request.

In S1905, the measurement synchronization request unit 1603 makes a request for acquiring a voltage value, which is to be made to a sensor, to the voltage measurement request unit 1601. The request includes information of a sensor that measures the voltage value and information of a measurement period for the voltage value. After that, a voltage value during the measurement period, acquired from the target sensor, is recorded in the voltage value information database 1607 in the power distribution network estimation device 1.

In S1906, the measurement synchronization request unit 1603 makes a request to the resistance change request unit 1602 so that a sensor having a higher measured voltage value (a sensor guessed to be located on the upstream side) from among sensors is caused to periodically change over the switch SW1 or periodically change the resistance value of the variable resistance RV1. The request includes information relating to the identifier of the target sensor, an interval during which the switch SW1 is changed over or the resistance value of the variable resistance RV1 is changed, and a time period during which a voltage value is to be periodically changed.

In S1907, from among the items of individual sensors in the voltage value information database 1607, the measurement synchronization request unit 1603 extracts a voltage value that changes with substantially the same interval as the interval during which the switch SW1 in the sensor is changed over or the resistance value of the variable resistance RV1 in the sensor is changed.

The determination unit 1605 will be described.

Figure 20:
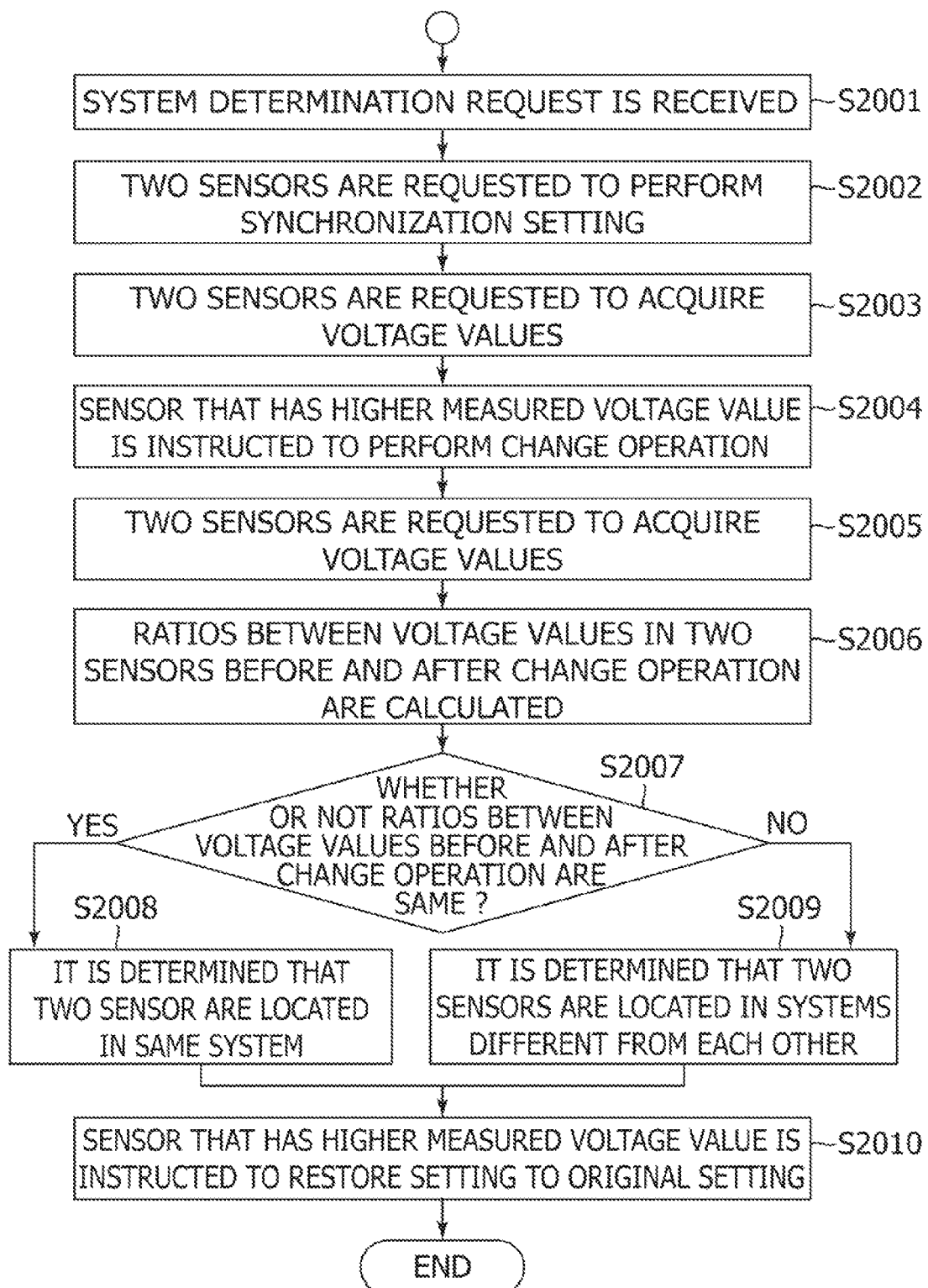
FIG. 20 is a flowchart illustrating an embodiment of an operation for determining a positional relationship between sensors.
Figure 21:
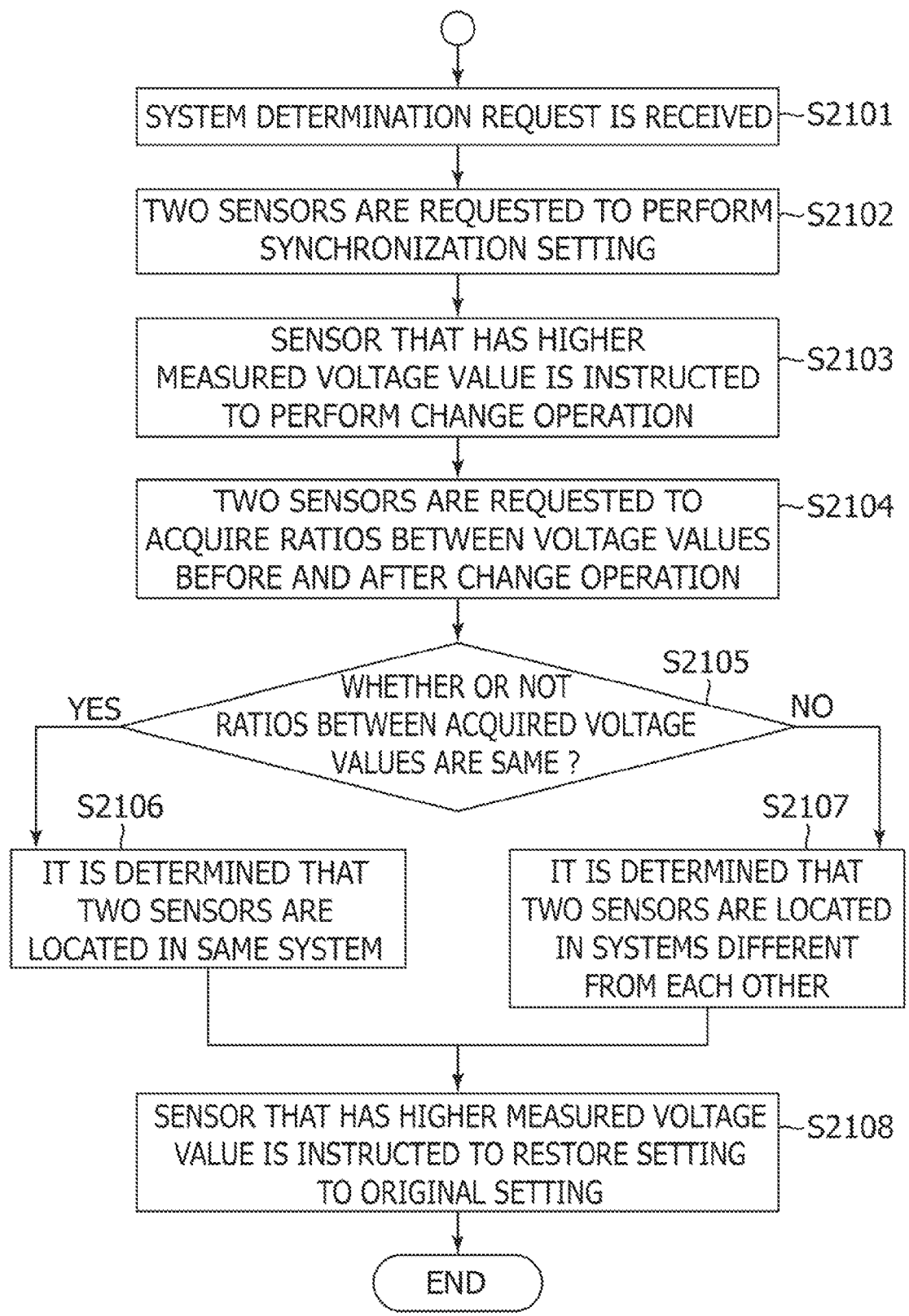
FIG. 21 is a flowchart illustrating an embodiment of an operation for determining a positional relationship between sensors.

On the basis of FIGS. 20 and 21, a processing operation will be described in which, using voltage values measured by the two sensors before and after the switch SW1 in the sensor is changed over or the resistance value of the variable resistance RV1 in the sensor is changed, a positional relationship between the two sensors is estimated. FIG. 20 is a flowchart illustrating an example of an operation in which a positional relationship between two sensors is determined, by comparing ratios between voltage values measured by the two sensors before and after the switch SW1 in the sensor is changed over or the resistance value of the variable resistance RV1 in the sensor is changed. In S2001, the determination unit 1605 receives a request for determining the positional relationship between the two sensors from the estimation unit 1604. The request includes the identifiers of the two sensors to be determination targets.

In S2002, the determination unit 1605 requests the measurement synchronization request unit 1603 to synchronize times and dates of clocks in the two sensors.

In S2003, the determination unit 1605 requests the voltage measurement request unit 1601 to acquire voltage values V1 and V2 at a current time from the two sensors, and records the measurement results in the determination criterion information database 1609 (determination criterion information DB). In addition, a case in which the sensor 300 is used corresponds to a state in which the switch SW1 is opened. A case in which the sensor 308 is used corresponds to a state in which the switch SW1 is opened, and the resistance value of the variable resistance RV1 is set to a high resistance value. In addition, the measurement result of a voltage value may be acquired by searching the voltage value information database 1607, or may be directly acquired from the voltage measurement request unit 1601. The determination criterion information database 1609 will be described later.

In S2004, the determination unit 1605 request the resistance change request unit 1602 to close the switch SW1 of the sensor 300 that has a higher measured voltage value (the sensor guessed to be located on the upstream side). In addition, when the sensor 308 is used, the resistance value of the variable resistance RV1 is set to a lower resistance value.

In S2005, the determination unit 1605 request the voltage measurement request unit 1601 to acquire, from the two sensors, voltage values V1' and V2' at a time and data at which the processing operation in S2004 has finished. In addition, the determination unit 1605 acquires and records the measurement results in the determination criterion information database 1609. The measurement results of voltage values may be acquired by searching the voltage value information database 1607, or may be directly acquired from the voltage measurement request unit 1601.

In S2006, the determination unit 1605 reads the voltage values measured by the two sensors from the determination criterion information database 1609, and calculates ratios between the voltage values measured by the two sensors before and after the resistance value of the sensor is changed. For example, when the sensor 300 is used, a ratio V1/V2 when the switch SW1 is opened and a ratio V1'/V2' when the switch SW1 is closed are calculated.

In S2007, the determination unit 1605 determines whether or not the ratios between the voltage values exist within a range preliminarily set in the recording unit 406 before and after the switch SW1 in the sensors is changed over or the resistance value of the variable resistance RV1 in the sensor is changed. When the ratios between the voltage values exist within the range, the processing operation proceeds to S2008 (Yes), and when the ratios between the voltage values are out of the range, the processing operation proceeds to S2009 (No).

In S2008, the determination unit 1605 determines that the two sensors are connected to the same system, and outputs the determination result to the estimation unit 1604. In addition, in order to notify a user that the two sensors are connected to the same system, the determination unit 1605 outputs the determination result to the display unit 407.

In S2009, the determination unit 1605 determines that the two sensors are connected to systems different from each other, respectively, and outputs the determination result to the estimation unit 1604. In addition, in order to notify a user that the two sensors are connected to systems different from each other, respectively, the determination unit 1605 outputs the determination result to the display unit 407.

In S2010, the determination unit 1605 requests the resistance change request unit 1602 to restore to an original state the changeover of the switch SW1 or the resistance value of the variable resistance RV1 in the sensor that has a higher measured voltage value.

Next, in FIG. 21, a processing operation will be described in which individual sensors calculate ratios between the voltage values before and after the switch SW1 in the sensor is changed over or the resistance value of the variable resistance RV1 in the sensor is changed, and a positional relationship between the sensors is determined by comparing the ratios with each other with respect to the two sensors. In this case, when the positional relationship between the sensors is determined, the determination criterion information database 1609 may not be used.

In S2101, the determination unit 1605 receives from the estimation unit 1604 a request for determining a positional relationship between two sensors. The request includes the identifiers of the two sensors to be determination targets.

In S2102, the determination unit 1605 requests the measurement synchronization request unit 1603 to synchronize times and dates of clocks in the two sensors.

In S2103, the determination unit 1605 requests the resistance change request unit 1602 to restore to an original state the changeover of the switch SW1 or the resistance value of the variable resistance RV1 in the sensor that has a higher measured voltage value.

In S2104, the determination unit 1605 requests the voltage measurement request unit 1601 to cause the two sensors to calculate and send back the ratios between the voltage values before and after the resistance value of the sensor is changed, and acquires a calculation result.

In S2105, the determination unit 1605 determines whether or not the ratios between the voltage values, acquired from the two sensors, exist within a specified range. When the ratios between the voltage values exist within the range, the processing operation proceeds to S2106, and when the ratios between the voltage values are out of the range, the processing operation proceeds to S2107.

In S2106, the determination unit 1605 determines that the two sensors are connected to the same system, and outputs the determination result to the estimation unit 1604. In addition, in order to notify a user that the two sensors are connected to the same system, the determination unit 1605 outputs the determination result to the display unit 407.

In S2107, the determination unit 1605 determines that the two sensors are connected to systems different from each other, respectively, and outputs the determination result to the estimation unit 1604. In addition, in order to notify a user that the two sensors are connected to systems different from each other, respectively, the determination unit 1605 outputs the determination result to the display unit 407.

In S2108, the determination unit 1605 requests the resistance change request unit 1602 to restore to an original state a sensor that has a higher measured voltage value. A processing operation performed in the estimation unit 1604 will be described.

Figure 22:
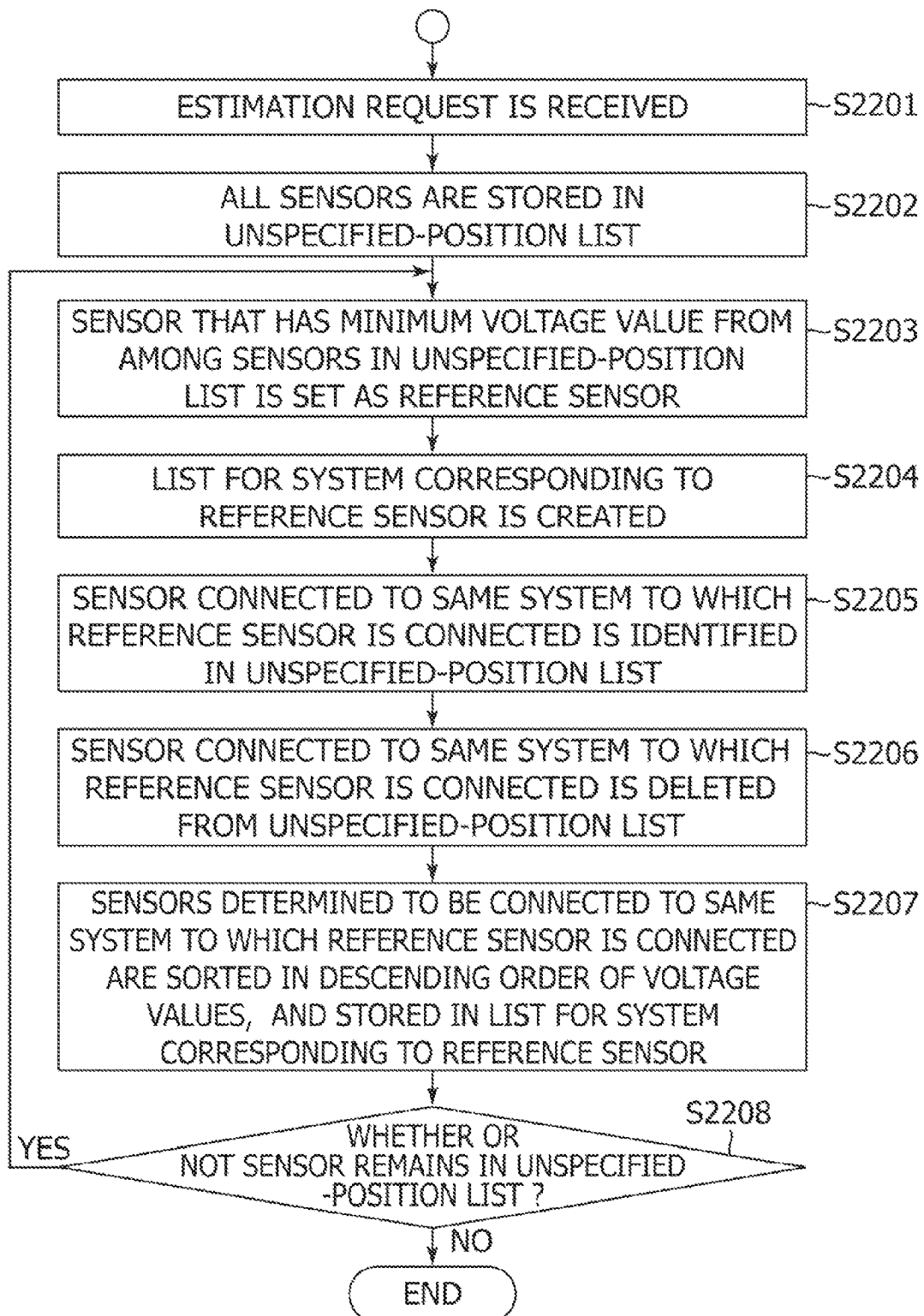
FIG. 22 is a flowchart illustrating an embodiment of an operation for estimating a positional relationship between all sensors in a power distribution network.

On the basis of a flowchart illustrated in FIG. 22, a processing operation will be described in which a positional relationship between all sensors in the power distribution network is estimated by recursively performing a processing operation in which a sensor connected to the same system is extracted from among a group of sensors the positions of which are unidentified.

In S2201, the estimation unit 1604 receives an instruction for position estimation from a user who monitors the power distribution network or the like, through an input device and the control unit 405.

In S2202, the estimation unit 1604 adds all sensors to be position estimation targets to an item for an unspecified position, illustrated in FIG. 23C, in the system information database 1608 (system information DB). The system information database 1608 will be described later.

In S2203, the estimation unit 1604 selects a sensor that has the lowest voltage value from the item for an unspecified position in the system information database 1608, and sets the sensor as a reference sensor. In addition, in advance of the processing operation, the voltage measurement request unit 1601 may be requested to acquire the voltage values of all sensors.

In S2204, the estimation unit 1604 adds to the system information database 1608 an item for recording a sensor connected to the same system to which the reference sensor is connected ("information of sensor that belongs to system" in FIG. 23C).

In S2205, the estimation unit 1604 instructs the determination unit 1605 to determine a positional relationship between a sensor, registered in the item for an unspecified position in the system information database 1608, and the reference sensor.

In S2206, a sensor determined by the estimation unit 1604 to be connected to the same system to which the reference sensor is connected is deleted from the item for an unspecified position in the system information database 1608.

In S2207, sensors determined by the estimation unit 1604 to be connected to the same system to which the reference sensor is connected are sorted in descending order of the voltage values thereof, and are added to the item created in S2204. Namely, the sensors are ranked in order of upstream positions (positions near a power source) in the same system, at which the sensors are located. In addition, in advance of the processing operation, the voltage measurement request unit 1601 may be requested to acquire the voltage value of a sensor connected to the same system to which the reference sensor is connected.

In S2208, the estimation unit 1604 determines whether or not a sensor remains in the item for an unspecified position in the system information database 1608. When a sensor remains (Yes), the processing operation proceeds to S2203, and when no sensor remains (No), the processing operation of the estimation unit 1604 is terminated.

FIGS. 23A to 23D are diagrams illustrating examples of the structures of the sensor information database 1606, the voltage value information database 1607, the system information database 1608, and the determination criterion information database 1609, recorded in the recording unit 406. The sensor information database 1606 illustrated in FIG. 23A records therein "sensor ID" used for recording an identifier of a sensor and information "communication interface information" used for communicating with a sensor. In the present example, as identifiers associated with individual sensors, "Sensor_01", "Sensor_02" . . . are recorded in the "sensor ID". In addition, information "A.B.C.D1", "A.B.C.D2" . . . used for communication associated with individual sensors are recorded in "communication interface information". In the voltage value information database 1607 illustrated in FIG. 23B, "sensor ID", a time and date "time and date", at which a sensor measured a voltage value, and a measured voltage value "voltage value [V]" are recorded. In the "time and date" in the present example, . . . "2009/7/12 12:23:45", "2009/7/12 12:23:46" . . . are recorded. In the "voltage value [V]", . . . "99.24", "98.89" . . . are recorded. In the system information database 1608 illustrated in FIG. 23C, "system ID" that is an identifier for distinguishing systems included in the power distribution network and "information of sensor that belongs to system" that is information of a sensor connected to each system are recorded. In the present example, "Line_01", . . . are recorded in the "system ID" and "Sensor_01, Sensor_02 . . . " are recorded in the "information of sensor that belongs to system". In the determination criterion information database 1609 illustrated in FIG. 23D, "sensor ID" and "load" that is information for indicating the changeover state of the switch SW1 in a sensor and the state of the change of the resistance value of the variable resistance RV1 are recorded. In addition, a voltage value measured in a state corresponding to the "load" is recorded in the "voltage value [V]". In the present example, "Sensor_01", "Sensor_02" . . . are recorded in the "sensor ID". In addition, "ON", "OFF" . . . are recorded in the "load", and "99.24", "98.89", "97.12", "96.78" . . . are recorded in the "voltage value [V]".

Figure 24:
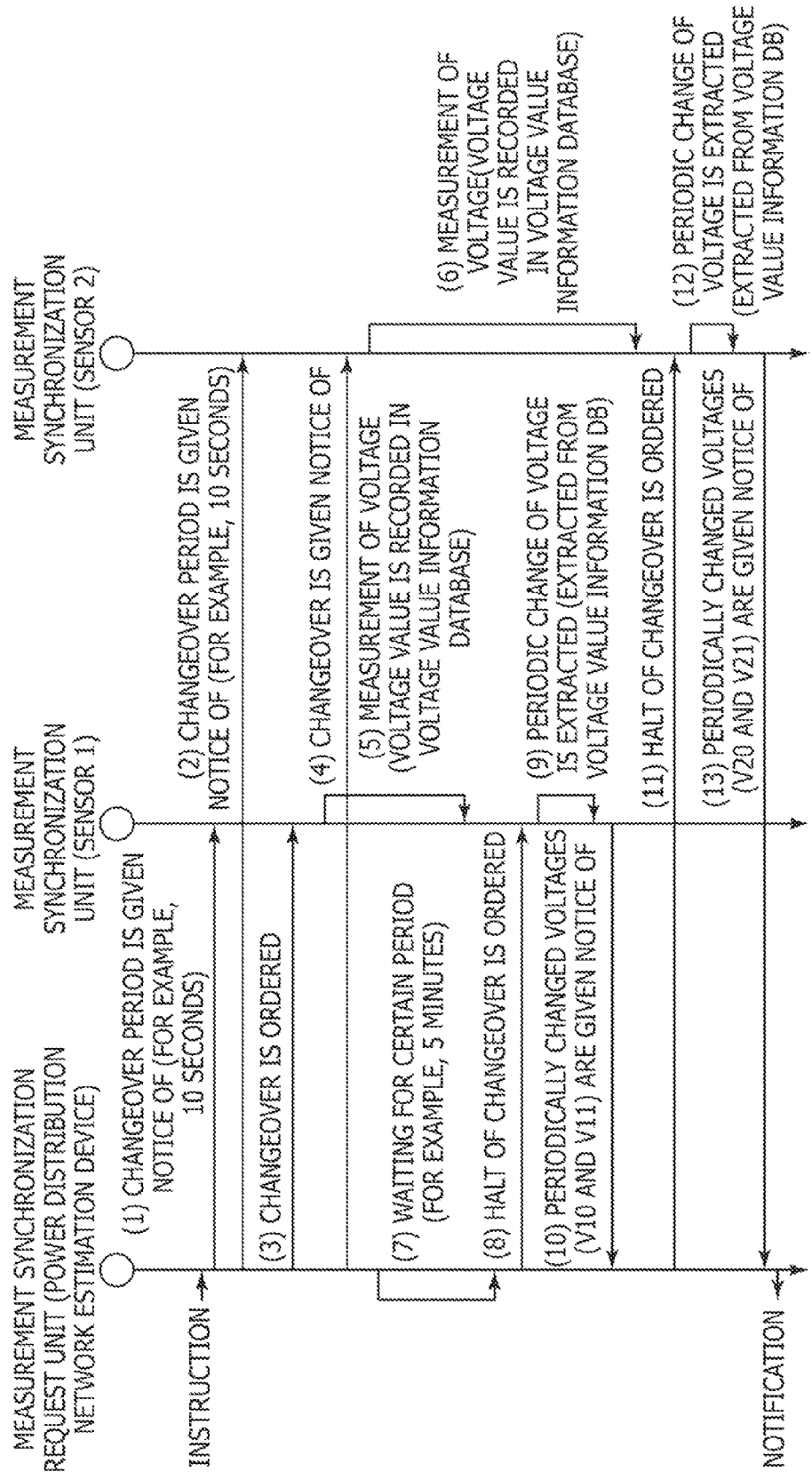
FIG. 24 is a flowchart illustrating an embodiment of an operation performed in the measurement synchronization request unit when a synchronization operation is periodically performed.

A processing operation performed in the measurement synchronization request unit 1603 when a synchronization operation is periodically carried out will be described on the basis of FIG. 24. When the synchronization operation is periodically carried out, the measurement synchronization request unit 1603 performs a processing operation in place of Operations S2002 to S2005 in FIG. 20. First, the measurement synchronization request unit 1603 receives an instruction for determining a positional relationship between two sensors from the estimation unit 1604. The instruction includes the identifiers of the two sensors to be determination targets. In (1), the measurement synchronization request unit 1603 instructs a sensor 1 located on the upstream side about a changeover period in which the switch SW1 in the sensor 1 is changed over or the resistance value of the variable resistance RV1 is changed (period changeover notice). For example, the changeover period is specified as 10 seconds or the like. However, the changeover period is not limited to 10 seconds.

In (2), the measurement synchronization request unit 1603 notifies a sensor 2 located on the downstream side of the changeover period of the sensor 1.

In (3), the measurement synchronization request unit 1603 issues an instruction to the sensor 1 to change over the switch SW1 or change the resistance value of the variable resistance RV1. In (4), the measurement synchronization request unit 1603 notifies the sensor 1 that the changeover instruction is transmitted.

In (5), the measurement synchronization unit 1103 in the sensor 1 measures voltage values before and after the changeover operation, and records the voltage values in the voltage value information database 1105. In the same way, the measurement synchronization unit 1103 in the sensor 2 measures voltage values before and after the changeover operation, and records the voltage values in the voltage value information database 1105.

In (7), the measurement synchronization request unit 1603 waits for a specified period (for example, 5 minutes), and instructs the sensor 1 to halt the changeover operation, at the time of (8).

In (9), the sensor 1 extracts the periodic change of a voltage from the voltage value information database 1105, and the sensor 1 notifies the measurement synchronization request unit 1603 of a voltage value (V10) before the changeover operation and a voltage value (V11) after the changeover operation, at the time of (10).

Next, in (11), the measurement synchronization request unit 1603 notifies the sensor 2 of the halt of the changeover operation.

In (12), the sensor 2 extracts the periodic change of a voltage from the voltage value information database 1105, and the sensor 2 notifies the measurement synchronization request unit 1603 of a voltage value (V20) before the changeover operation and a voltage value (V21) after the changeover operation, at the time of (13).

According to the method mentioned above, the system of a load connected to a sensor connected to the power distribution network can be determined using a voltage value measured by the sensor.

In addition, since the sensor can measure a voltage value at a specified time and date at the time of system determination, the voltage value can be measured, away from a time zone in which a load that is not connected to the sensor operates. Therefore, the system can be correctly determined.

In addition, since a sensor whose configuration is simple that can measure a resistance value and a voltage value at an electric power-supply end and perform communication and a power distribution network estimation device are used, an installation cost can be reduced. Load presence/absence determination and electric power consumption calculation will be described.

Figure 25A:
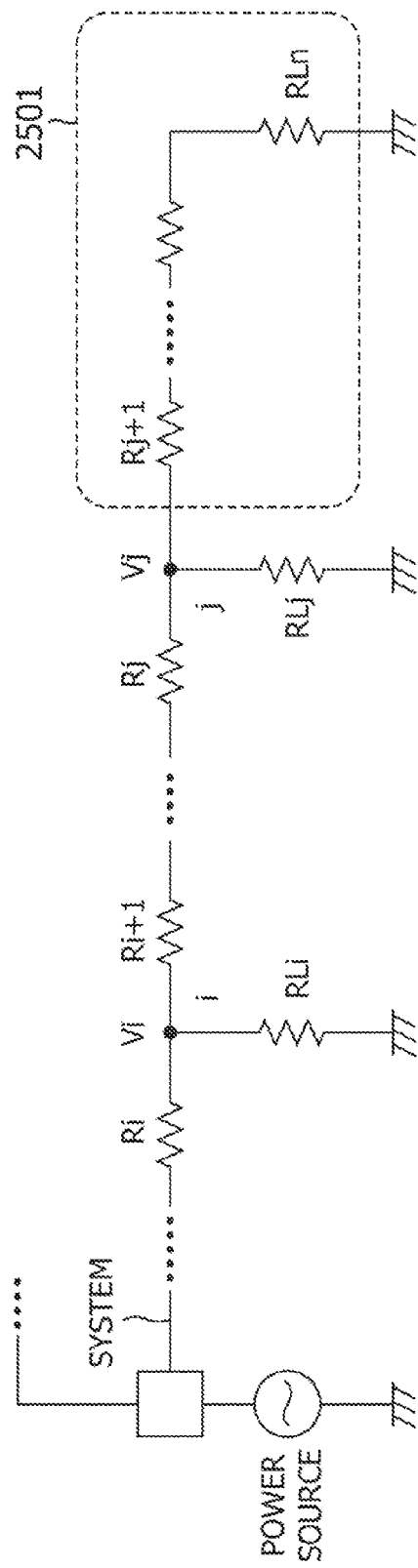
FIG. 25A is a substantially equivalent circuit illustrating an embodiment of loads connected to a same system in a power distribution network.

FIG. 25A is an equivalent circuit illustrating an embodiment of loads connected to a same system in a power distribution network. In the system illustrated in FIG. 25A, the calculation of total electric power consumption Pj in a range 2501 that is located downstream of an electric power-supply end j and is surrounded with a dashed line is performed as follows. Voltages Vi and Vj at an electric power-supply end i and the electric power-supply end j are expressed using Expression 5.

$$(Vi-Vj)/Vj = \alpha(GLj+G') + \beta \quad \text{[Expression 5]}$$

Figure 26:
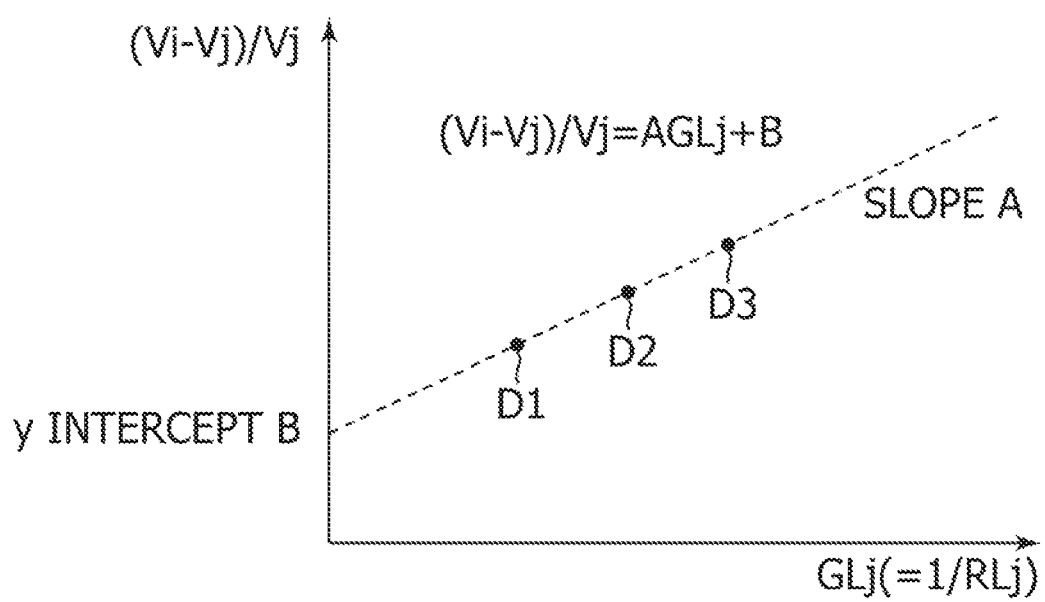
FIG. 26 is a diagram illustrating an embodiment of a fitting operation.

Here, the α value and the β value are constants obtained from parameters located downstream of the electric power-supply end i, and GLj is the conductance of a load connected to the electric power-supply end j. In addition, G' is the combined conductance of loads located downstream of the electric power-supply end j, and it is indicated that G' linearly behaves for GLj in Expression 5. Accordingly, when GLj is measured at more than one point, it turns out that the measurement results exist on a straight line (dashed line) as illustrated in FIG. 26. Namely, if, using a linear function (A*GLj+ B) of GLj, a fitting operation is performed on the experimental results D1, D2, and D3, the slope A value and intercept B value of the straight line can be derived. In addition, in the graph in FIG. 26, a vertical axis indicates (Vi−Vj)/Vj, and a horizontal axis indicates GLj.

The α value and β value will be described.

Figure 25B:
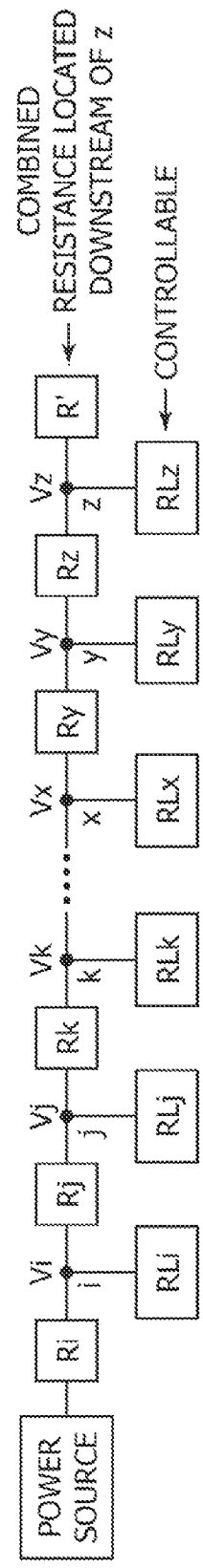
FIG. 25B is a diagram illustrating an embodiment of loads connected to a same system in a power distribution network.

FIG. 25B is an equivalent circuit illustrating an embodiment of loads connected to a same system circuit in the power distribution network. As illustrated in FIG. 25B, when there are a plurality of loads between the electric power-supply end i and an electric power-supply end z, current values between individual electric power-supply ends can be expressed using a current conservation equation, on the basis of Expression 6.

[Expression 6]

$$Gz(Vy - Vz) = GLzVz + G'Vz \quad (1)$$

$$Gy(Vx - Vy) = GLyVy + Gz(Vy - Vz) \quad (2)$$

...

$$Gj(Vi - Vj) = GLjVj + Gk(Vj - Vk) \quad (n)$$

$$G = 1/R$$

If (1) is dissolved with respect to Vy, the dissolved result is substituted into (2), (2) is dissolved with respect to Vx, the dissolved result is substituted into (3), and this operation is repeated to eliminate variables, a linear expression illustrated in Expression 7 is finally obtained.

$$\frac{Vi - Vz}{Vz} = \alpha(GLz + G') + \beta \quad \text{[Expression 7]}$$

Accordingly, on the basis of Expression 7, it turns out that the α value and the β value are expressed using parameters existing between the electric power-supply end i and the electric power-supply end z, and hence a voltage ratio (Vi/Vz)/Vz is determined on the basis of a condition on the downstream side of the electric power-supply end i.

Next, when the α value and the β value are calculated using a current conservation equation, Expression 8 is obtained.

$$\alpha = Rj + Rk + \ldots + Ry + Rz + Rj, \quad \text{[Expression 8]}$$

$$\ldots, z \times O(Rj, \ldots, z/RLj, \ldots, Lz)$$

$$\beta = \frac{Rj}{RLj} + \frac{Rj+Rk}{RLk} + \frac{Rj+Rk+Rl}{RLl} +$$

$$\ldots + \frac{Rj+Rk \ldots +Ry}{RLy} + O\left(\left(\frac{Rj, \ldots, z}{RLj, \ldots, Lz}\right)^2\right)$$

$O(x^n)$ indicates terms higher than or equal to n-order term with respect to an arbitrary variable x, and is negligible when $x \ll 1$.

In addition, when there is some sort of load between the electric power-supply end i and the electric power-supply end z, the β value is estimated by measuring the effect of the load between the electric power-supply end i and the electric power-supply end z. When the variation portion Δ(Vi/Vj) of (Vi/Vj) due to the power-on and power-off of the load between the electric power-supply ends is calculated, the variation portion Δ(Vi/Vj) is expressed as Expression 9. In addition, "ON" in Expression 9 indicates the power-on, and "OFF" in Expression 9 indicates the power-off.

$$\Delta(Vi/Vj) = (Vi/Vj)_{ON} - (Vi/Vj)_{OFF} = (\alpha_{ON} - \alpha_{OFF})(GLj + G') + (\beta_{ON} - \beta_{OFF}) \alpha_{ON} \approx \alpha_{OFF} \beta_{OFF} \approx 0$$

$$\Delta(V_i/V_j) \approx \beta \quad \text{[Expression 9]}$$

In addition, the β value can be estimated on the basis of the voltage ratio fluctuation Δ(Vi/Vj) obtained when the resistance value of the load between the electric power-supply ends is changed.

Next, if the slope A value and intercept B value of the straight line is compared with Expression 5, the slope A value can be expressed as A=α, and the intercept B value satisfies an expression B=α*G'+β. Accordingly, Pj can be expressed with Expression 10, and, as will be noted from Expression 10, it turns out that the β value may be evaluated in order to calculate Pj.

$$Pj = G'Vj^2 = Vj^2(B-\beta)/A \quad \text{[Expression 10]}$$

Figure 27:
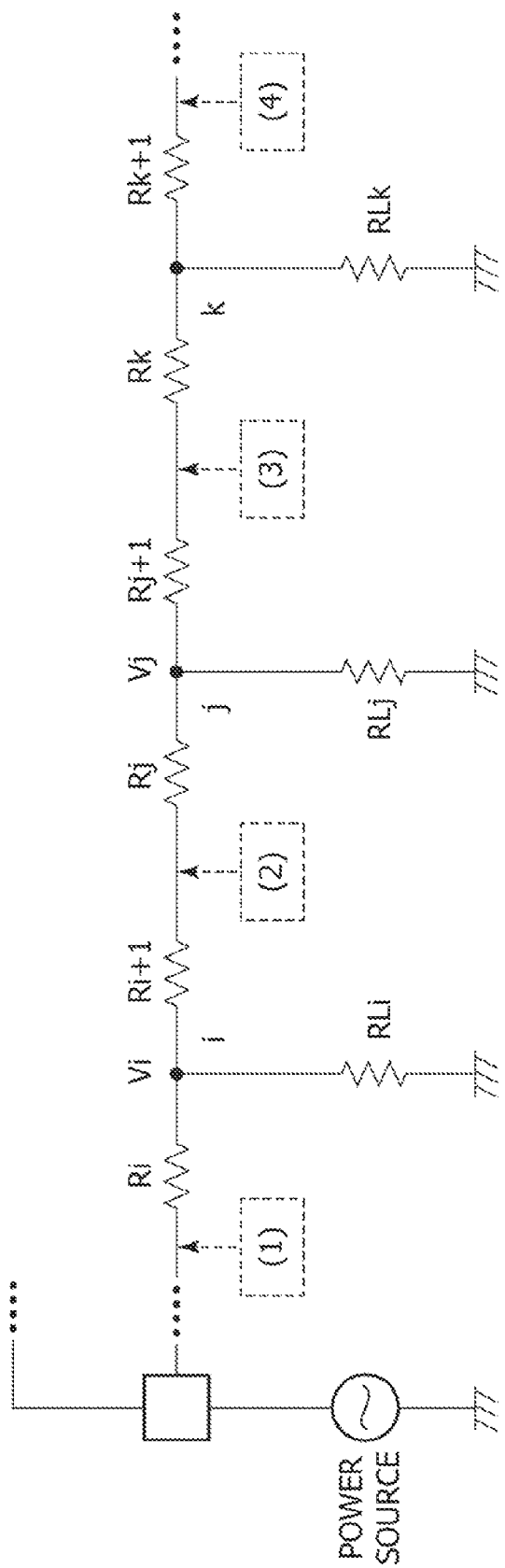
FIG. 27 is a diagram illustrating a method used for estimating the presence or absence of a load between electric power-supply ends.

In addition, in order to evaluate the β value, a confirmation is made regarding whether or not there is a load between electric power-supply ends to be measured. FIG. 27 is a diagram for explaining a method used for estimating the presence or absence of a load between the electric power-supply ends to be measured. As illustrated in FIG. 27, by measuring voltage values at desired electric power-supply ends i and j and an electric power-supply end k located downstream of the electric power-supply end j, which are positioned on an electric wiring line, voltage information can be acquired. In addition, using the voltage ratio fluctuation thereof, it is determined whether or not there is a load between the desired electric power-supply ends i and j. When a voltage ratio (Vi/Vj) between the two electric power-supply ends i and j is measured, the load fluctuation of a load located downstream of these electric power-supply ends affects the voltage ratio. Accordingly, if a signal (voltage ratio fluctuation) occurs between the electric power-supply ends i and j, and the signal does not occur between the electric power-supply ends j and k, it is assumed that the fluctuation is caused by the fluctuation of a load that exists between the electric power-supply ends i and j. Namely, it is assumed that there is a load between the electric power-supply ends i and j. In addition, when there is no load between electric power-supply ends i and j, it turns out that β=0. Accordingly, if the resistance value RLj of the load connected to the electric power-supply end j is changed, and then the individual voltage values of the electric power-supply ends i and j are measured, it can be determined, using the voltage measurement result, whether or not there is a load between the electric power-supply ends i and j.

In addition, when there is no load between the electric power-supply ends i and j, the total electric power consumption Pj on the downstream side of the electric power-supply end j can also be directly calculated on the basis of Expression 11, using, as the voltage measurement result, the voltage values (Vi, Vj) of the electric power-supply ends i and j before the resistance value RLj is changed and the voltage values (Vi', Vj') of the electric power-supply ends i and j after the resistance value RLj is changed.

$$Pj = G'Vj^2 = GijVj(Vi - Vj) - GLjVj^2 \qquad \text{[Expression 11]}$$
$$Gij = \frac{VjV'j}{ViV'j - V'iVj}(GLj - G'Lj)$$

In this regard, however, each of GLj and G'Lj is the value of conductance connected to the load of electric power-supply end j, and Gij is the conductance of a conductive wire between the electric power-supply ends i and j. On the other hand, when there is some sort of load between the electric power-supply ends i and j, the β value may be estimated by measuring the effect of the load between the electric power-supply ends. If the resistance value of a load (2) between the electric power-supply ends is variable or the effect thereof can be estimated, the β value can be expressed with Expression 12 as follows.

$$\beta \approx \Delta(Vi/Vj) \qquad \text{[Expression 10]}$$

Here, the right side of Expression 12 corresponds to the variation portion of (Vi/Vj) due to the power-on and power-off of the load (2). In many cases, it may be assumed that the β value can be calculated using the above-mentioned method. However, in a case in which it is difficult to control the load or estimate the effect of the load, if the electric power consumption of the load (2) between the electric power-supply ends can be directly measured (for example, the load (2) can be separated once and an electric power meter can be inserted), an electric power-supply end may be changed, the voltage of which is to be measured, to the position of the load (2) and try to perform voltage measurement again. In addition, when it is difficult to even measure the load (2), only an approximate value can be obtained. In such a case, it is assumed that Pj≈Vi*(Vi−Vj)/A. In addition, since the value of A is at substantially the same level as the resistance value of a conductive wire between the electric power-supply ends i and j, a value is obtained that corresponds to an expression Pi>Vi*(Vi−Vj)/A>Pj.

Figure 28:
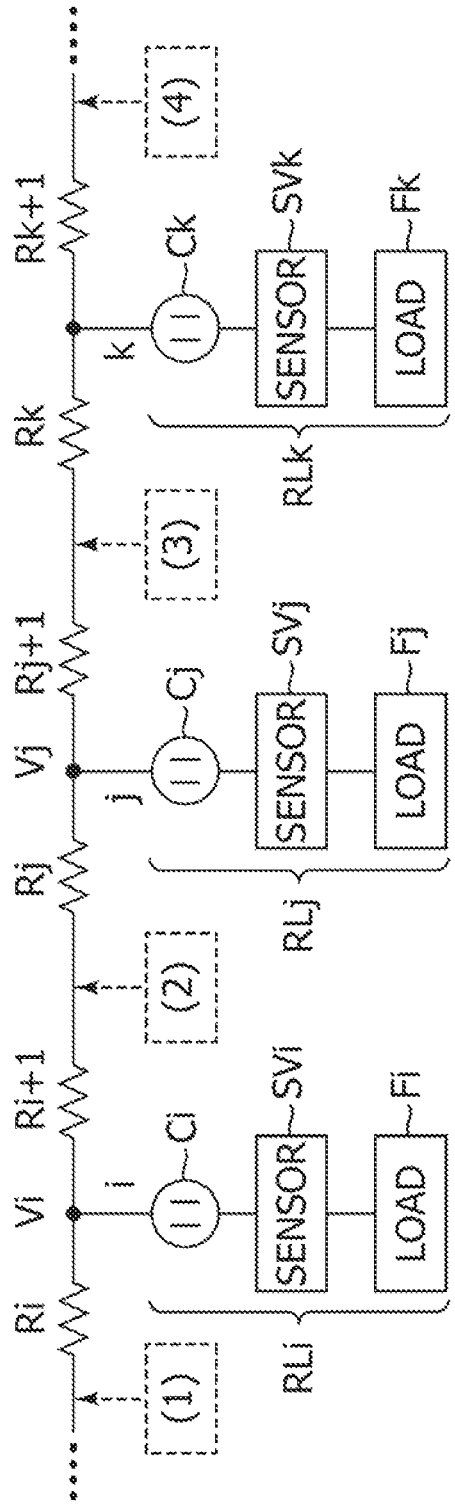
FIG. 28 is a diagram illustrating embodiments of sensors and loads connected to a same system in a power distribution network.

FIG. 28 is an equivalent circuit illustrating embodiments of sensors and loads connected to a same system in the power distribution network. Sensor SVi, SVj, and SVk illustrated in FIG. 28 are substantially the same sensors as the sensor 300 or 308, and loads Fi, Fj, and Fk are connected to the sensors 300 or 308 as illustrated in FIGS. 3A and 3B. In addition, the load presence/absence determination unit 403 in FIG. 4 communicates with the sensors SVi, SVj, and SVk through the communication unit 401, and acquires voltage values measured by the sensors.

Figure 29:
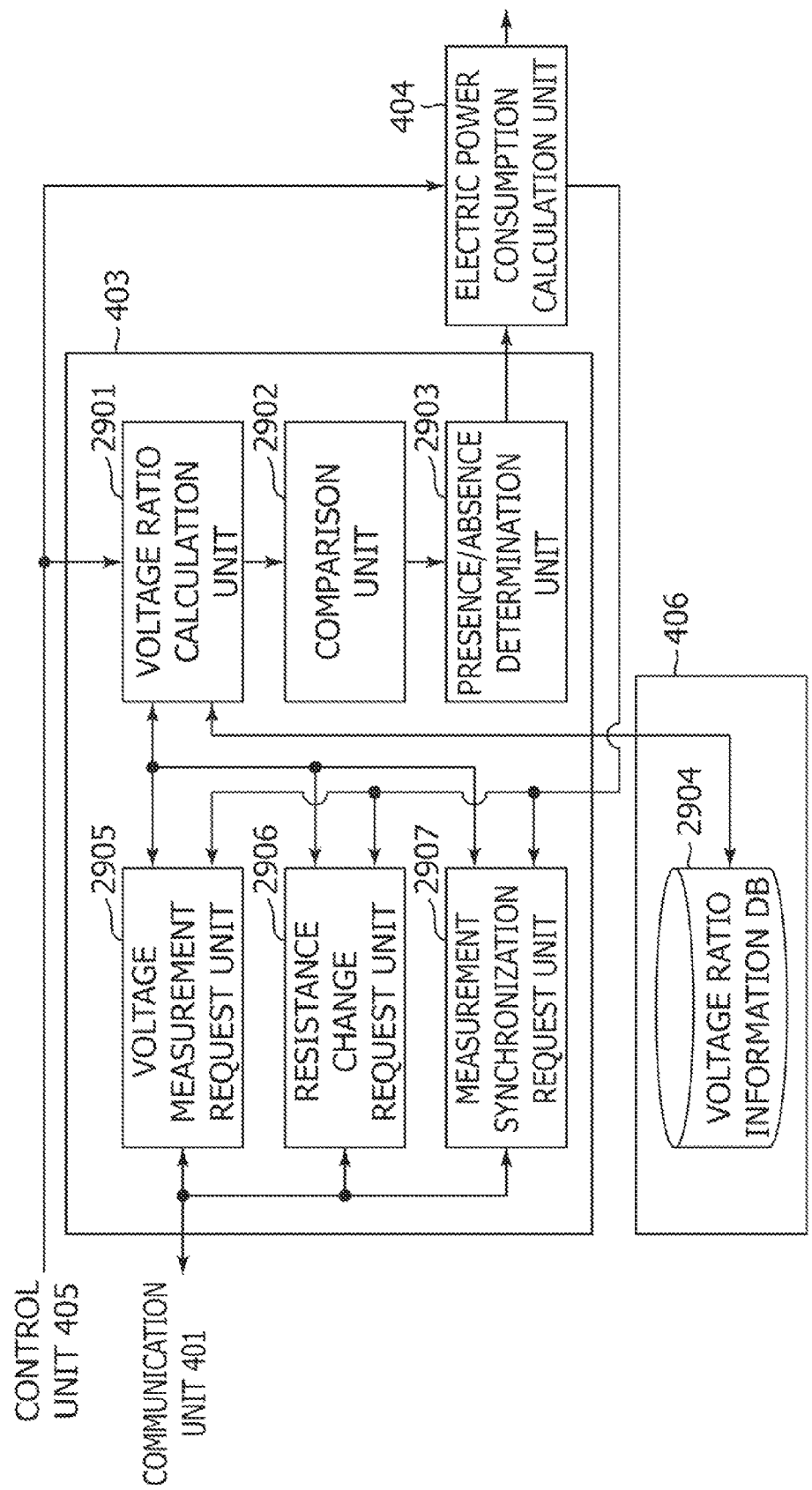
FIG. 29 is a diagram illustrating embodiments of a load presence/absence determination unit, an electric power consumption calculation unit, and a recording unit.

FIG. 29 is a diagram illustrating embodiments of a load presence/absence determination unit and an electric power consumption calculation unit.

The load presence/absence determination unit 403 includes a voltage ratio calculation unit 2901, a comparison unit 2902, and a presence/absence determination unit 2903. When a load presence/absence determination operation is performed, the voltage ratio calculation unit 2901 notifies the voltage measurement request unit 2905, the resistance change request unit 2906, and the measurement synchronization request unit 2907 of individual instructions, in order to acquire a voltage value. The voltage ratio calculation unit 2901 acquire voltage values from sensors connected to three electric power-supply ends connected to the same system in the power distribution network. Next, it is assumed that acquired voltage values are the voltage value of a first electric power-supply end, the voltage value of a second electric power-supply end, and the voltage value of a third electric power-supply end, ranked in descending order, and then a first ratio between the voltage values of the first and second electric power-supply ends and a second ratio between the voltage values of the second and third electric power-supply ends are calculated. The comparison unit 2902 calculates a difference between the first ratio and the second ratio. When the difference between the ratios is out of a specified range, the presence/absence determination unit 2903 determines that there is a load between the first electric power-supply end and the second electric power-supply end. In addition, the measurement synchronization request unit 2907 synchronizes the measurement of sensors in substantially the same way as the measurement synchronization request unit 1603 in FIG. 16. In addition, the functions of the voltage measurement request unit 2905, the resistance change request unit 2906, and the measurement synchronization request unit 2907 may be included in the voltage measurement request unit 1601, the resistance change request unit 1602, and the measurement synchronization request unit 1603, respectively. In such a case as described above, the voltage measurement request unit 2905, the resistance change request unit 2906, and the measurement synchronization request unit 2907 may be deleted from the load presence/absence determination unit 403.

Figure 30:
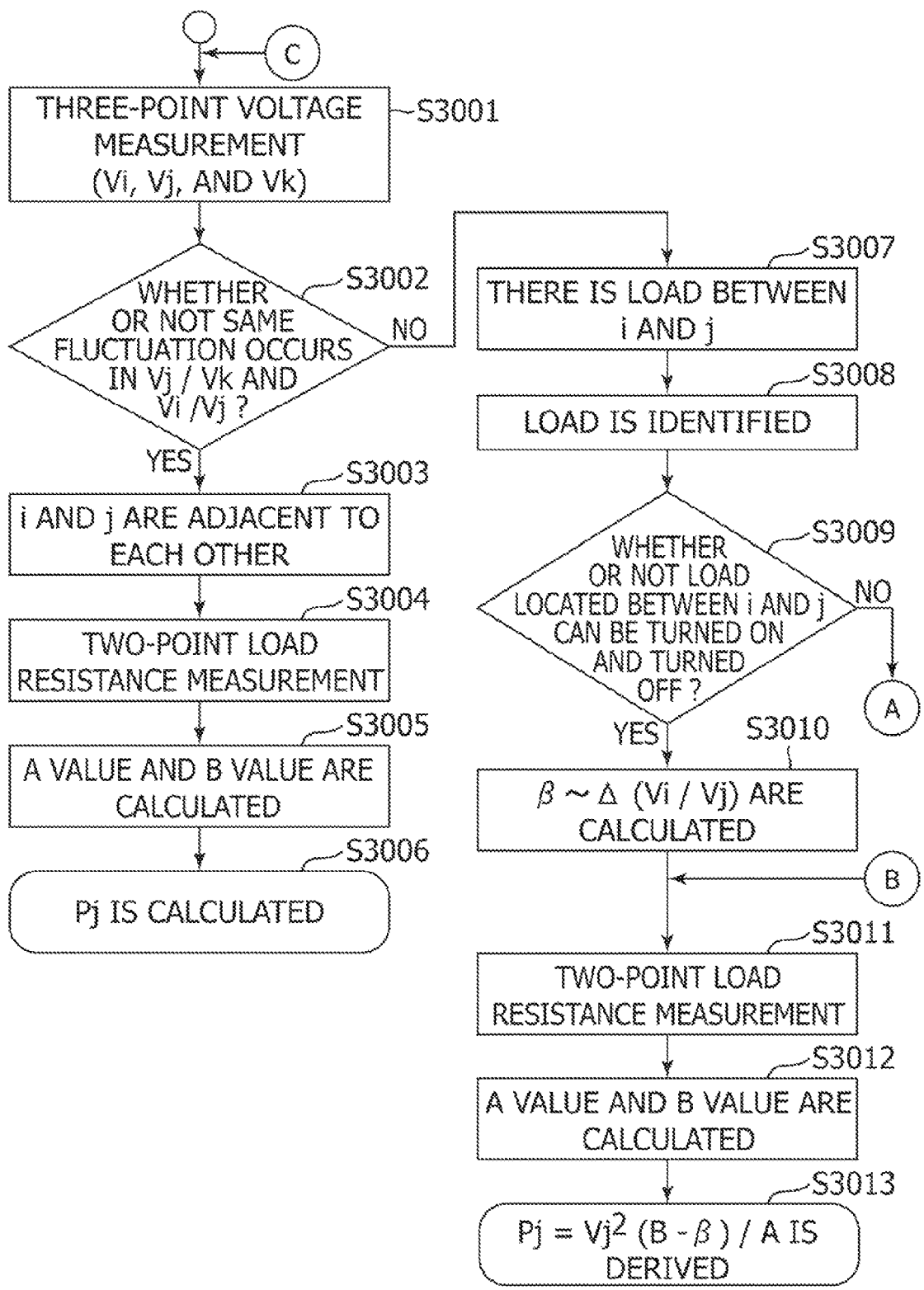
FIG. 30 is a flowchart illustrating embodiments of operations performed in load presence/absence determination and electric power consumption calculation.
Figure 31:
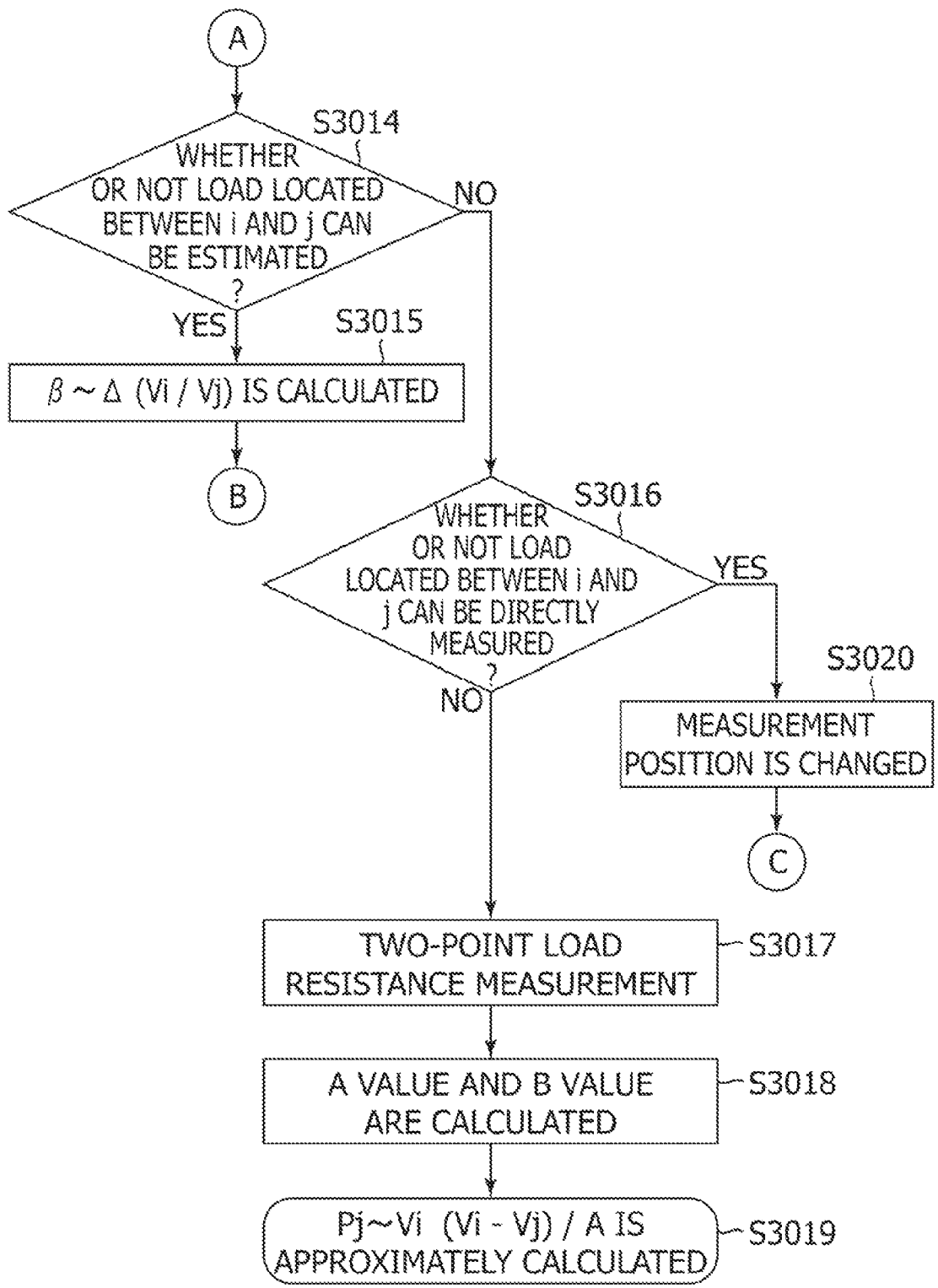
FIG. 31 is a flowchart illustrating embodiments of operations performed in the load presence/absence determination and the electric power consumption calculation.

FIGS. 30 and 31 are diagrams illustrating examples of operations performed in load presence/absence determination and electric power consumption calculation.

First, when an instruction to perform the load presence/absence determination and the electric power consumption calculation in the same system is received from a user through the control unit 405, operations illustrated in flowcharts in FIGS. 30 and 31 are executed.

In S3001, the load presence/absence determination unit 403 acquires a plurality of individual voltage values in chronological order from each of the sensors 300 or the sensors 308, connected to three loads that are targets. For example, when voltage values at electric power-supply ends i, j, and k illustrated in FIG. 28 are measured, the load presence/absence determination unit 403 sends an instruct for acquiring a voltage value to the voltage measurement request unit 2905, and then the voltage measurement request unit 2905 notifies, through the communication unit 401, the sensors SVi, SVj, and SVk of instructs to acquire voltage values. When receiving notifications from the voltage measurement request unit 2905, the sensors SVi, SVj, and SVk measure voltage values, and transmit information of the measured voltage values to the voltage measurement request unit 2905. The voltage ratio calculation unit 2901 acquires and records the voltage values of the electric power-supply ends i, j, and k in the voltage ratio information database 2904 in the recording unit 406. For example, as illustrated in FIG. 32A, times and dates at which the voltage values are measured are recorded in "time and date", and voltage values corresponding to the times and dates of the measurement are recorded in "voltage value Vi", "voltage value Vj", and "voltage value Vk", respectively. In the example illustrated in FIG. 32A, . . . "2009/11/20 8:00:01", "2009/11/20 8:00:02" . . . are recorded in "time and date". In "voltage value Vi", . . . "101.1234", "99.8765" . . . are recorded. In "voltage value Vj", . . . "101.2345", "102.3456" . . . are recorded. In "voltage value Vk", . . . "98.7654", "97.6543" . . . are recorded. In addition, at the time of voltage measurement, the switch SW1 in the sensor 308 is changed over to an open state.

In S3002, the voltage ratio calculation unit 2901 calculates the ratios between voltage values using three voltage values sequentially acquired. In addition, it is determined whether or not there is no difference between the ratios. In addition, when no difference between the ratios is detected (Yes), the processing operation proceeds to S3003, and when a difference between the ratios is detected (No), the processing operation proceeds to S3007. For example, when the voltage values at the electric power-supply ends i, j, and k illustrated in FIG. 28 are measured, the voltage ratio calculation unit 2901 calculates a voltage ratio Vj/Vk and a voltage ratio Vi/Vj using the voltage values Vi, Vj, and Vk of the electric power-supply ends i, j, and k. Here, the voltage values Vi, Vj, and Vk have a relationship Vi>Vj>Vk, and whether each of the electric power-supply ends i, j, and k is located on the upstream side or the downstream side is determined on the basis of the levels of the voltage values at the electric power-supply ends (outlets or the like) as described above.

Next, the comparison unit 2902 calculates a voltage ratio Vj/Vk and a voltage value ratio Vi/Vj, and records these ratios in the voltage ratio information database 2904 in the recording unit 406. In the example illustrated in FIG. 32B, the voltage value ratio Vi/Vj and the voltage ratio Vj/Vk are recorded in "voltage ratio Vi/Vj" and "voltage ratio Vj/Vk", respectively, with being associated with the times and dates ("time and date" in FIG. 32A) at which the voltage values are measured. In the example illustrated in FIG. 32B, . . . "2009/11/20 8:00:01", "2009/11/20 8:00:02" . . . are recorded in "time and date". In "voltage ratio Vi/Vj", . . . "1.0123", "0.9876" . . . are recorded. In "voltage ratio Vj/Vk", . . . "1.0234", "1.0345" . . . are recorded.

Next, a difference between previous and next voltage ratios recorded in "voltage ratio Vi/Vj" is calculated, and it is determined whether or not the difference is within a specified range. In addition, when the difference is out of the specified range, it is determined that a fluctuation is detected. As illustrated in the table in FIG. 28, it may be assumed that there are loads (1) to (4) between the electric power-supply ends i and j and between the electric power-supply ends j and k. If there is a load at (2), a fluctuation is detected in the voltage ratio Vi/Vj, and if there are loads at (3) and (4), fluctuations are detected in the voltage ratio Vi/Vj and the voltage ratio Vj/Vk. Namely, if a signal (voltage ratio fluctuation) occurs between the electric power-supply ends i and j, and the signal does not occur between the electric power-supply ends j and k, it is assumed that there is a corresponding load between the electric power-supply ends i and j. A case in which there has been a load between the electric power-supply ends i and j is illustrated in FIG. 33. On the basis of a difference between previous and next voltage ratios recorded in "voltage ratio Vi/Vj", the comparison unit 2902 calculates differences between the values of voltage ratios Vi/Vj within a range in "voltage ratio Vi/Vj", surrounded with a dashed line, and the values of voltage ratios Vi/Vj in portions other than the range. A difference between "1.0123" and "1.0234" associated with "2009/11/20 8:00:02" and "2009/11/20 8:00:03" in "time and date", respectively, is calculated. When the calculation result exceeds the specified range, it is determined that a fluctuation is detected. In this regard, however, a detection method is not limited to the method described above but any method in which the fluctuation can be detected may be adopted.

In S3003, the presence/absence determination unit 2903 determines that there is no load between the electric power-supply ends i and j. Namely, it is determined that the load Fi and the load Fj connected to the electric power-supply ends i and j, respectively, are connected to the electric power-supply ends i and j adjacent to each other, and it is recorded in the voltage ratio information database 2904 in the recording unit 406 that there is no load between the electric power-supply ends i and j. For example, when there is no load, "absence" is recorded with being associated with "voltage ratio Vi/Vj". In FIG. 32C, while "presence" is noted in "load presence/absence", "absence" is recorded in the case of S3003.

In S3004, the electric power consumption calculation unit 404 acquires voltage values produced when the resistance value of the variable resistance RV1 in the sensor 308 connected to the electric power-supply end j is changed. For example, when two voltage values at the electric power-supply end j illustrated in FIG. 28 are measured, the electric power consumption calculation unit 404 sends an instruction for acquiring the two voltage values to the voltage measurement request unit 2905, and then causes the voltage measurement request unit 2905 to notify, through the communication unit 401, the sensor SVj an instruct to acquire the voltage values. In addition, the voltage measurement request unit 2905 notifies, through the communication unit 401, the sensor SVj of an instruction to acquire the voltage values. In addition, an instruction for closing the switch SW1 in the sensor 308 and changing the resistance value of the variable resistance RV1 is sent to the resistance change request unit 2906. When receiving the notification from the voltage measurement request unit 2905, the sensor SVj measures a plurality of voltage values, and transmits information of the measured voltage value to the voltage measurement request unit 2905. The voltage ratio calculation unit 2901 acquires two voltage values of the electric power-supply end j, and records the two voltage values in the voltage ratio information database 2904 in the recording unit 406. For example, as illustrated in FIG. 32D, times and dates at which the voltage values are measured are recorded in "time and date", and a content, which indicates that the switch SW1 has been changed over or the resistance value of the variable resistance RV1 has been changed to a reference resistance value and a resistance value other than the reference resistance value, is recorded in "control load" so as to correspond to the time and date. In the example illustrated in FIG. 32D, a case in which the sensor 308 is used is described, and, in the present example, when the resistance value of the variable resistance RV1 is 0.1Ω, "0.1" is recorded. In addition, when the resistance value of the variable resistance RV1 is 0.2Ω, "0.2" is recorded. In addition, two voltage values that correspond to "0.1" and "0.2" in "control load" are recorded in "voltage value Vj". In the example illustrated in FIG. 32D, . . . "2009/11/20 9:00:01", "2009/11/20 9:00:02" . . . are recorded in "time and date", and . . . "0.1", "0.2" . . . are recorded in "control load". In "voltage value Vi", . . . "101.1234", "99.8765", "101.1234", "99.8765" . . . are recorded. In S3005, the electric power consumption calculation unit 404 calculates the slope A value and the intercept B value.

S3004 and S3005 mentioned above will be described.

Figure 34:
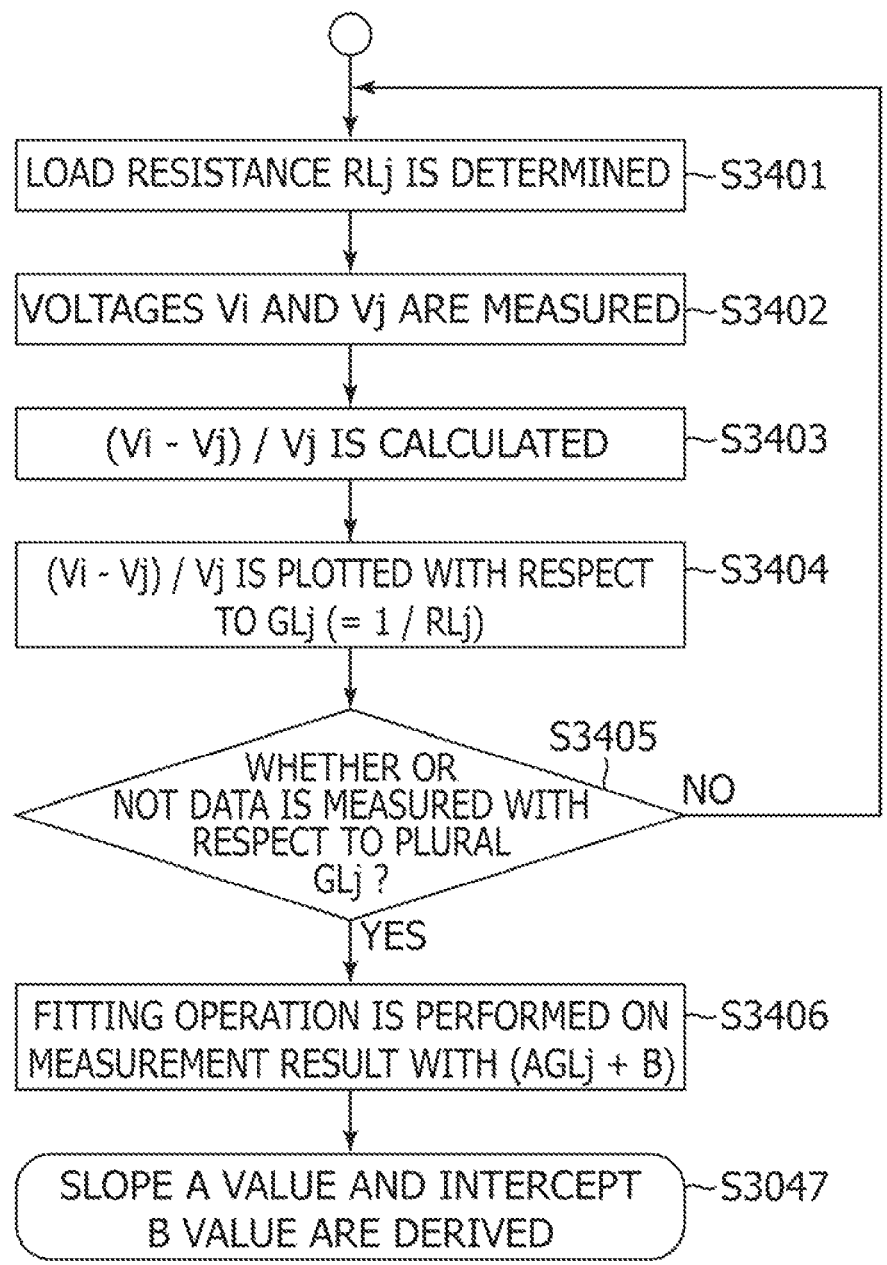
FIG. 34 is a flowchart illustrating an embodiment of an operation for obtaining a slope A and an intercept B of a linear function.

FIG. 34 is a flowchart illustrating an example of an operation for obtaining the slope A value and the intercept B value of the linear function (Vi−Vj)/Vj=A*GLj+B described with reference to FIG. 26. In S3401, the electric power consumption calculation unit 404 determines a load resistance RLj. Namely, the resistance value of the variable resistance RV1 is changed to a specified value, and the load resistance RLj is determined. In addition, it is assumed that the resistance value of a load connected to a sensor is preliminarily known. In addition, a load may not be connected to a sensor but the variable resistance RV1 in the sensor may be used.

In S3402, the electric power consumption calculation unit 404 notifies the voltage measurement request unit 2905 of an instruction to measure the voltages Vi and Vj. After that, the voltage measurement request unit 2905 notifies, through the communication unit 401, the sensors SVi and SVj connected to the electric power-supply ends i and j of instructions to measure the voltages Vi and Vj, respectively. The sensors SVi and SVj measure the voltage values Vi and Vj at the resistance value of the variable resistance RV1 determined in S3401, and transmit the measured voltage values to the electric power consumption calculation unit 404. The electric power consumption calculation unit 404 records the received voltage values Vi and Vj and an identifier indicating the resistance value of the variable resistance RV1 in the recording unit 406 with associating the voltage values with the identifier.

In S3403, the electric power consumption calculation unit 404 calculates the value of (Vi−Vj)/Vj using the voltage values Vi and Vj acquired in S3402.

In S3404, the electric power consumption calculation unit 404 records (plots) the result of (Vi−Vj)/Vj in the recording unit 406 with associating the result of (Vi−Vj)/Vj with GLj(=1/RLj).

In S3405, it is determined whether or not all data has been measured with respect to the specified resistance value of the variable resistance RV1. For example, it may be assumed that the resistance values of the variable resistance RV1 are RVa, RVb, and RVc. When the voltage values Vi and Vj have been measured for RVa, RVb, and RVc, the processing operation proceeds to S3406 (Yes). In addition, when the voltage values Vi and Vj have not yet been measured for RVa, RVb, and RVc, the processing operation proceeds to S3401 (No).

In S3406, the electric power consumption calculation unit 404 performs a fitting operation on the measurement result, using the linear function (A*GLj+B). While it is desirable to use a least-square method for the fitting operation, the fitting operation is not specifically limited to the least-square method.

In S3407, the electric power consumption calculation unit 404 calculates the slope A value and the intercept B value using the fitting result, and records the slope A value and the intercept B in "parameter A" and "parameter B" in the recording unit 406 with associating the slope A value and the intercept B with "time and date" (refer to FIG. 32D).

Next, in S3006 in FIG. 30, the electric power consumption calculation unit 404 calculates the electric power consumption Pj of a portion located subsequent to the electric power-supply end j in the same system, using the calculated A value and B value, the measured voltage values Vj, and an expression Pj=Vj²*B/A. In this regard, however, since there is no load between the electric power-supply ends i and j, it turns out that β=0. Alternatively, without using the A value and the B value, the electric power consumption Pj may be calculated using Expression 11.

Next, a case will be described in which there is a load between the electric power-supply ends i and j when a fluctuation is detected in S3002 in FIG. 30 and the processing operation proceeds to S3007.

In S3007, the electric power consumption calculation unit 404 records "presence" in "load presence/absence" illustrated in FIG. 32C.

In S3008, the electric power consumption calculation unit 404 identifies a load that exists between the sensors SVi and SVj. For example, for the identification of a load, an identifier corresponding to each load is recorded in the recording unit 406, and a sign indicating whether or not the load is active is recorded in the recording unit 406 with being associated with the identifier. As an example of the sign, "1" indicates that the load is active, and "0" indicates that the load is not active. In addition, voltage values produced when the load is active are recorded in the recording unit 406 with being associated with the identifier of each load. The electric power consumption calculation unit 404 determines whether or not the voltage values produced when the load is active are within a range that ranges from the voltage value of the electric power-supply end i to the voltage value of the electric power-supply end j. In addition, when the voltage values are within the range, the power consumption calculation unit 404 determines that the active load is a load located between the electric power-supply end i and the electric power-supply end j.

In S3009, the electric power consumption calculation unit 404 refers to information, which is recorded in the recording unit 406 and indicates whether or not the power-on and power-off associated with the identifier of each load is controllable. In addition, as a result of the reference, when the power source of a load located between the electric power-supply end i and the electric power-supply end j is controllable, the processing operation proceeds to S3010 (Yes). In addition, when the power source is not controllable, the processing operation proceeds to S3014 (No). In addition, for example, the information that indicates whether or not the power-on and power-off is controllable is information indicating that a measurement operation can be performed in the nighttime in which a power source can be freely turned on and turned off, the load can be identified as a device the power-on and power-off of which are controllable, or the like.

In S3010, when the electric power consumption calculation unit 404 turns on and turns off the power source of the identified load, the electric power consumption calculation unit 404 acquires the voltage values of the electric power-supply end i and the electric power-supply end j from the sensors SVi and SVj. After that, the β value is calculated in accordance with Expression 9, and is recorded in the "parameter β" in the recording unit 406 (refer to FIG. 32E).

In S3011 and S3012, the electric power consumption calculation unit 404 calculates the slope A value and the intercept B value in substantially the same way as in S3004 and S3005.

In S3013, the electric power consumption calculation unit 404 calculates the electric power consumption Pj of a portion located subsequent to the electric power-supply end j in the same system, using the calculated A value and B value, the calculated β value, the measured voltage values Vj, and an expression Pj=Vj²*(B−β)/A. After that, "electric power consumption" in recording unit 406 is recorded with being associated with "time and date" (refer to FIG. 32D).

In S3014 in FIG. 31, it is determined whether or not the effect of a load located between the electric power-supply end i and the electric power-supply end j can be estimated (evaluated). For example, the electric power consumption calculation unit 404 records information, which indicates whether or not the load located between the electric power-supply end i and the electric power-supply end j is active, and a Vi/Vj value, calculated on the basis of the voltage values Vi and Vj acquired from the sensors, in the recording unit 406 with associating with the information and the Vi/Vj value with a time and date in chronological order. When such a recording operation as described above is performed with respect to the load located between the electric power-supply end i and the electric power-supply end j, the processing operation proceeds to S3015 (Yes). In addition, when such a recording operation as described above is not performed, the processing operation proceeds to S3016 (No).

In S3015, the electric power consumption calculation unit 404 acquires the Vi/Vj value obtained when the load located between the electric power-supply end i and the electric power-supply end j is active (power-on) and the Vi/Vj value obtained when the load is not active (power-off). After that, the $\beta$ value is calculated in accordance with Expression 9, and is recorded in "parameter $\beta$" in the recording unit 406 (refer to FIG. 32E). After that, the processing operation proceeds to S3011.

However, sometimes a case may occur in which the power-on and the power-off of the load located between the electric power-supply end i and the electric power-supply end j is impossible or the recording of the voltage values Vi and Vj produced when the load is active is impossible. In such a case, if, at any time (for example, at midnight), the load can be separated once and an electric power meter can be inserted, the electric power-supply end I may be moved to the position of an electric power-supply end to which the load is connected and try to perform the above-mentioned voltage measurement again. In addition, it is assumed that the electric power consumption of the load is added to the measured electric power consumption Pj later.

In S3016, the electric power consumption calculation unit 404 determines whether or not, at any time (for example, at midnight), the load can be separated once and an electric power meter can be inserted. For example, information indicating whether or not, at any time (for example, at midnight), the load can be separated once and an electric power meter can be inserted is recorded in the recording unit 406 with respect to each load, and the electric power consumption calculation unit 404 refers to the information and performs such determination as described above. When electric power is measurable, the processing operation proceeds to S3020, and when electric power is not measurable, the processing operation proceeds to S3017.

In S3017 to S3019, the electric power consumption calculation unit 404 calculates the approximate value of the electric power consumption Pj. In such a case, the approximate value turns out to be $Pj \approx Vi*(Vi-Vj)/A$. Here, since the A value is at the same level as the resistance value of a conductive wire between the electric power-supply end i and the electric power-supply end j, a value is obtained that corresponds to an expression $Pi > Vi*(Vi-Vj)/A > Pj$. Namely, a value is obtained that includes an error as large as up to the electric power consumption of the load located between the electric power-supply end i and the electric power-supply end j. In addition, the processing operation performed in S3017 and S3019 calculates the A value in substantially the same way as in 3004 and S3005 described above. In addition, the approximate value of the electric power consumption Pj is calculated using the A value, the voltage values Vi and Vj, and the expression $Vi*(Vi-Vj)/A$.

In S3020, a user moves the sensor SVi connected to the electric power-supply end i to the position of an electric power-supply end to which a load is connected, and notifies the control unit 405 of an instruction to perform the above-mentioned voltage measurement again.

Figure 35:
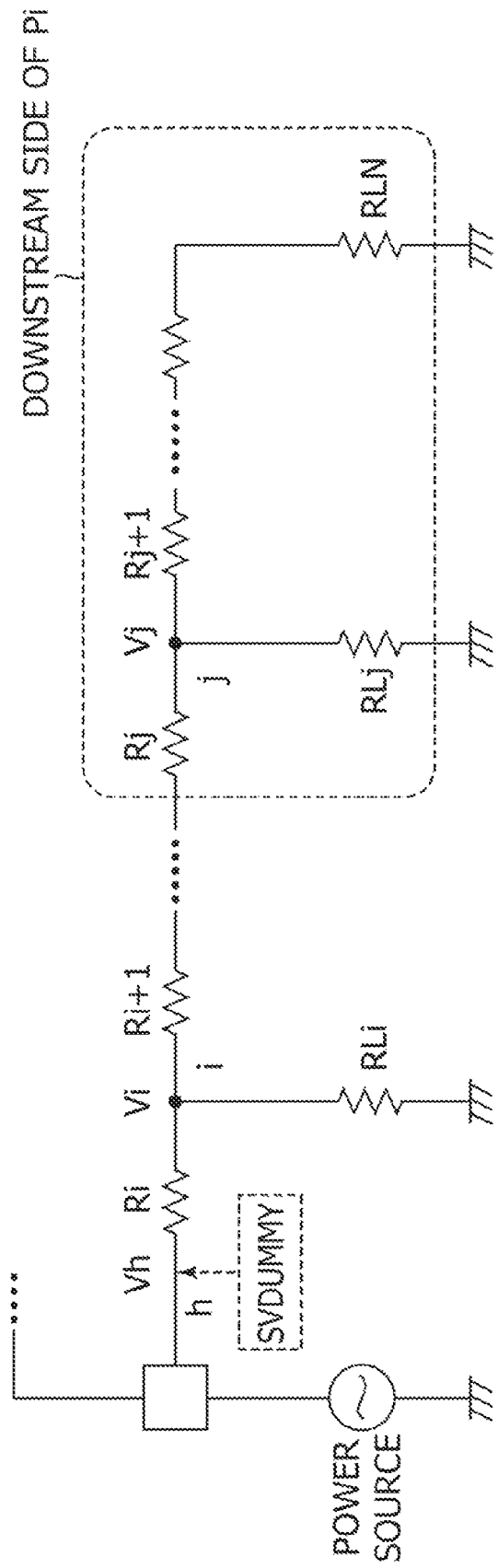
FIG. 35 is a diagram illustrating an embodiment in which electric power consumption of a portion subsequent to an electric power-supply end near a distribution board is measured.

FIG. 35 is a diagram illustrating an example in which the electric power consumption of a portion subsequent to an electric power-supply end i near a distribution board is measured.

As illustrated in FIG. 35, by connecting a dummy sensor (Svdummy) to an electric power-supply end h and performing the above-mentioned processing operation performed in S3001 to S3020, the electric power consumption of the portion subsequent to the electric power-supply end i can be measured.

In addition, even if the power distribution network or the electric power-supply end is different, for example, a single-phase two-wire method is used, a single-phase two-wire method in which a three-terminal outlet is included is used, or a single-phase three-wire method is used, the sensor 300 or the sensor 308, described above, can be connected to the power distribution network.

Figure 36:
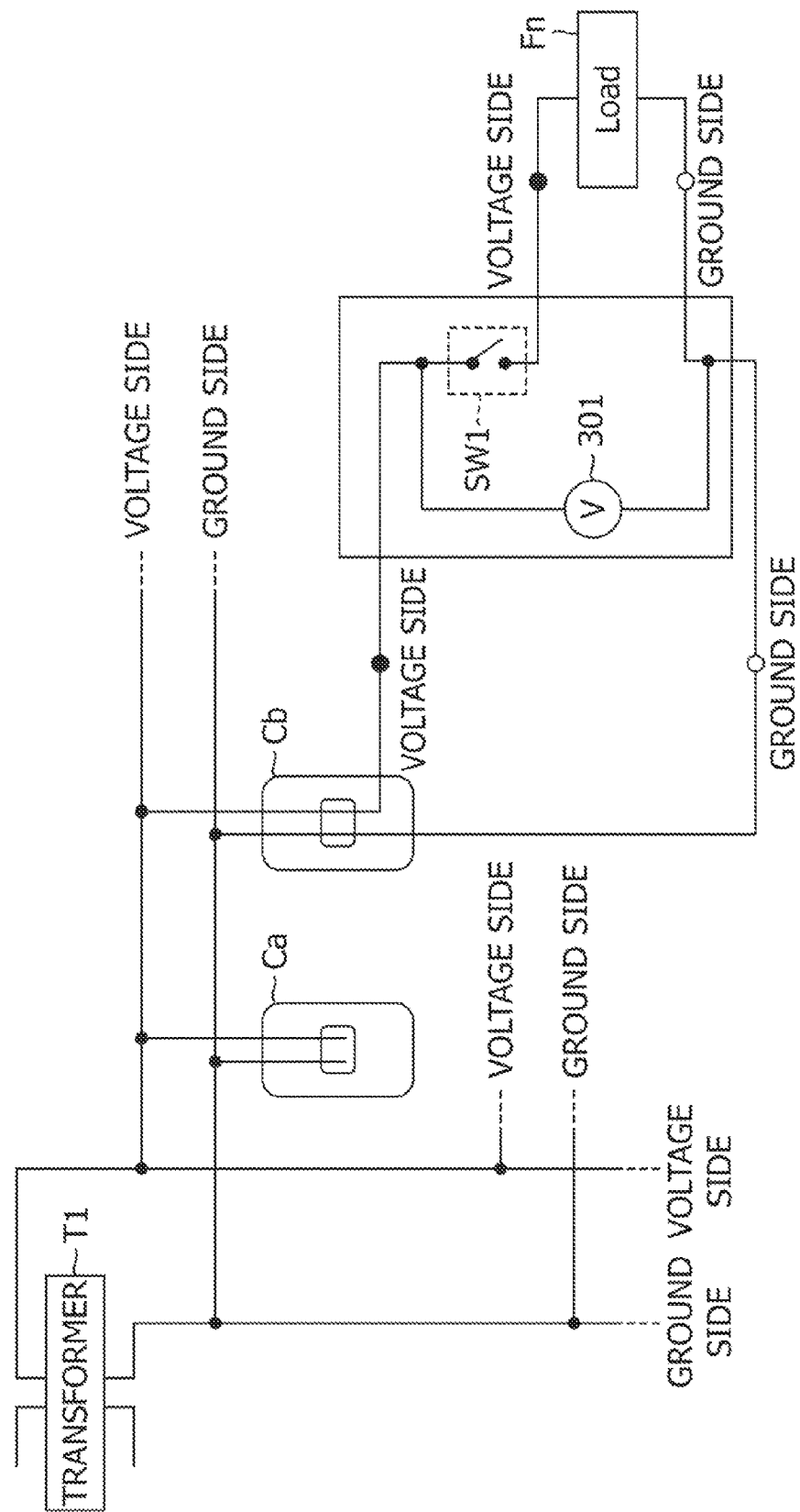
FIG. 36 is a diagram illustrating a circuit configuration when a single-phase two-wire method is used (a sensor is connected)

FIG. 36 is a diagram illustrating a circuit configuration when a single-phase two-wire method is used (a sensor 300 is connected). Outlets Ca and Cb indicate electric power-supply ends used for the single-phase two-wire method.

Figure 37:
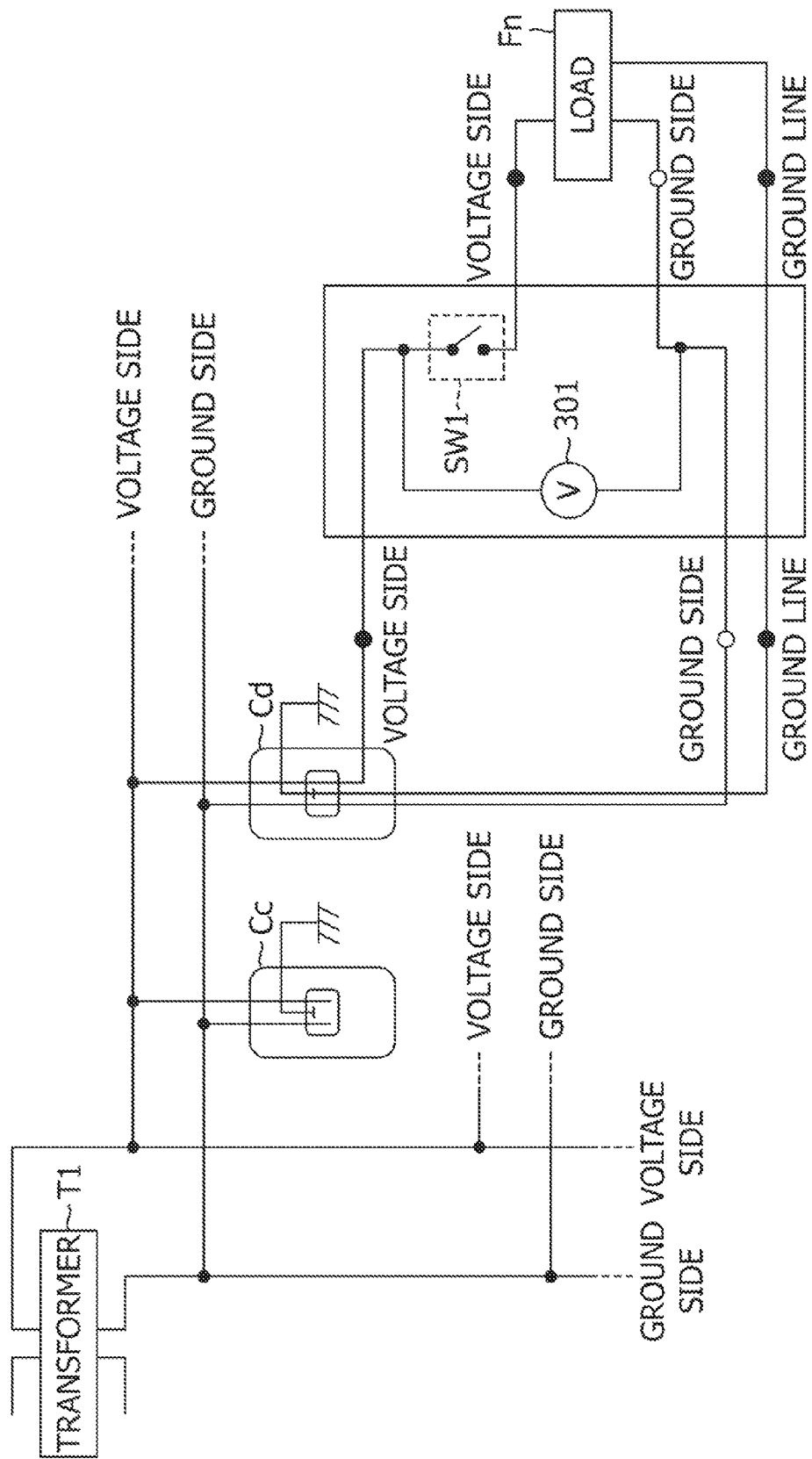
FIG. 37 is a diagram illustrating a circuit configuration when a single-phase two-wire method and a three-terminal outlet are used (a sensor is connected)

FIG. 37 is a diagram illustrating a circuit configuration when a single-phase two-wire method and three-terminal outlets are used (a sensor 300 is connected). Outlets Cc and Cd indicate three-terminal electric power-supply ends used for the single-phase two-wire method.

Figure 38:
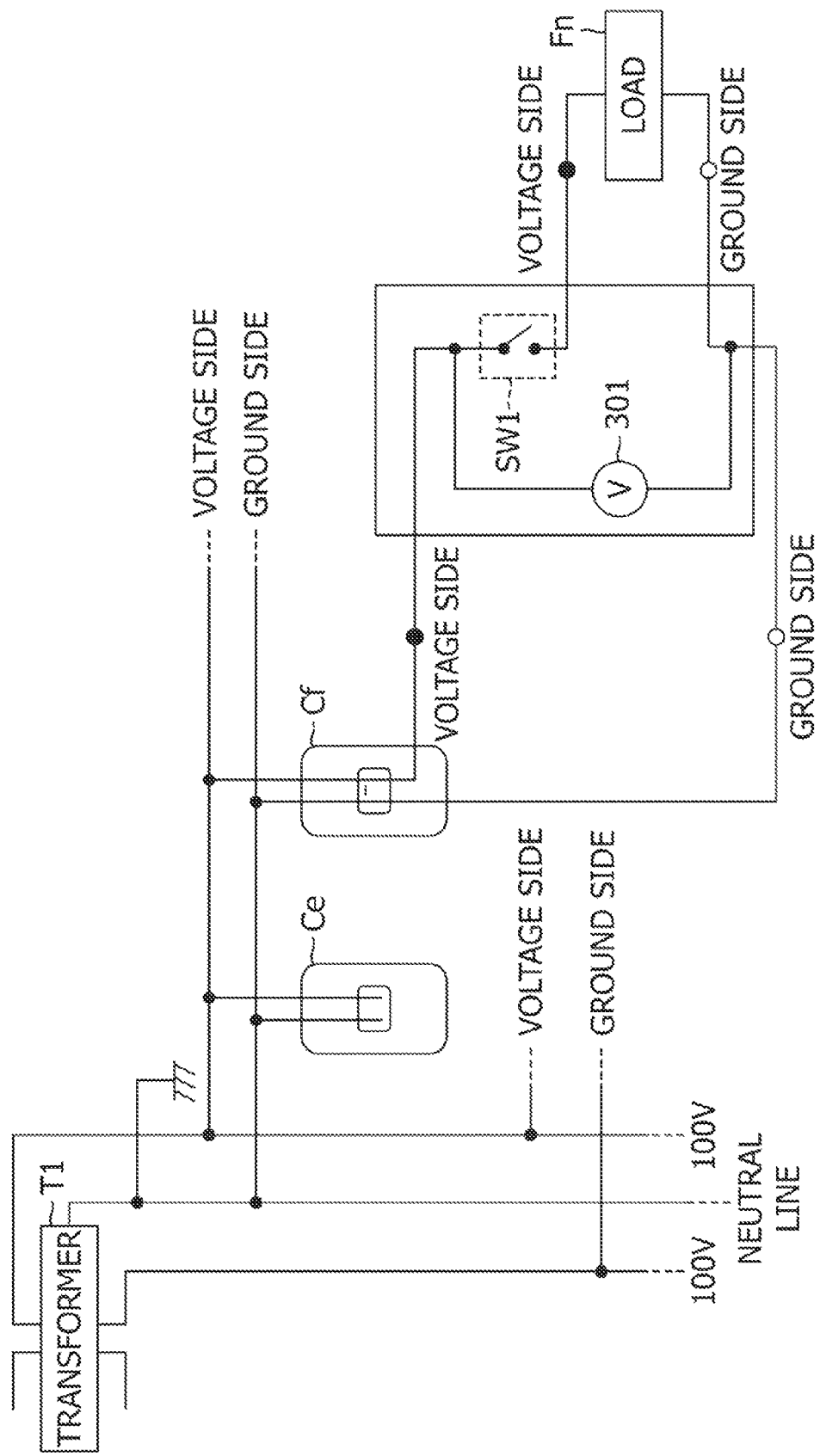
FIG. 38 is a diagram illustrating a circuit configuration when a single-phase three-wire method is used (a sensor is connected)

FIG. 38 is a diagram illustrating a circuit configuration when a single-phase three-wire method is used (a sensor 300 is connected). Outlets Ce and Cf indicate electric power-supply ends used for the single-phase three-wire method. In addition, in FIGS. 36 to 38, loads Fn are loads connected to sensors.

On the basis of such methods as described above, it can be determined whether or not there is a load between electric power-supply ends to which sensors are connected, and the electric power consumption of a desired range in the power distribution network can be estimated depending on the determination result. Therefore, for example, in facilities such as average offices, houses, and the like, even if it is difficult to secure electric power-supply ends adjacent to one another, the electric power consumption of a desired range in the power distribution network can be estimated with relative ease, using a small number of electric power-supply ends.

In addition, since a sensor whose configuration is simple that can measure a resistance value and a voltage value at an electric power-supply end and perform communication and a power distribution network estimation device are used, an installation cost can be reduced.

The configuration when the present embodiment is realized as a computer will be described.

Figure 39:
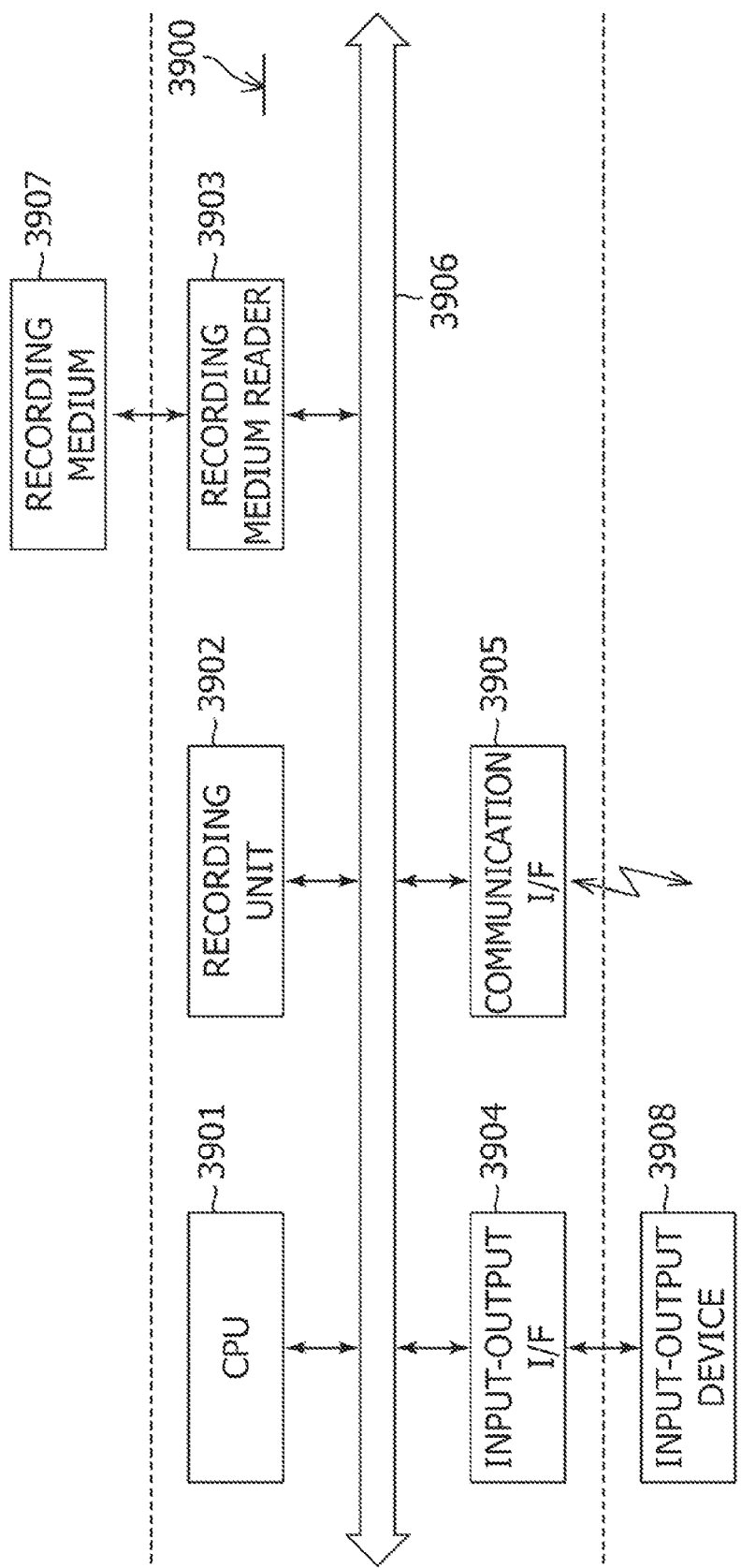
FIG. 39 is a diagram illustrating an embodiment of a hardware configuration of a computer that can realize a power distribution network estimation device according to the embodiment.

FIG. 39 is a diagram illustrating an example of the hardware configuration of a computer that can realize the power distribution network estimation device 1 according to the embodiments described above.

The hardware 3900 of the computer includes a CPU 3901, a recording unit 3902 (ROM, RAM, hard disk drive, or the like), a recording medium reader 3903, an input-output interface 3904 (input-output I/F), a communication interface 3905 (communication I/F), and the like. In addition, the individual component units are connected to one another through a bus 3906.

The CPU 3901 executes individual processing operations such as the system determination operation, the load presence/absence determination operation, the electric power consumption calculation operation, and the like, which are stored in the recording unit 3902 and performed in the power distribution network estimation device 1 described above.

Program to be executed in the CPU 3901 and data are stored in the recording unit 3902. In addition, the recording unit 3902 is used as a work area. In addition, the recording unit 3902 includes the function of the recording unit 406, described above.

The recording medium reader 3903 controls the read and write of data from and to the recording medium 3907 in accordance with the control of the CPU 3901. In addition, the CPU 3901 causes the recording medium reader 3903 to store data, written by the control of the recording medium reader 3903, in the recording medium 3907, and causes the recording medium reader 3903 to read out data stored in the recording medium 3907. In addition, examples of the detachable recording medium 3907 include, as computer-readable recording media, a magnetic recording device, an optical disk, a magneto-optical recording medium, a semiconductor memory, and the like. Examples of the magnetic recording device include a hard disk drive (HDD) and the like. Examples of the optical disk include a digital versatile disc (DVD), a digital versatile disc random access memory (DVD-RAM), a compact disc read only memory (CD-ROM), a compact disc recordable (CD-R), a compact disc rewritable (CD-RW), and the like. Examples of the magneto-optical recording medium include a magneto-optical disk (MO) and the like.

An input-output device 3908 (for example, a touch panel or the like) is connected to the input-output interface 3904, and receives and transmits information input by a user to the CPU 3901 through the bus 3906. In addition, the input-output device 3908 displays operating information or the like on the screen of a display in response to an instruction from the CPU 3901.

The communication interface 3905 is an interface used for establishing LAN connection with another computer, Internet connection, and wireless connection. In addition, the communication interface 3905 is connected to another device, and controls the input and output of data from and to an external device.

Using the computer that includes such a hardware configuration as described above, the various kinds of processing functions described above (the processing operations described in the embodiments (flowcharts and the like)) can be realized. A program is provided in which the content of processing of functions to be included in the system in such a case is described. By executing the program in the computer, the above-mentioned processing function is realized on the computer. The program in which the content of processing is described can be recorded in the computer-readable recording medium 3907.

For example, when the program is distributed, the recording media 3907 such as DVD, CD-ROM, and the like, in each of which the program is recorded, are sold. In addition, the program may be stored in a storage device in a server computer, and the program may also be transferred from the server computer to other computers through a network. In addition, the term "computer-readable recording medium" here includes no transitory propagation signal.

For example, the computer that executes a program stores in the recording unit 3902 therein a program recorded in the recording medium 3907 or a program transferred from the server computer. In addition, the computer reads out the program from the recording unit 3902 therein, and executes a processing operation in accordance with the program. In addition, the computer can also directly read out the program from the recording medium 3907, and execute a processing operation in accordance with the program. In addition, every time the program is transferred from the server computer, the computer can also sequentially execute a processing operation in accordance with the received program.

In addition, the function of the power distribution network estimation device 1 may also be installed in a server, or installed in the control unit 303 or 312 in a sensor or the like.

In addition, the present invention is not limited to the embodiments described above but it should be understood that various improvements and modifications may occur insofar as they are within the scope of the present invention. In addition, individual embodiments can be combined with one another as long as no inconsistency occurs in the processing operations thereof.

According to the embodiments described above, there is obtained an advantageous effect of improving accuracy in the determination of a system in the power distribution network, the determination of the connection state of a load located between sensors belonging to the same system, and the estimation of electric power consumption in a specific range in the same system.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present inventions have been described in detail, it should be understood that the various changes, substitutions, and alterations could be made hereto without departing from the spirit and scope of the invention.

What is claimed is:

1. An estimation device that estimates a positional relationship between a plurality of loads in a power distribution network, the estimation device comprising:
    a communication circuitry configured to change a resistance value and measure a voltage value by communicating with a plurality of sensors, the loads being individually connected through the plurality of sensors to a plurality of electric power-supply ends provided in the power distribution network, the resistance value being located between each of the electric power-supply ends and a ground terminal of each of the plurality of sensors, the voltage value being produced between each of the electric power-supply ends and the ground terminal; and
    a processor coupled to the communication circuitry, the processor being configured to:
    select two sensors from among the plurality of sensors connected to the power distribution network,
    acquire voltage values from the two selected sensors through the communication circuitry,
    acquire voltage values from the two selected sensors after a resistance value of one of the two sensors that has a higher acquired voltage value is changed,
    calculate, with respect to each of the two sensors, a ratio between voltage values acquired before and after the resistance value is changed, and
    determine that the two sensors are connected to a branch circuit in a same system in the power distribution network, when the ratio is within a specified range with respect to each of the two sensors.

2. The estimation device according to claim 1, wherein the processor is further configured to:
    acquire voltage values from the plurality of sensors connected to the power distribution network,
    record the voltage values in a memory with associating the voltage values with the plurality of sensors, extract a sensor that has a lowest voltage value from among the recorded voltage values, set the extracted sensor as a first reference sensor, determine sensors connected to a same system from among the first reference sensor and sensors other than the first reference sensor, record the determined sensors in the memory, and arrange the first reference sensor and the sensor connected to the same system to which the first reference sensor is connected in descending order based on the voltage values thereof.

3. The estimation device according to claim 2, wherein after extracting a sensor connected to the same system to which the reference sensor is connected, the processor is further configured to:

select a second reference sensor, extract a sensor connected to a same system to which the second reference sensor is connected, and estimate a system of a sensor recorded in the memory.

4. The estimation device according to claim 1, wherein the processor is further configured to:

acquire, through the communication circuitry, voltage values from three sensors connected to three electric power-supply ends, assuming that the acquired voltage values are the voltage value of a first electric power-supply end, the voltage value of a second electric power-supply end, and the voltage value of a third electric power-supply end, ranked in descending order based on the acquired voltage values, calculate a first ratio that is a ratio between the voltage values of the first and second electric power-supply ends and a second ratio that is a ratio between the voltage values of the second and third electric power-supply ends, when the processor determines that the three sensors are connected to a branch circuit in a same system, calculate a difference between the first ratio and the second ratio, and determine that there is a load between the first electric power-supply end and the second electric power-supply end, when the difference between the ratios is out of a specified range.

5. The estimation device according to claim 1, wherein the processor is further configured to obtain the ratio between the voltage values with respect to each of the two sensors before and after the resistance value is changed, by acquiring, through the communication circuitry, the ratio between the voltage values measured by the two selected sensors before and after the resistance value is changed.

6. The estimation device according to claim 1, wherein the processor is further configured to acquire, through the communication circuitry, voltage values that are individually measured in synchronization by the two selected sensors before and after the resistance value is changed and are transmitted.

7. An estimation device that estimates a positional relationship between loads in a power distribution network, the estimation device comprising:

a communication circuitry configured to measure a voltage value by communicating with a plurality of sensors, the loads being individually connected through the plurality of sensors to a plurality of electric power-supply ends provided in the power distribution network, the voltage being produced between each of the electric power-supply ends and a ground terminal of each of the plurality of sensors; and a processor coupled to the communication circuitry, the processor being configured to:

acquire, through the communication circuitry, voltage values from the plurality of sensors connected to three electric power-supply ends connected to a same system in the power distribution network, assuming that the acquired voltage values are the voltage value of a first electric power-supply end, the voltage value of a second electric power-supply end, and the voltage value of a third electric power-supply end, ranked in descending order based on the acquired voltage values, and calculate a first ratio that is a ratio between the voltage values of the first and second electric power-supply ends and a second ratio that is a ratio between the voltage values of the second and third electric power-supply ends, calculate a difference between the first ratio and the second ratio, and determine that there is a load between the first electric power-supply end and the second electric power-supply end, when the difference between the ratios is not within a specified range.

8. The estimation device according to claim 7, wherein the processor is further configured to:

identify the load located between the first electric power-supply end and the second electric power-supply end when the processor determines that the load is between the first electric power-supply end and the second electric power-supply end, calculate a value that indicates a difference between a ratio between voltage values of the first electric power-supply end and a ratio between voltage values of the second electric power-supply end at a reference resistance value, by turning on and turning off a power source of the identified load, change each of resistance values at the first electric power-supply end and the second electric power-supply end to the reference resistance value and a resistance value other than the reference resistance value, acquire the voltage values of the first electric power-supply end and the second electric power-supply end with respect to each resistance value, generate a linear function using a value obtained by dividing a difference between voltage values of the first electric power-supply end and the second electric power-supply end that correspond to each resistance value by a voltage value of the second electric power-supply end and a conductance value calculated on the basis of a resistance value of the second electric power-supply end that corresponds to each resistance value, calculate a slope value and an intercept value of the linear function, subtract the intercept value from a value indicating the difference between the ratios, divide a value, obtained by multiplying the subtracted value by the square of a voltage value of the second electric power-supply end at the reference resistance value, by the slope value, and estimate electric power consumption of a portion subsequent to the second electric power-supply end in the same system.

9. The estimation device according to claim 7, wherein the processor is further configured to:

change each of resistance values at the first electric power-supply end and the second electric power-supply end to the reference resistance value and a resistance value other than the reference resistance value when the processor determines that there is no load between the first electric power-supply end and the second electric power-supply end, acquire the voltage values of the first electric power-supply end and the second electric power-supply end with respect to each resistance value, generate a linear function using a value obtained by dividing a difference between voltage values of the first electric power-supply end and the second electric power-supply end that correspond to each resistance value by a voltage value of the second electric power-supply end and a conductance value calculated on the basis of a resistance value of the second electric power-supply end that corresponds to each resistance value, calculate a slope value and an intercept value of the linear function, divide a value, obtained by multiplying the square of a voltage value of the second electric power-supply end at the reference resistance value by the intercept value, by the slope value, and estimate electric power consumption of a portion subsequent to the second electric power-supply end in the same system.

10. The estimation device according to claim 7, wherein the processor is further configured to:

change each of resistance values at the first electric power-supply end and the second electric power-supply end to the reference resistance value and a resistance value other than the reference resistance value when the processor determines that there is a load between the first electric power-supply end and the second electric power-supply end and the processor is unable to control to turn on and turn off a power source of the load located between the first electric power-supply end and the second electric power-supply end, acquire the voltage values of the first electric power-supply end and the second electric power-supply end with respect to each resistance value, generate a linear function using a value obtained by dividing a difference between voltage values of the first electric power-supply end and the second electric power-supply end that correspond to each resistance value by a voltage value of the second electric power-supply end and a conductance value calculated on the basis of a resistance value of the second electric power-supply end that corresponds to each resistance value, calculate a slope value of the linear function, multiply a value, obtained by subtracting a voltage value of the second electric power-supply end from a voltage value of the first electric power-supply end at the reference resistance value, by the voltage value of the first electric power-supply end at the reference resistance value, divide the multiplied value by the slope value, and estimate electric power consumption of a portion subsequent to the second electric power-supply end in the same system.

11. An estimation method for estimating a system in a power distribution network, comprising:

communicating with a plurality of sensors that are provided between a plurality of electric power-supply ends provided for supplying power to a plurality of loads from a power distribution network and the loads individually connected to the electric power-supply ends, each of the sensor changing a resistance value between each of the electric power-supply ends and a ground terminal and measuring a voltage value produced between each of the electric power-supply terminals of the electric power-supply ends and the ground terminal;

selecting two sensors from among the plurality of sensors connected to the power distribution network;

acquiring voltage values from the two selected sensors;

acquiring, after a resistance value of one of the two sensors that has a higher acquired voltage value is changed, voltage values from the two selected sensors;

calculating, with respect to each of the two sensors, a ratio between voltage values acquired before and after the resistance value is changed; and determining that the two sensors are connected to a branch circuit in a same system in the power distribution network, when the ratio is within a specified range with respect to each of the two sensors.

12. The estimation method according to claim 11, further comprising:

arranging sensors connected to the same system to which a first reference sensor is connected in descending order of corresponding voltage values.

13. The estimation method according to claim 11, further comprising:

acquiring voltage values from the plurality of sensors connected to the power distribution network;

recording the voltage values in a memory with associating the voltage values with the plurality of sensors;

extracting a sensor that has a lowest voltage value from among the recorded voltage values;

setting the extracted sensor as a first reference sensor;

determining sensors connected to a same system from among the first reference sensor and sensors other than the first reference sensor;

recording the determined sensors in the memory; and arranging the first reference sensor and the sensor connected to the same system to which the first reference sensor is connected in descending order based on the voltage values thereof.

14. The estimation method according to claim 13, wherein after extracting a sensor connected to the same system to which the reference sensor is connected, selecting a second reference sensor;

extracting a sensor connected to a same system to which the second reference sensor is connected; and estimating a system of a sensor recorded in the memory.

15. An estimation method for estimating electric power consumption of a load in a same system in a power distribution network, comprising:

communicating with a plurality of sensors, each of which changes a resistance value between each of a plurality of electric power-supply ends provided for supplying power to a plurality of loads from a power distribution network and a ground terminal, and measures a voltage value produced between each of the electric power-supply terminals of the electric power-supply ends and the ground terminal;

acquiring voltage values from the plurality of sensors connected to three electric power-supply ends connected to a same system in the power distribution network, assuming that the acquired voltage values are the voltage value of a first electric power-supply end, the voltage value of a second electric power-supply end, and the voltage value of a third electric power-supply end, ranked in descending order based on the acquired voltage values;

calculating a first ratio that is a ratio between the voltage values of the first and second electric power-supply ends and a second ratio that is a ratio between the voltage values of the second and third electric power-supply ends;

calculating a difference between the first ratio and the second ratio;

determining that there is a load between the first electric power-supply end and the second electric power-supply end, when the difference between the ratios is out of a specified range.

16. The estimation method according to claim 15, wherein changing each of resistance values at the first electric power-supply end and the second electric power-supply end to the reference resistance value and a resistance value other than the reference resistance value when the determining determines that there is no load between the first electric power-supply end and the second electric power-supply end;

acquiring voltage values of the first electric power-supply end and the second electric power-supply end with respect to each resistance value;

generating a linear function using a value obtained by dividing a difference between voltage values of the first electric power-supply end and the second electric power-supply end that correspond to each resistance value by a voltage value of the second electric power-supply end and a conductance value calculated on the basis of a resistance value of the second electric power-supply end that corresponds to each resistance value;

calculating a slope value and an intercept value of the linear function, dividing a value, obtained by multiplying the square of a voltage value of the second electric power-supply end at the reference resistance value by the intercept value, by the slope value; and estimating electric power consumption of a portion subsequent to the second electric power-supply end in the same system.

17. The estimation method according to claim 15, wherein when the determining determines that there is a load between the first electric power-supply end and the second electric power-supply end and the determining is unable to control to turn on and turn off a power source of the load located between the first electric power-supply end and the second electric power-supply end, changing each of resistance values at the first electric power-supply end and the second electric power-supply end to the reference resistance value and a resistance value other than the reference resistance value;

acquiring voltage values of the first electric power-supply end and the second electric power-supply end with respect to each resistance value;

generating a linear function using a value obtained by dividing a difference between voltage values of the first electric power-supply end and the second electric power-supply end that correspond to each resistance value by a voltage value of the second electric power-supply end and a conductance value calculated on the basis of a resistance value of the second electric power-supply end that corresponds to each resistance value;

calculating a slope value of the linear function;

multiplying a value, obtained by subtracting a voltage value of the second electric power-supply end from a voltage value of the first electric power-supply end at the reference resistance value, by the voltage value of the first electric power-supply end at the reference resistance value;

dividing the multiplied value by the slope value; and estimating electric power consumption of a portion subsequent to the second electric power-supply end in the same system.

18. The estimation method according to claim 15, wherein when the determining determines that there is a load between the first electric power-supply end and the second electric power-supply end, identifying the load located between the first electric power-supply end and the second electric power-supply end;

calculating a value that indicates a difference between a ratio between voltage values of the first electric power-supply end and a ratio between voltage values of the second electric power-supply end at a reference resistance value, by turning on and turning off a power source of the identified load;

changing each of resistance values at the first electric power-supply end and the second electric power-supply end to the reference resistance value and a resistance value other than the reference resistance value;

acquiring voltage values of the first electric power-supply end and the second electric power-supply end with respect to each resistance value;

generating a linear function using a value obtained by dividing a difference between voltage values of the first electric power-supply end and the second electric power-supply end that correspond to each resistance value by a voltage value of the second electric power-supply end and a conductance value calculated on the basis of a resistance value of the second electric power-supply end that corresponds to each resistance value;

calculating a slope value and an intercept value of the linear function; and subtracting the intercept value from a value indicating the difference between the ratios;

dividing a value, obtained by multiplying the subtracted value by the square of a voltage value of the second electric power-supply end at the reference resistance value, by the slope value; and estimating electric power consumption of a portion subsequent to the second electric power-supply end in the same system.

\* \* \* \* \*